W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 1.
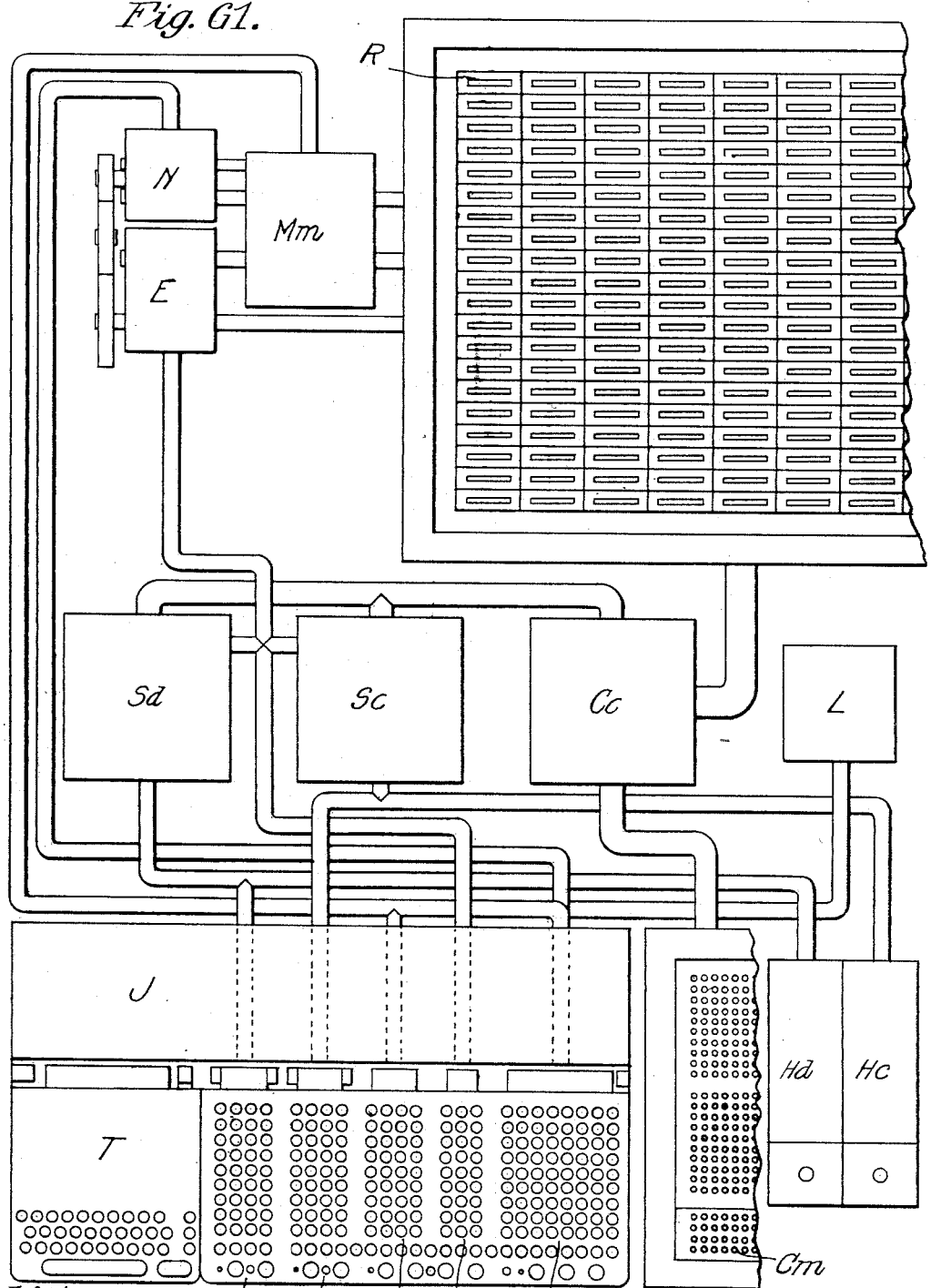
Fig. G1.

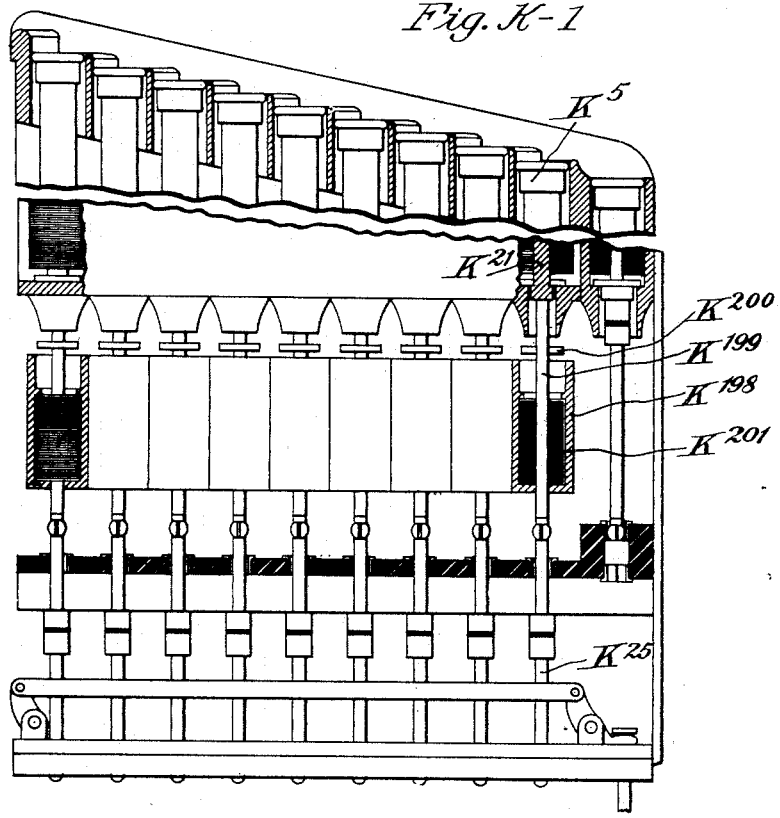

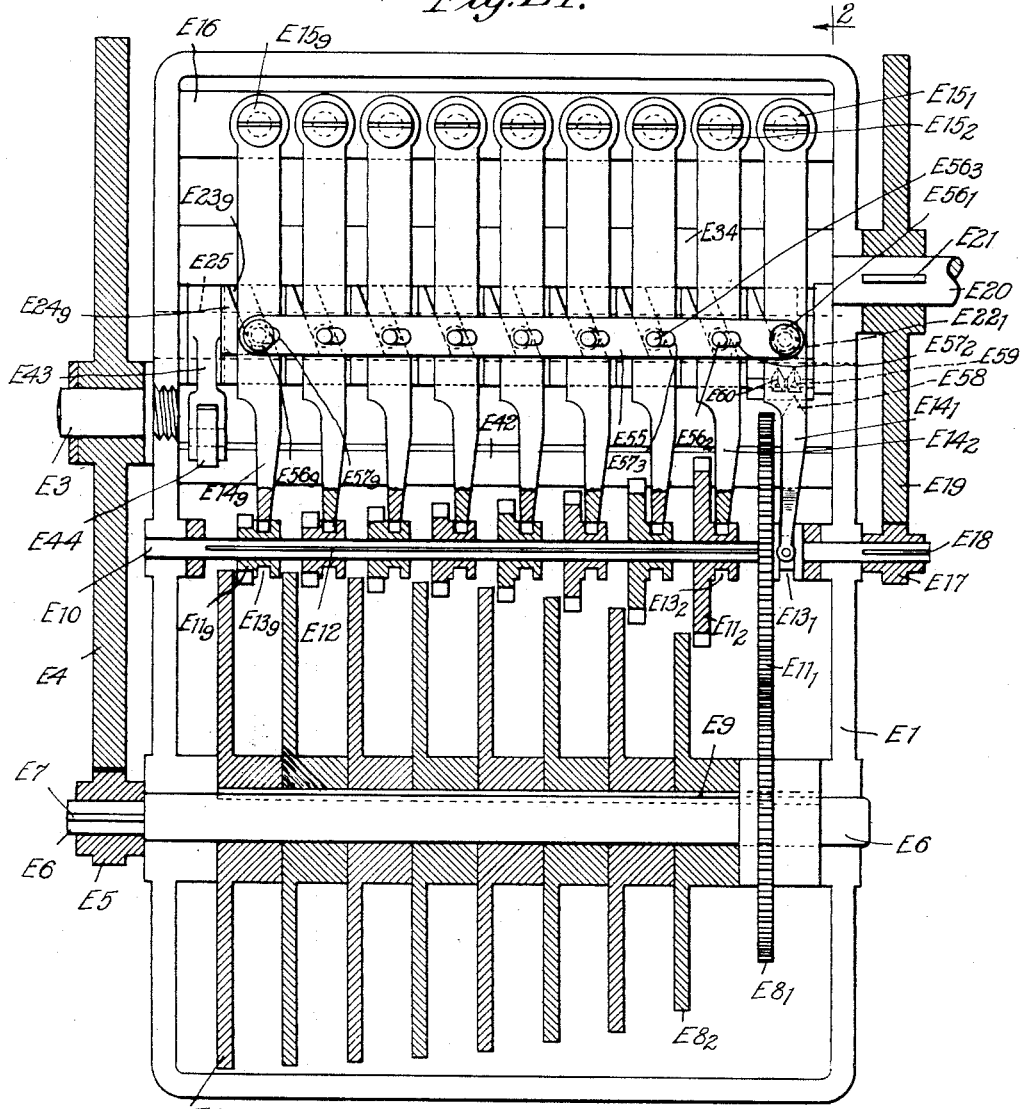
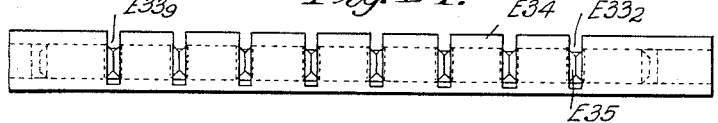

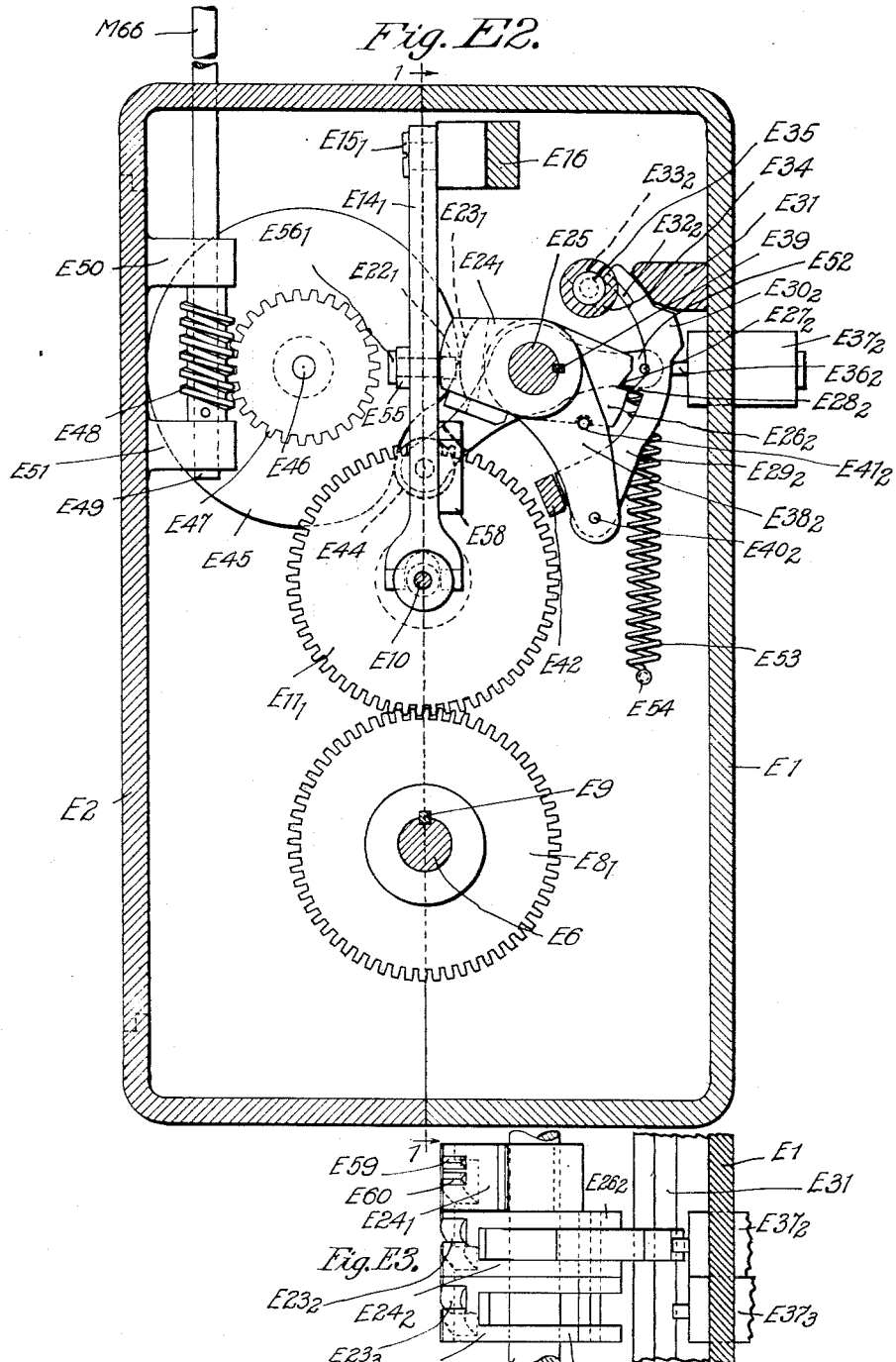

W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 5.
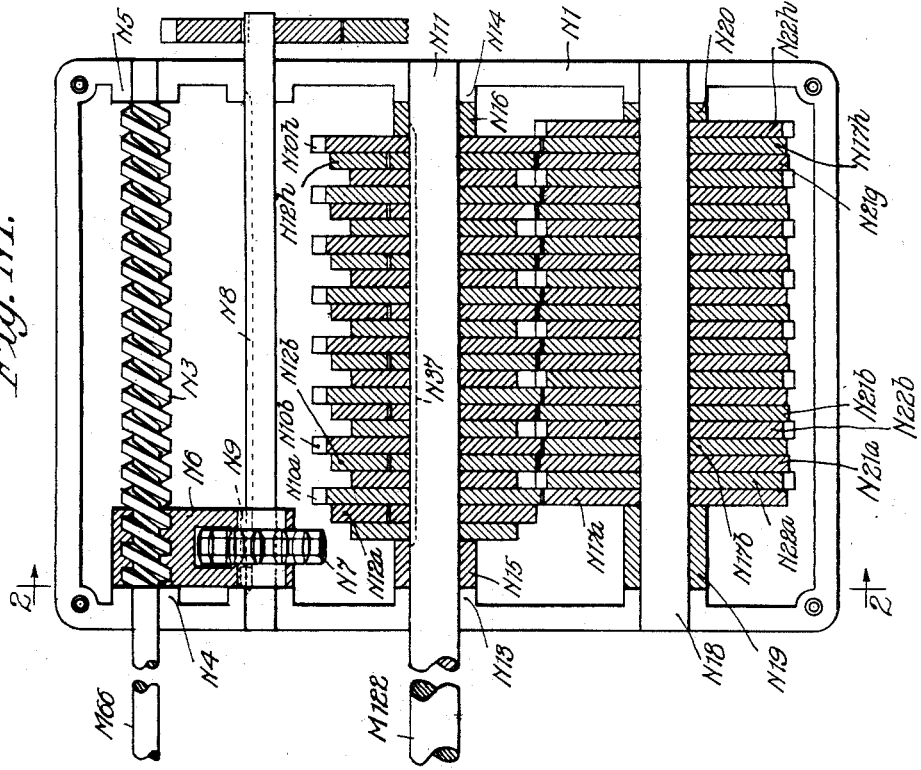
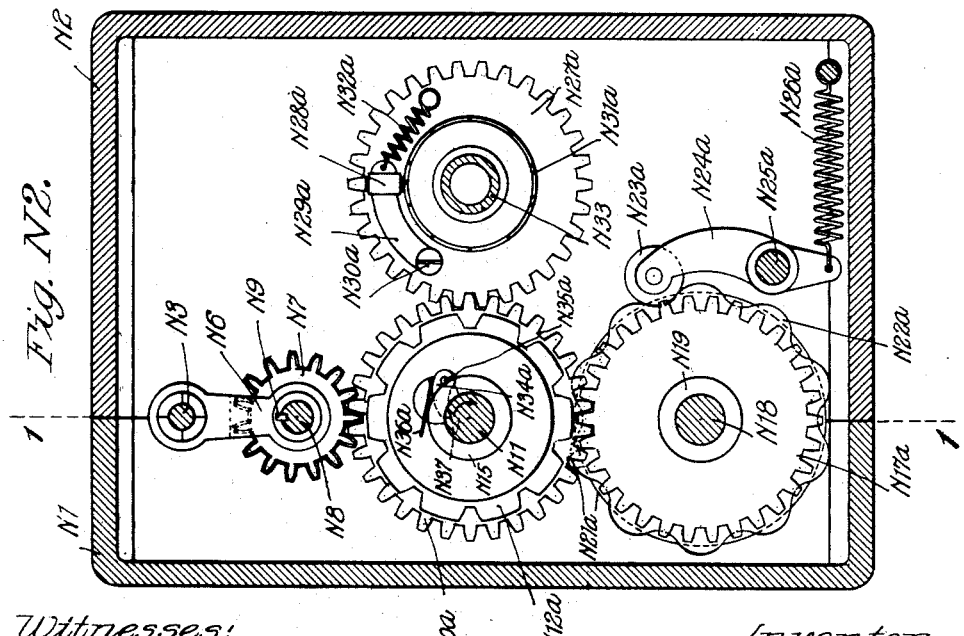
Witnesses:
Roy Johnson.
Leonard W. Novander
Inventor
William J. Crumpton
By Brown & Williams
Attorneys

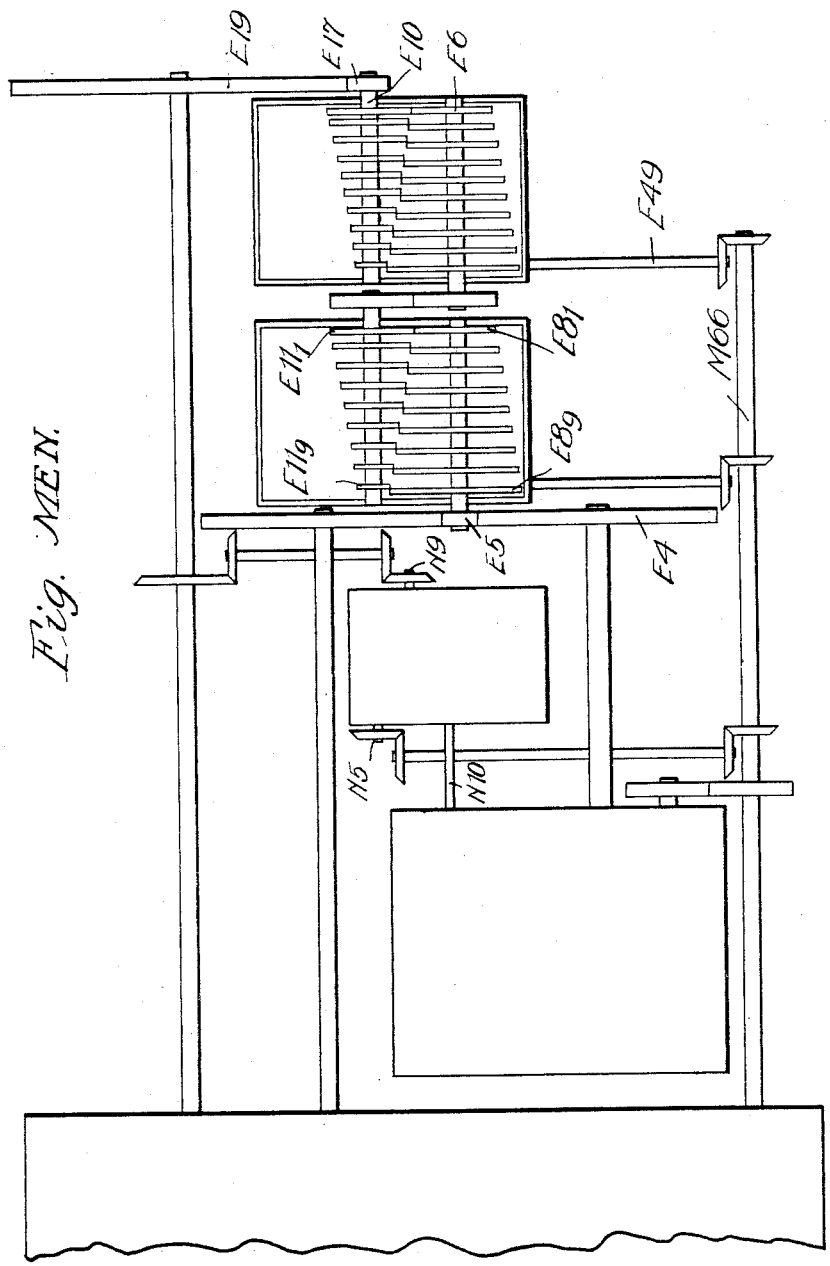

W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 7.
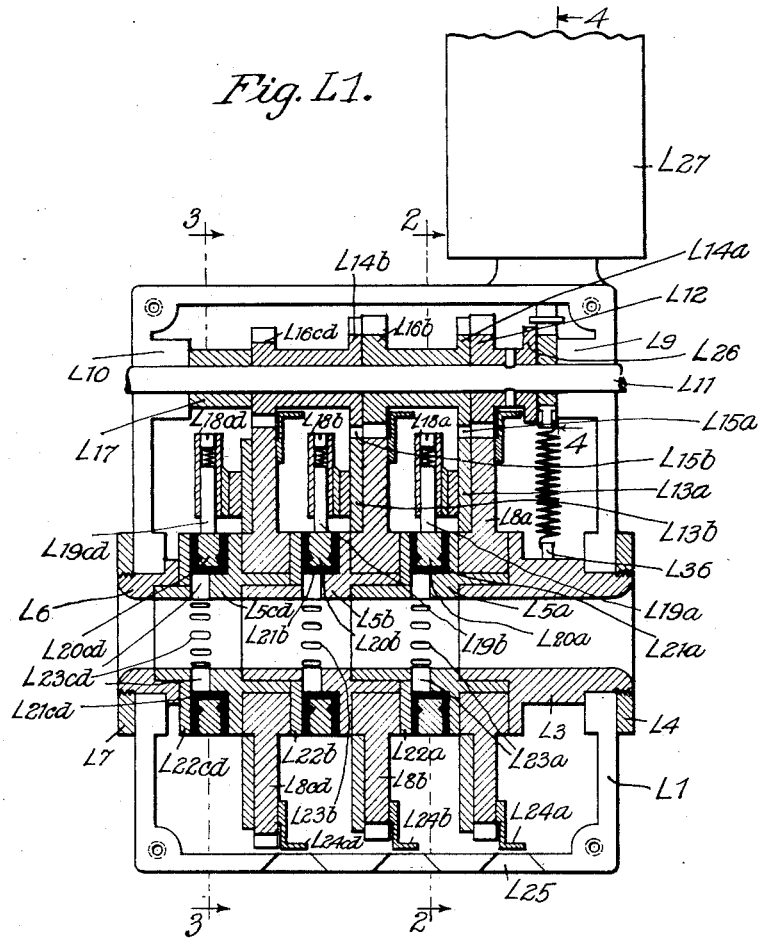
Fig. L1.
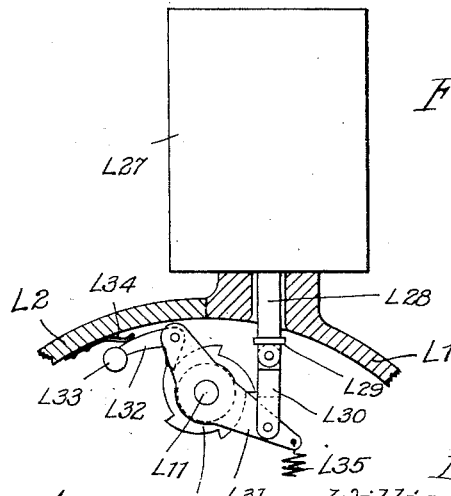
Fig. L4
Witnesses:
Leonard W. Novander
Roy Johnson
Inventor
William J. Crumpton
By Brown & Williams
Attorneys W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 8.
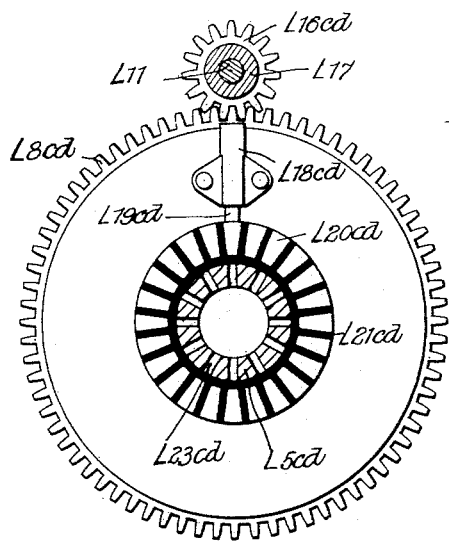
Fig. L3.
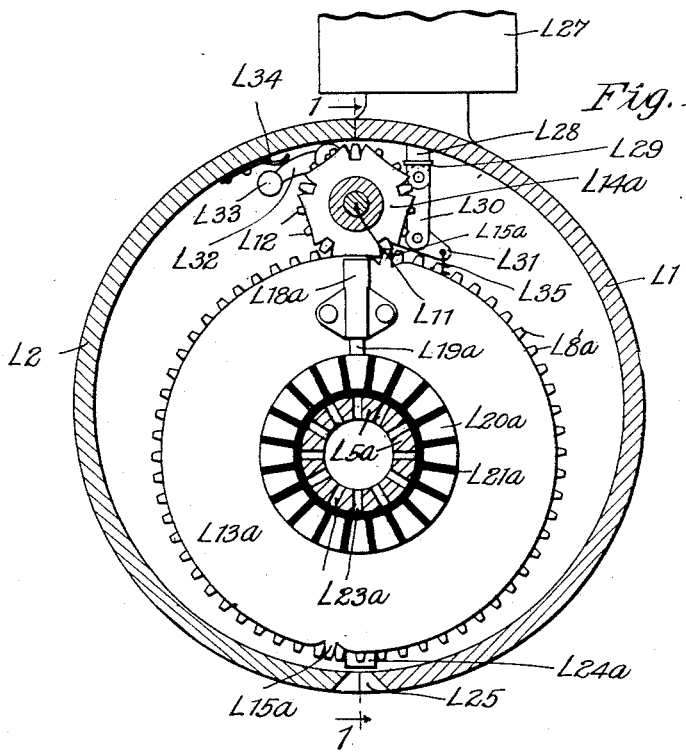
Fig. L2.
Witnesses:
Leonard W. Novander,
Roy Johnson
Inventor
William J. Crumpton
By Brown & Williams
Attorneys W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 9.
Fig. R1
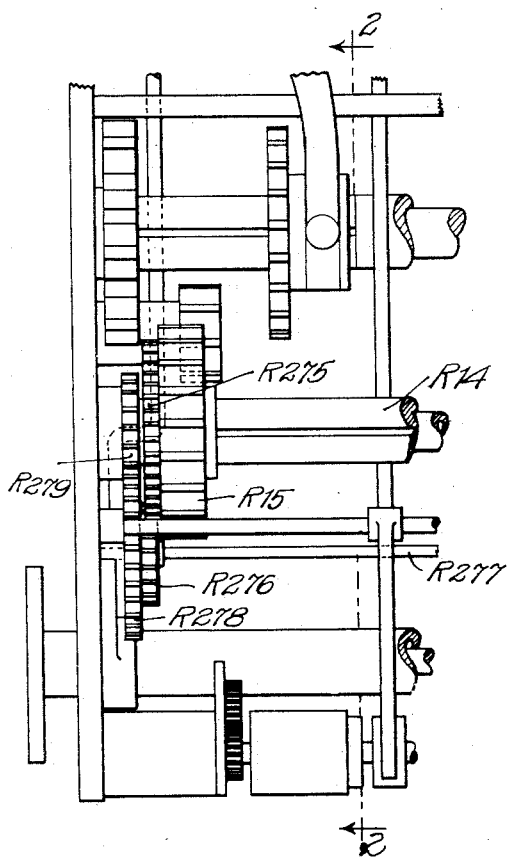
Fig. R2.
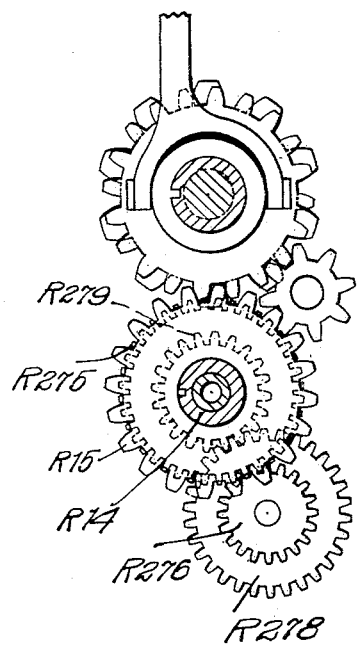
Witnesses:
Inventor
William J. Crumpton.
By Brown & Williams
Attorneys.

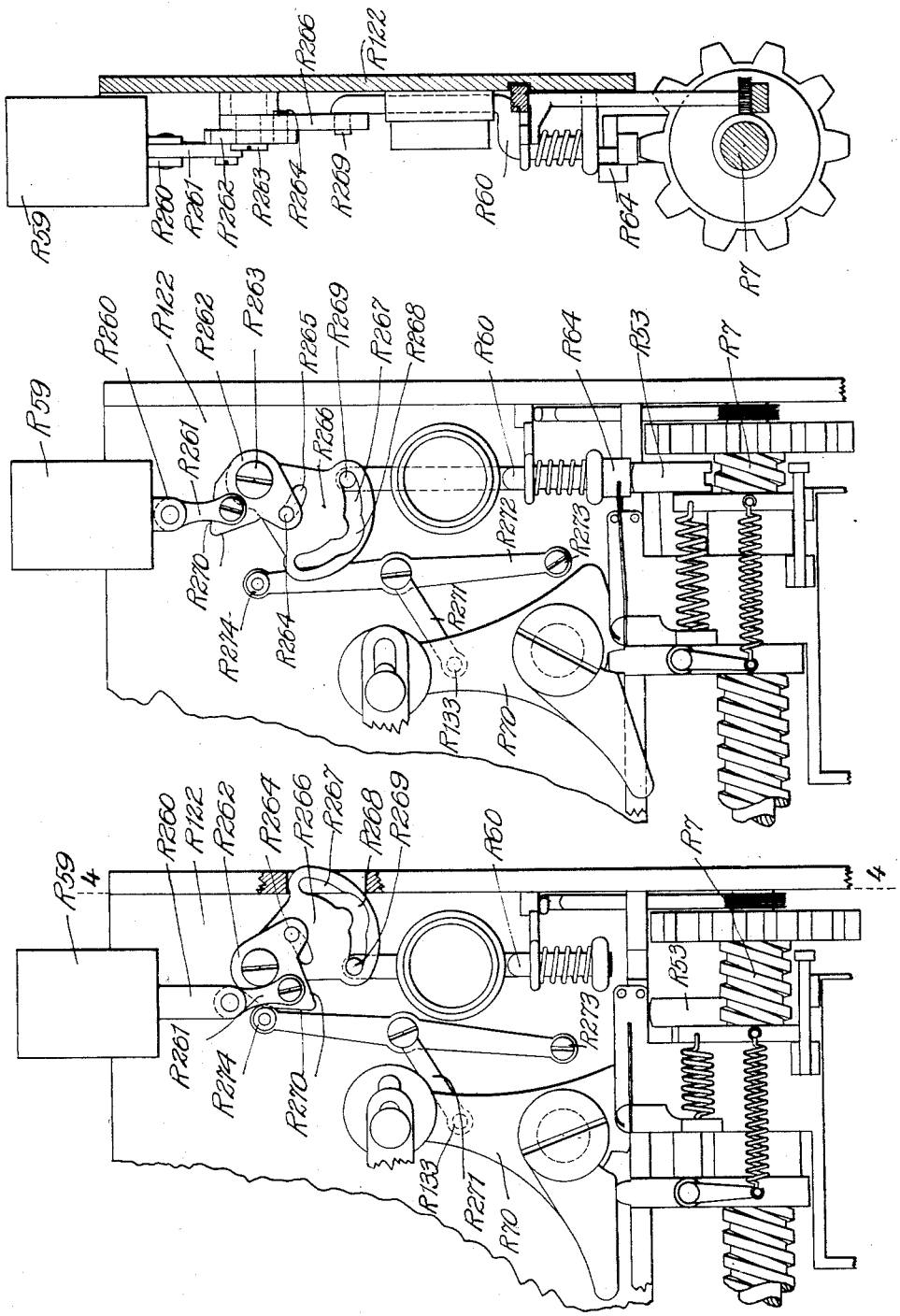

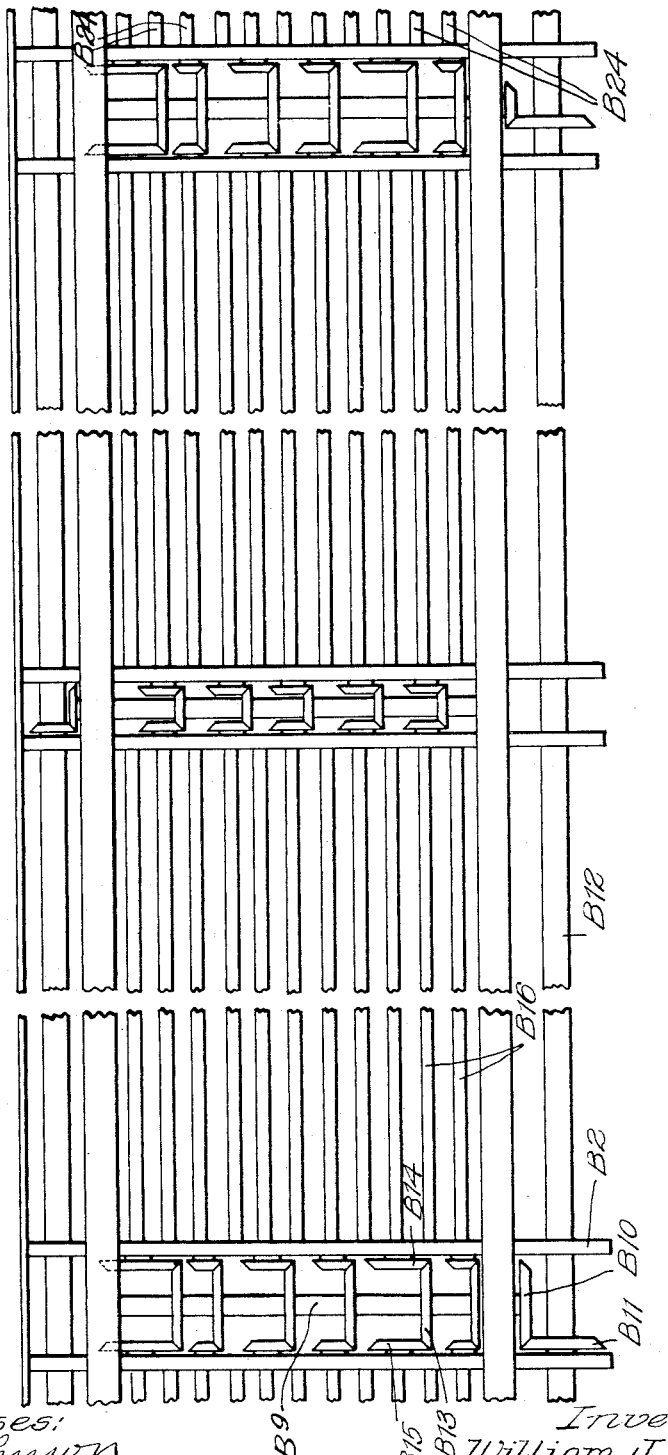

W. J. CRUMPTON.
METHOD AND MEANS FOR AUTOMATIC ACCOUNTING.
APPLICATION FILED AUG. 4, 1908. RENEWED JUNE 19, 1915.
1,169,067.
Patented Jan. 18, 1916.
21 SHEETS—SHEET 12.
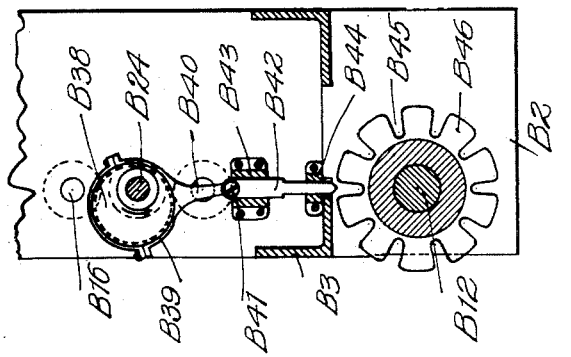
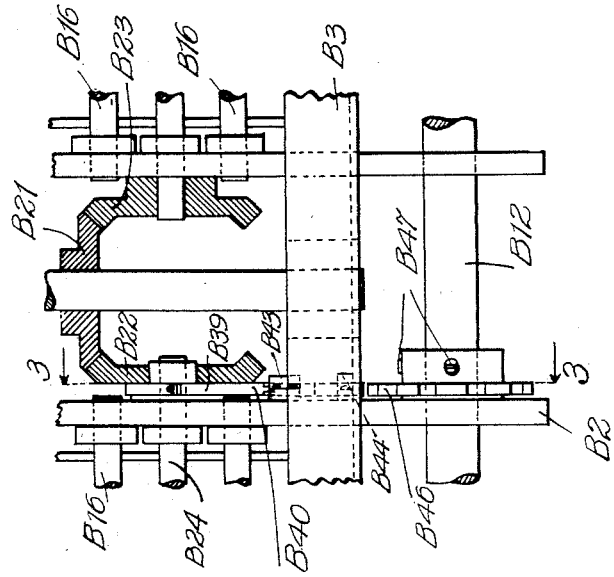
Witnesses:
Roy Johnson
Leonard W. Novander.
Inventor
William J. Crumpton
By Brown & Williams
Attorneys.

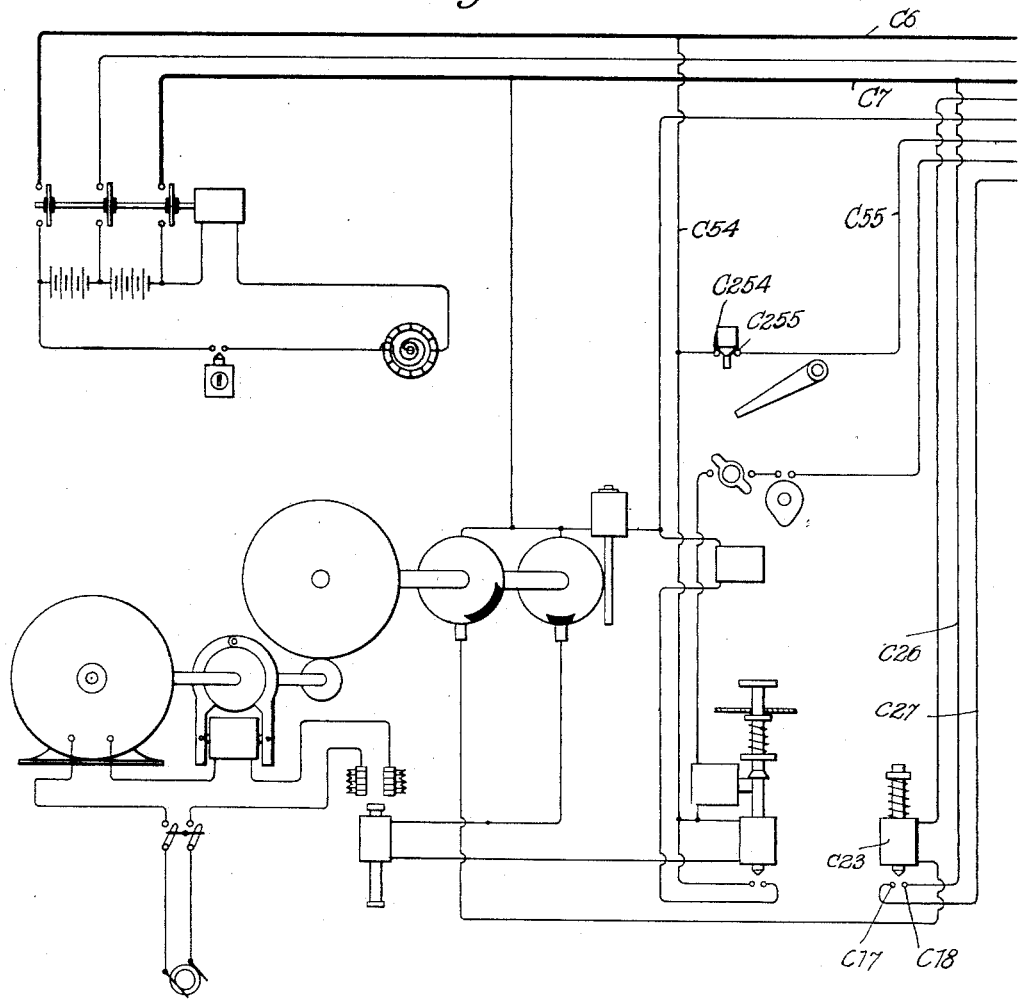

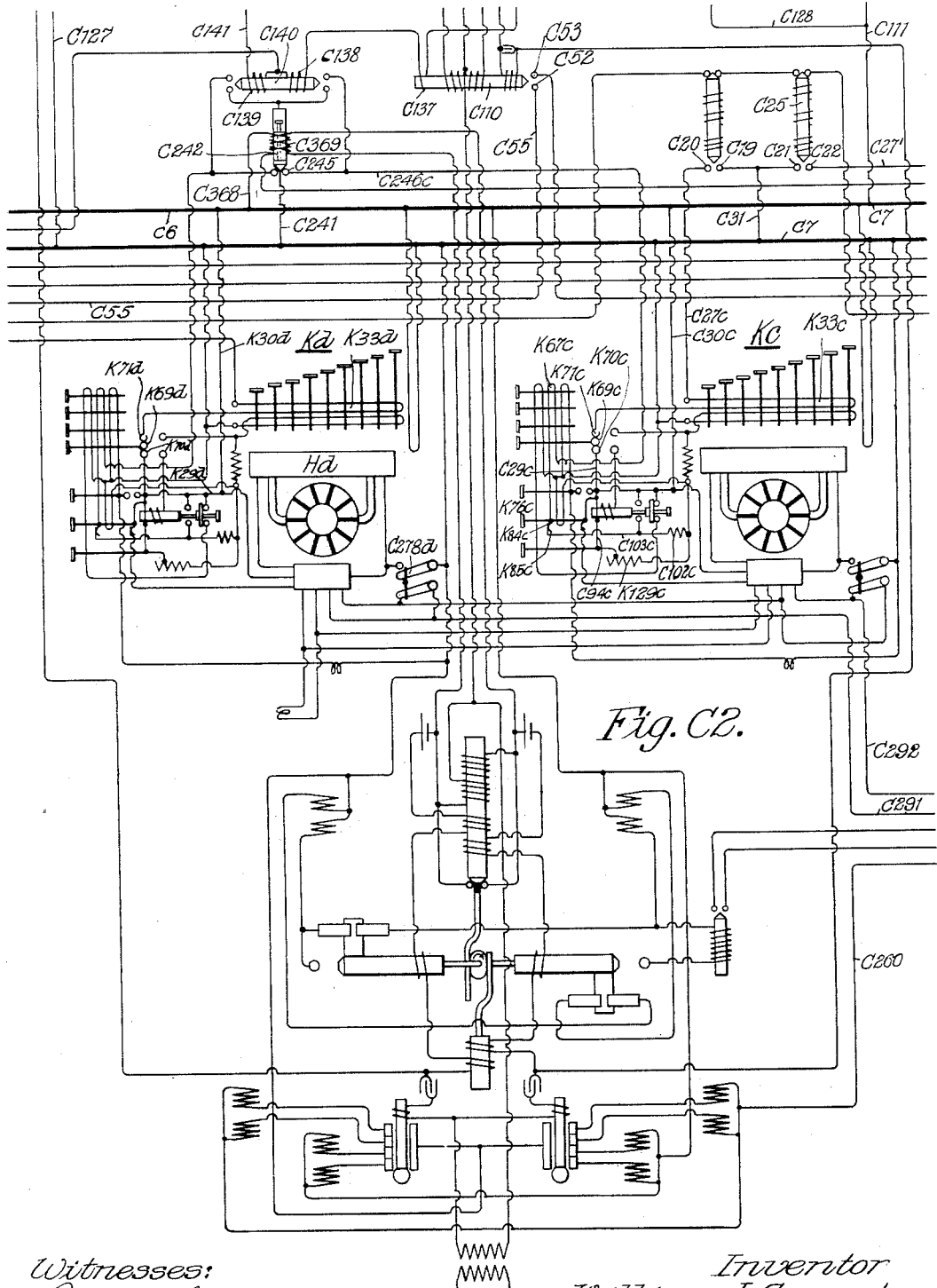

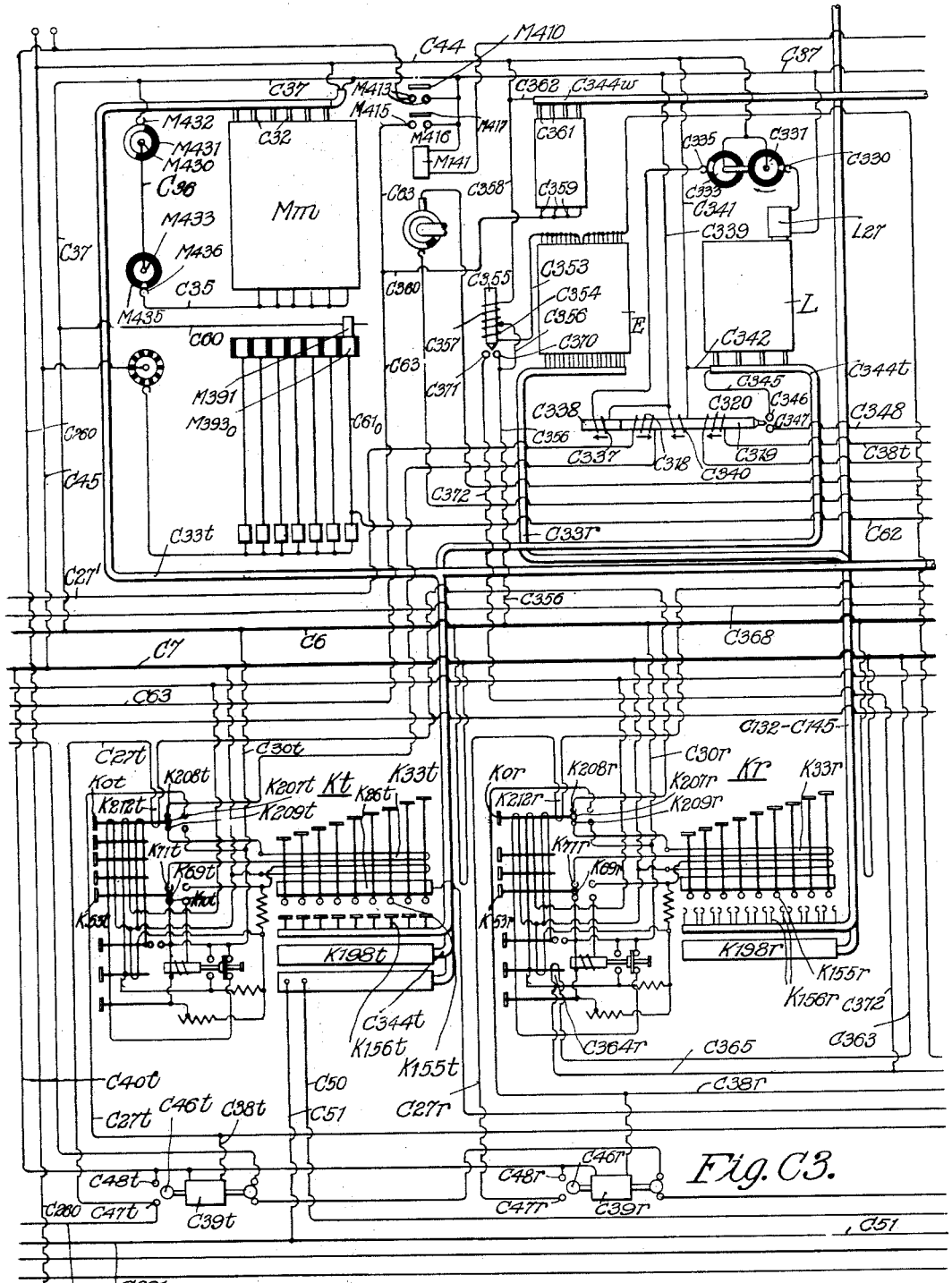

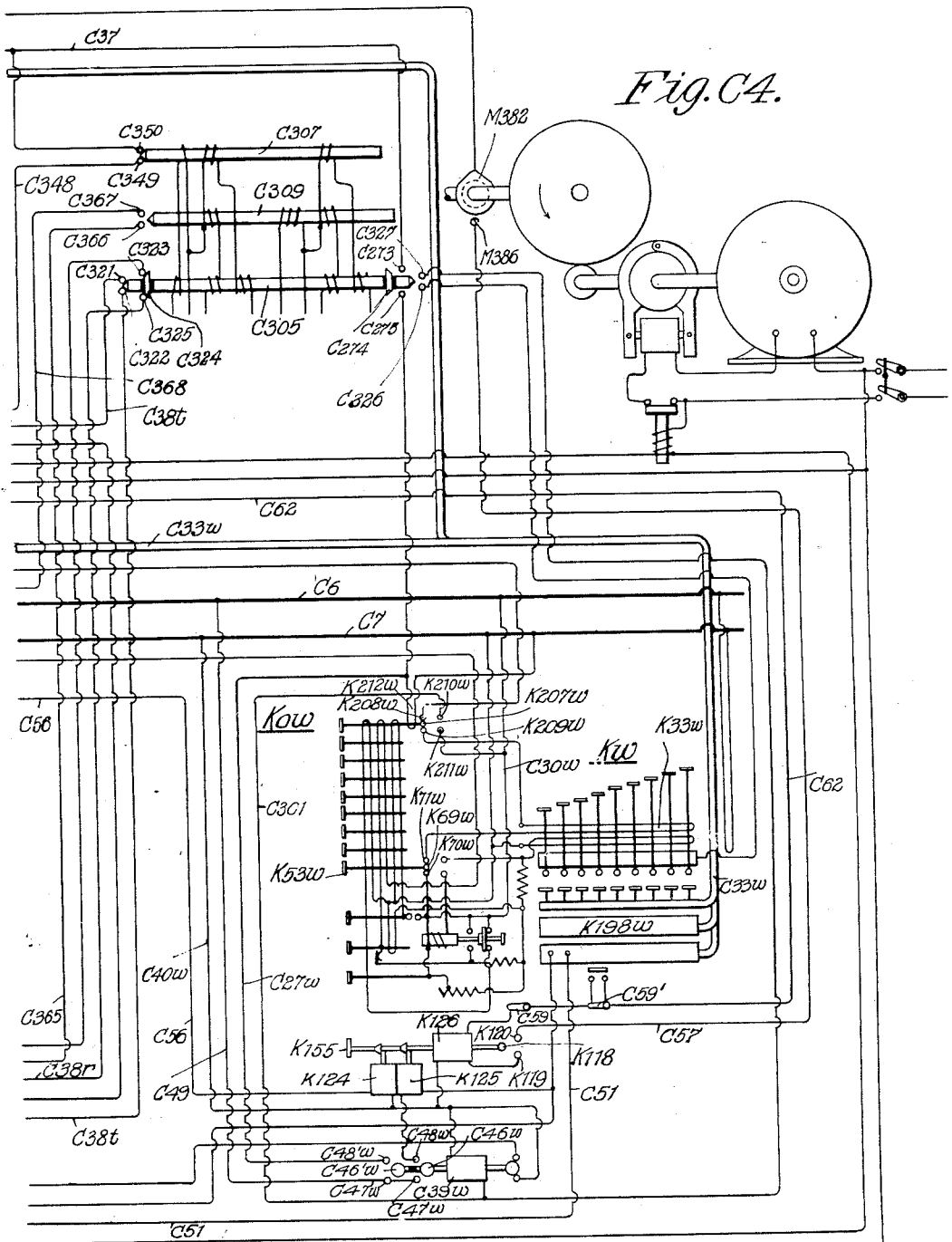

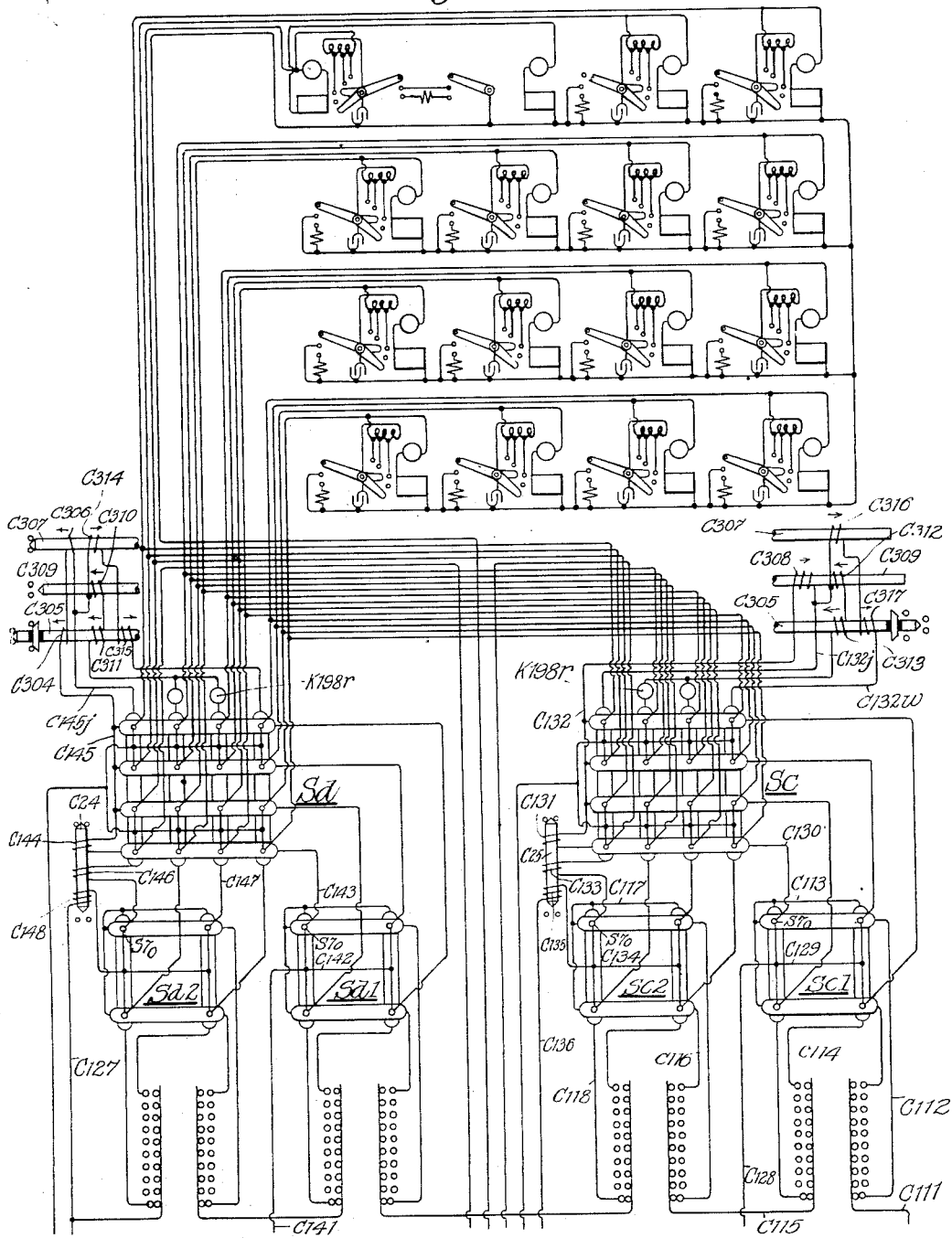

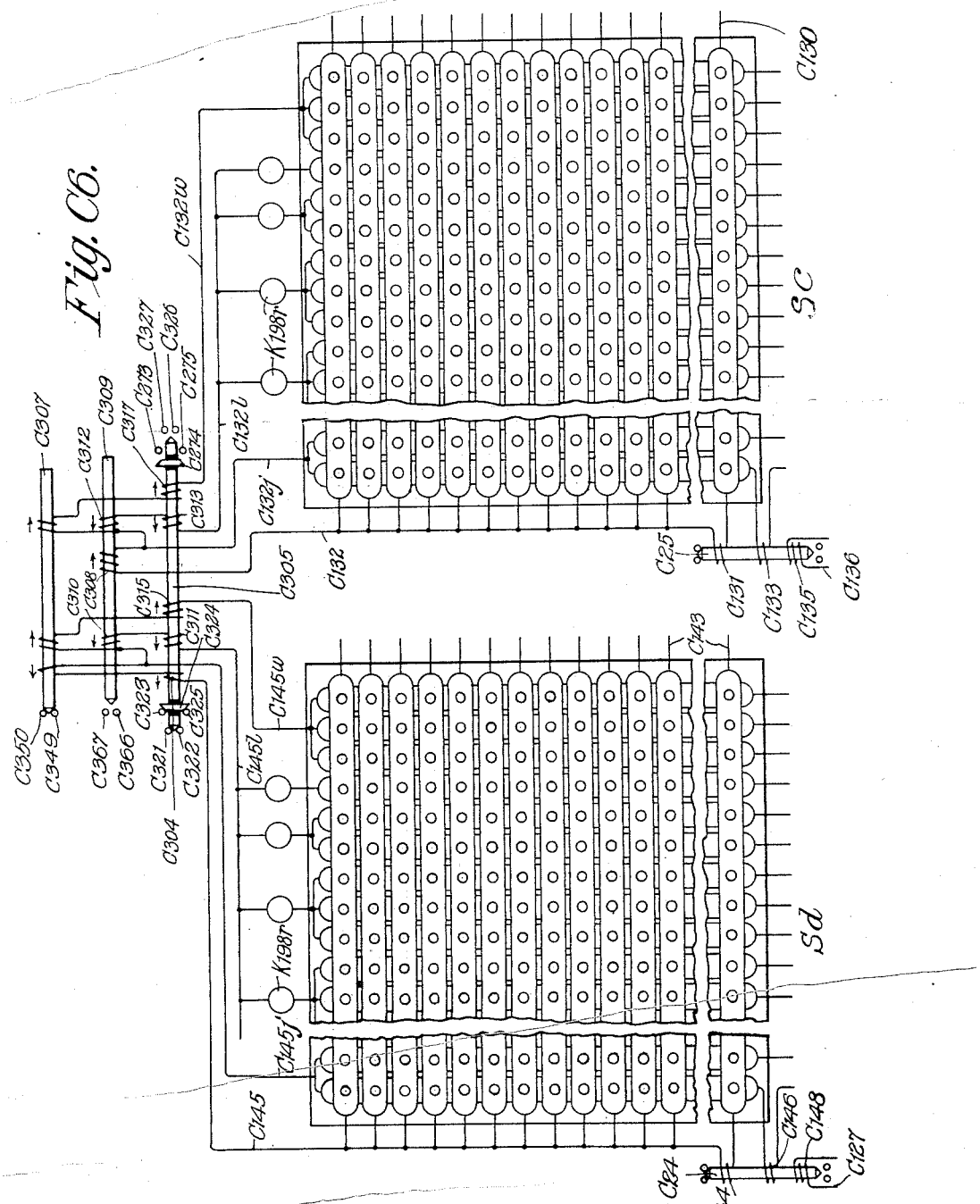

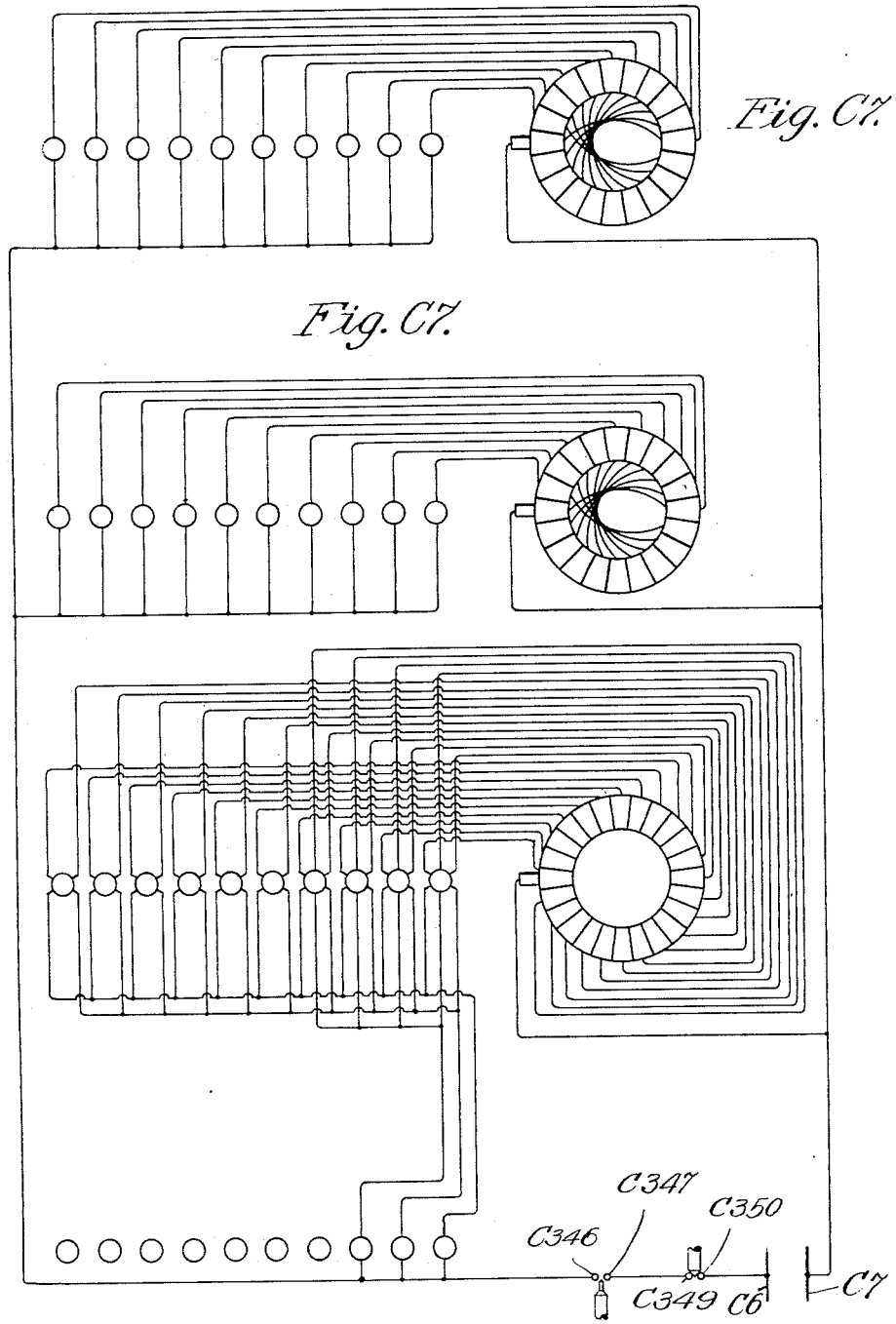

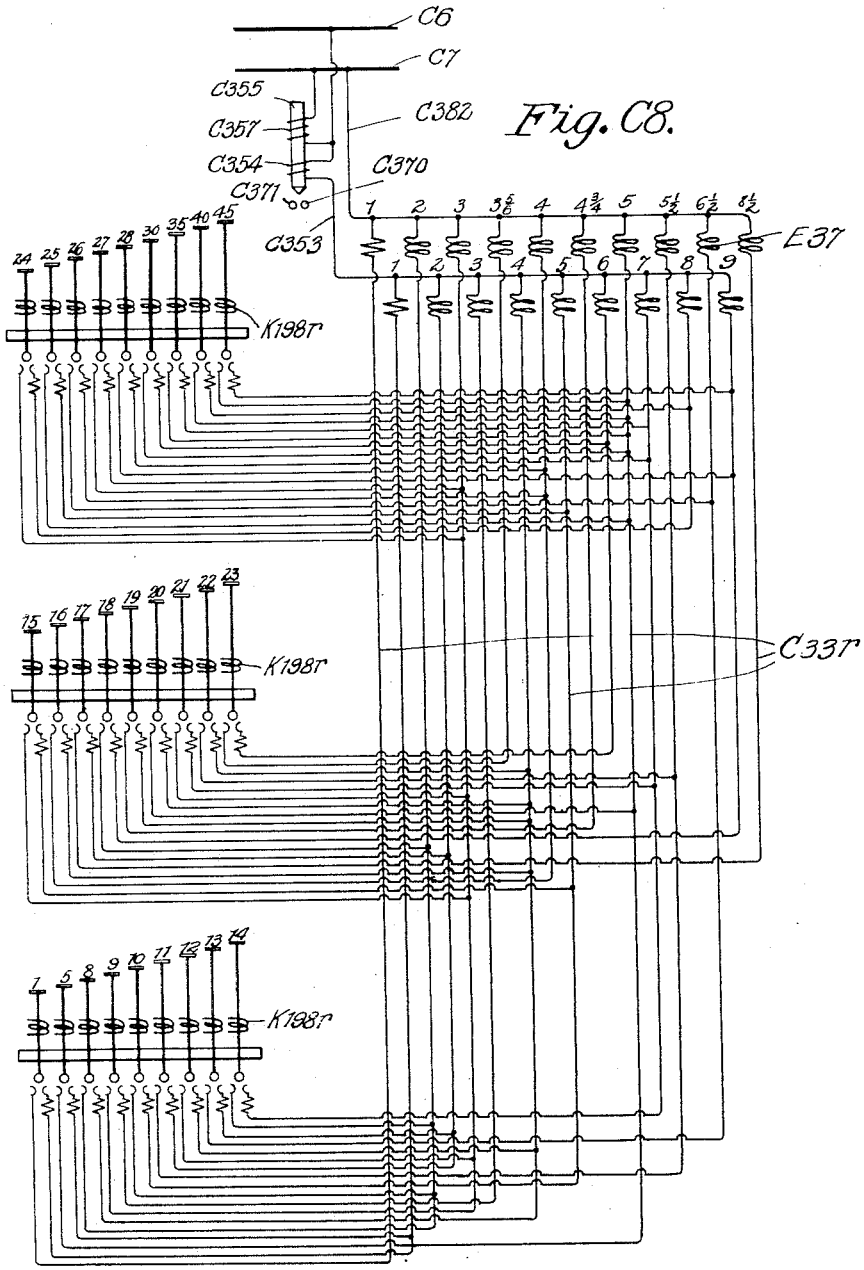
Fig. C8.

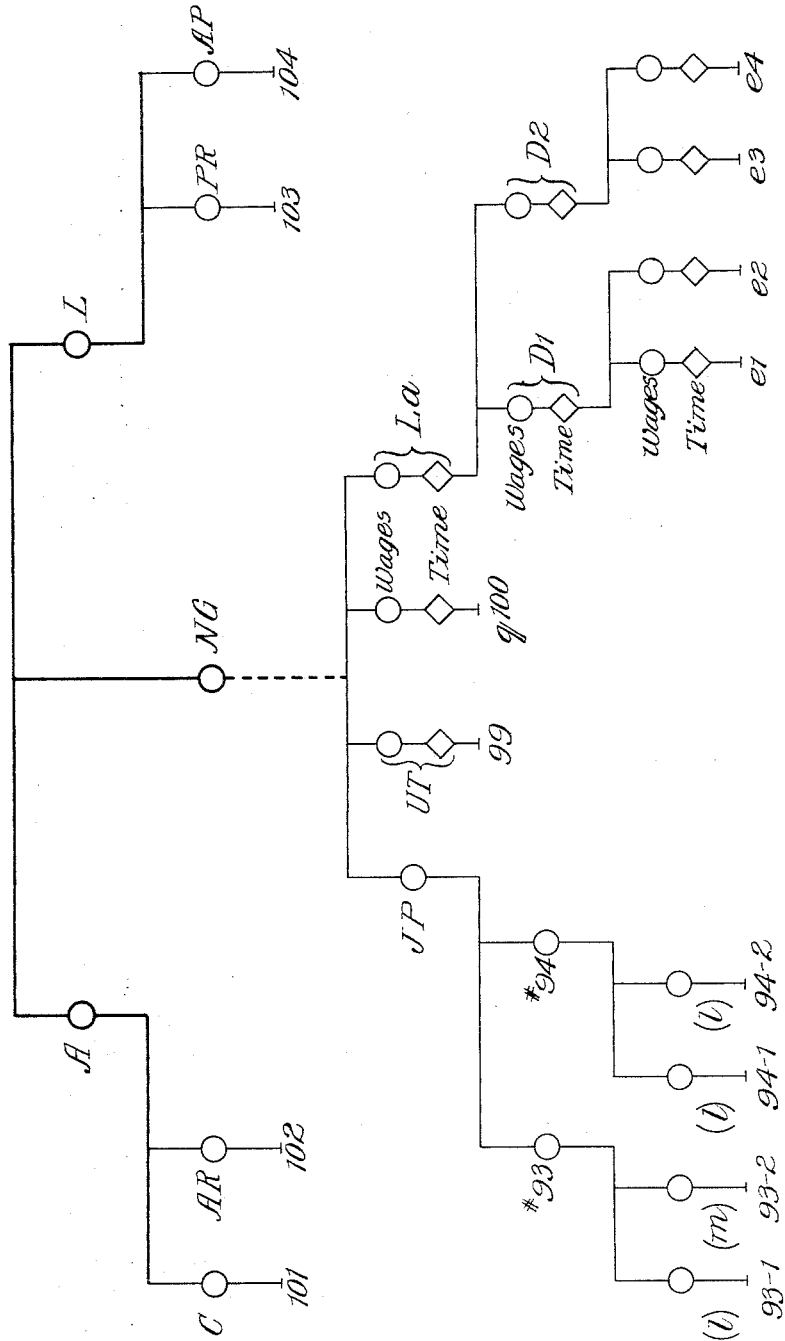

UNITED STATES PATENT OFFICE.

WILLIAM J. CRUMPTON, OF SUPERIOR, WISCONSON, ASSIGNOR, BY MESNE ASSIGNMENTS, TO WILLIAM R. HEATH, OF BUFFALO, NEW YORK.

METHOD AND MEANS FOR AUTOMATIC ACCOUNTING.

1,169,067.  Specification of Letters Patent.  Patented Jan. 18, 1916.

Application filed August 4, 1908, Serial No. 446,895. Renewed June 19, 1915. Serial No. 35,127.

*To all whom it may concern:*

Be it known that I, WILLIAM J. CRUMPTON, a citizen of the United States, residing at Superior, in the county of Douglas and State of Wisconsin, have invented certain new and useful Improvements in Methods and Means for Automatic Accounting, (Case 5,) of which the following is a full, clear, concise, and exact description, reference being had to the accompanying drawings, forming a part of this specification.

My invention relates to methods and means of accounting, and has special adaptability for the purpose of time-accounting in a broad sense, which includes the matter of wages, the apportionment of appropriate charges to counterbalance the wages paid, and the accounting in various ways of these more fundamental items.

Two distinct methods of securing data for time-accounting may be employed. In one, each period is ascertained by a direct measurement or estimate of the amount of lapsing time, resulting in a simple one-way registration or indication which starts at zero and steadily increases to the full amount of the period, either continuously or by a succession of more or less uniform increments. In the other, each period is ascertained by using an arbitrary starting point, commonly midnight for the shorter periods, as the basis for two registrations or entries of opposing natures, the first, for example, debiting the workman with the amount of beginning time, say eight hours (at eight o'clock), and the second crediting him with the amount of closing time, say twelve hours (at noon); from which opposed data will be calculated the net credit of four hours for actual working time, without directly noting the lapsation.

Various mechanical aids are employed in time-accounting, but they leave much to be desired. Where beginning and ending times only are recorded, subsequent nettation is necessary to determine the working time, and where elapsed time is registered directly it must usually be translated from dials. Subsequently, in either case, separate totalization must be performed to get the amount of each workman's time for several periods, separate extension to get his wages, and separate synthesization to get the total time and wages of all the workmen. Subsequently, also, other totalizations and synthesizations are commonly made to get the value of the labor element of production cost. Most of these translations, nettations, totalizations and synthesizations are peculiarly subject to error, frequently involving the use of the mixed scale of time-notation, its translation into the straight dollar decimal scale, and the handling of detached and scattered data. These subsequent operations are usually performed mentally, and even where the use of mechanical aids is extended to them, such use commonly involves repeated inspection or other volitional handling of the original or derived data.

The general object of this invention, broadly speaking, is to substitute connected, automatic, mechanical operations in place of disconnected, volitional, mental operations for everything subsequent to the original in and out entries, and to secure the varied ultimate results in this important field, directly from the original fundamental operations, without the labor, delay and uncertainty inherent in previous practice.

This application is founded on the double-, opposing-entry, debit-and-credit method, following the more common practice of employees' time registers, but with several important improvements. In co-pending application filed February 11, 1908, Serial No. 415,396, is disclosed a stock-accounting system whose operation is based in part on the assignment of each primary account to a separate adding-subtracting mechanism or register, which receives opposing debit and credit entries, automatically combines each entry with the previous ones, and currently registers or indicates their net amount. Provisions similar to those of the co-pending application may be made for securing details of each registration, both in the shape of a printed record for each individual register and in the shape of a general consecutive or journal record of successive entries for all registers, with certain modifications as specified. The former may take the place of the individual card-record now in common use, or the memorandum-maker of the co-pending application may be utilized for that purpose, showing a workman's record for a week on a single card or printing separate slip-records of each entry, similar to the single-transaction records printed by cash registers. The journal record furnishes a desirable means for systematically checking the accuracy of the original entries. In the earlier application referred to, generic or synthesizing registers are automatically connected and operated, duplicatingly with their specific or individual registers; and, moreover, two specific registers (with their respective generics) are counterbalancingly connected and operated, one to receive and account the debit element, and the other to receive and account the credit element of a double entry, thus mechanically insuring the harmonious construction of a double-entry ledger. In my present invention I have solved the problems involved in the application of these principles to time and cost accounting, and have thereby overcome some hitherto practically insuperable obstacles to full, prompt and accurate time and cost accounting. Since the combination of an entry with previous entries in the same register is automatic, and approximately instantaneous, this method permits many time registrations to be combined in a single showing, whether of the successive periods of a single workman or of a multiplicity of periods worked by a plurality of men; and these latter periods may be more or less overlapping or intercurrent. One of the distinguishing requisites of the general method is that for each debit entry there shall be a credit entry, in order that the net result may be the registration or accounting of one or more complete periods only.

To guard against the inadvertent entry of two "ins" or debits without an intervening credit for an "out," provision is made in the individual-workman registers for a necessary alternation of debits and credits, with a single exception which is noted hereafter. The associated generic registers which duplicate the entries in their several specifics are without the alternating equipment, thus permitting in them an indefinite number of successive ins, to be succeeded by an equal number of outs. Each register is equipped with counters, indicating the number of debits and the number of credits, and these indications must agree before the synthesization will be correct for a plurality of complete periods.

Beginning time may be entered either positively or negatively, the essential being that ending time shall be entered opposingly. Inasmuch as a workman is usually creditable with net time, in practice it is preferable to debit him with beginning time and credit him with ending time; while in cost accounting the reverse holds good, the job being credited with beginning time and debited with ending time, leaving a net debit for intervening time. Time is preferably registered on the twenty-four hour basis, fractions of an hour being entered decimally. Various expedients may be employed to register correctly a period extending over parts of two days.

The mechanical summation of time periods for a given workman is supplemented by a mechanical indication of the amount of his wages for the same periods, likewise mechanically summated, thus obviating the necessity for any mental calculation in paying off a workman. To accomplish this, two registers are assigned to each workman, one to account his time and the other to account his wages. In my above application referred to, Serial No. 415,396, are disclosed method and means for associating quantity and value registers in pairs, in some respects not unlike the pairs of time and wage registers shown herein, but with this difference: There the ratio between the quantity and value entries in any given pair of registers is commonly variable and preferably determined volitionally, alike in the specific and in the generic pairs; while in time-accounting, the rate of pay for each workman usually being definite and fixed, automatic provision is desirable for securing a fixed ratio between the amount of actuation of any specific time register and that of its related wage register. At the same time, it is necessary to provide for a variable ratio between related time and wage entries in the generic registers, because it will commonly be the case that individuals in the same department or other class will receive different rates of pay. The details of the mechanical relations between the two members of a pair of registers which secure this complex coöperation are set forth elsewhere herein.

The general method of connecting, controlling and actuating the registers and the general means for carrying out that method and for recording the registrations shown in the earlier application are retained herein, and consist, in the main, of three interlocking keyboards K$d$, K$c$, K$w$, and a master machine M$m$, together with journalizing and invoice-making typewriting or printing mechanisms. The more complex operations required for stock-accounting caused the introduction of two additional keyboards in the later application, one for the quantity and one for the price per unit of quantity, together with a second master machine. The additional master machine is not retained herein as a separate mechanism, its function being otherwise performed; but the two additional keyboards are retained, with important modifications in their operation and additions to their functions.

Normally, the quantity keyboard, hereinafter termed the time keyboard, is potentially connected with a time-controlled mechanism or clock. This connection becomes actual upon the accomplishment of set-ups on the debit-credit boards, and thus at the proper stage of the entry operation the clock automatically sets up the time element of the entry. The setting-up of the number of a workman on either the debit or the credit board potentially sets up his individual rate of pay on the price or rate board, and this potential set-up in turn becomes actual as soon as the time set-up has been accomplished.

Throughout the system the debit and credit set-ups not only connect the proper registers for actuation to the amount determined by subsequent set-ups, but also control the actuation of the debit- and credit-noting elements of the journal and memorandum-making mechanisms. The time set-up controls the actuation of the time registers and the time-recording members of the journal and memorandum mechanisms, and the rate set-up likewise controls the rate-recording members of those mechanisms. In the present application these two set-ups also function as factors to produce automatically the final amount or wage set-up, a multiplying mechanism being provided which receives the time and rate factors and multiplies them to produce the wage element. This wage element is received by a transposing mechanism which controls the setting up of this element on the wage keyboard, whose function is to control the wage registers and the wage-noting element of the printing mechanism.

The automatic interaction and interlocking of the several keyboards which will be described are somewhat complex, and their coöperating functions are various and of great importance, though their operative manipulation is exceedingly simple. In this, as in the former application, whatever set-ups are made must succeed each other from left to right—debit, credit, time, rate and wages. If desired, both time and rate set-ups may be omitted upon the depression of a zero or pass key at each board, provided a workman's number is not set up on either the debit or the credit board, and thereupon the final set-up may be made manually, as in the earlier application. But if such workman's number is set up, the amount or wage set-up cannot be accomplished except by the use of the automatically-factorizing time and rate keyboard. In this case, if the clock remains potentially connected with the time board, the subsequent set-ups of the full series are automatically accomplished, thus: Upon the completion of a debit-credit set-up which includes a workman's number (on either board), the clock becomes operatively connected and automatically sets up the time, and thereupon the rate set-up which was potentially accomplished by the workman's set up becomes actual, the wage set-up is automatically accomplished, and nothing further remains for the operator but to depress the operating key. But the clock may be entirely disconnected from the time board without the time factor being omitted, and then the time set-up must be manually performed, whereupon the rate and wage set-ups are automatically made as before.

Time and rate set-ups may be desired even when no workman is to be debited or credited, and then the rate must be set up manually. Whenever either time or rate set-up is used, both must be used, but in such cases the final amount set-up cannot be accomplished otherwise than by the automatic multiplication of the two factorizing set-ups. This automatic factorization mechanism may be employed in stock-accounting; where, the quantity and price being entered manually, the value of the material is automatically extended, set up on the amount keyboard, accounted and recorded. Further, by way of improvement on the common bill-and-charge practice, this factorizing mechanism, in connection with the invoice-making and journalizing mechanisms heretofore mentioned, provides means, upon writing the data of an invoice substantially as in the prior art, for automatically extending and totalizing the values, charging the customer, crediting the several stock accounts (quantity and value), and simultaneously showing net results in all specific accounts and all their generic accounts, including sales and profits. Similarly, in handling invoices received, for credit, the setting-up of the data (commodity number, quantity and price) secures the automatic extension and accounting of the value, together with a journal record which is peculiarly suited for convenient auditing. In short, this automatic factorizing feature, in combination with the coöperating features of the system, furnishes improved means for the mechanical performance of successive multiplications in general, with novel accounting and recording accompaniments, namely: an automatic listing in adjoining columns of the associated multiplicands, multipliers and products, with current mechanical combinations of the several multiplicands and their respective products, separately and yet associatedly, in pairs, with a wide range of nettation, totalization and synthesization, and with an automatic record of the same opposite each multiplicand — for a simple example, thus:

| | D. | C. | Multiplicand. | Multiplier. | Product. |
|---|---|---|---|---|---|
| (1) | Hmp | Cmp | A' (4) | b (100) | V (400) |
| (2) | Hmp | Bmp | A'' (5) | c (500) | W (2500) |
| (3) | Kmp | Cmp | D' (6) | e (50) | X (300) |
| (4) | Kmp | Bmp | D'' (7) | f (300) | Y (2100) |
| (5) | Bmp | Kmp | d'' (3) | g (55) | Z (165) | which, being interpreted, means that A and A'' are totaled in Hm (the multiplicand member of the pair H$mp$), and the automatically-secured products of A′ and A″ by $b$ and $c$ respectively are associatedly totaled in H$p$ (the product member of the same pair); that D′ and D″ are totaled, and their sum is diminished by $d''$, in K$m$, and their products by $e$, $f$ and $g$ are correspondingly consolidated in K$p$; while A′ and D′, and their products by $b$ and $e$, are synthesized in C$m$ and C$p$, and A″, D″ and $d''$, and their associated products by $c$, $f$ and $g$, are synthesized, the first two additively and the last subtractively, in B$m$ and B$p$. (As used above, D and C do not have their technical accounting significance, being used here merely to denote opposing registrations.)

If it be desired to translate the foregoing abstract statement into a concrete example, we may assume, to take an easy case, the buying and selling of horses and kine, each of common and blooded grades, and the five entries given above may then be specified as follows:

(1) Buy 4 common horses, at $100;
(2) Buy 5 blooded horses, at $500;
(3) Buy 6 common kine, at $50;
(4) Buy 7 blooded kine, at $300;
(5) Sell 3 common kine, at $55.

Whereupon the concrete record would appear as follows:

| | D. | | C. | Multiplicand. | Multiplier. | Product. |
|---|---|---|---|---|---|---|
| (1) | Buy (com.) horses | Common (stock) | | 4 | 100 | 400 |
| (2) | " (bld.) horses | Blooded " | | 5 | 500 | 2500 |
| (3) | " (com.) kine | Common " | | 6 | 50 | 300 |
| (4) | " (bld.) kine | Blooded " | | 7 | 300 | 2100 |
| (5) | Sell common (stock) | (com.) kine | | 3 | 55 | 165 |

And the following "to-net-tal" concrete results, on hand, would be automatically obtained:

Primary classification: 9 horses, standing in at $2,900
        10 kine  "  "   2,235
Secondary classification: 7 common head (of stock) at  535
        12 blooded head  "  "   4,600
Grand generic result: 19 head (all kinds)  "  5,135

These, of course, are in addition to the specific results in common horses (4—$400); blooded horses (5—$2,500); common kine (3—$135), and blooded kine (7—$2,100), similarly aggregating 19 head, $5,135.

While only the specific or primary consolidations may be directly indicated in the columns headed D and C, obviously an unlimited variety of very valuable secondary and other combinations of this nature may be secured without any additional labor beyond the preliminary provision of generic register connections, as may be desired.

One great value of this automatic record of the classification, etc., which is believed to be entirely novel, arises from the fact that the set-up for the record is the same set-up which governs the performance of the operations, and the interlocking devices are such that the record cannot be made unless the extending, registering and combining mechanisms have fully performed their functions in accordance with the common set-up. The record is, therefore, one of actual mechanical accomplishment, and not merely of intention, or even of volitional accomplishment; so that the auditing of the record of data and operations is, in effect, an auditing of the results themselves. This general proposition is illustrated hereinafter in describing the clearance of a workman's register.

Although in its preferred form intended for double-entry time-accounting, and as such requiring a double set-up on the debit-credit keyboards, this system also permits a dummy set-up on either board, as temporary or permanent as may be desired, so that the simple entry of the workmen's numbers, first on the in-board and later on the out-board, is all that is necessary to secure full single-entry showings of all kinds, namely, net, total, synthetic,—single, successive intercurrent.

Without attempting to designate the scope of my invention as in the appended claims, I may remark that this application discloses:

1. Method and means for the mechanical ascertainment on the debit-and-credit principle, and the definite final indication, of the amount of time worked by an employee upon the simple registrations "in" and "out", respectively, of his workman's number, substantially as registered in the well-known employees' time registers (thus securing the mechanical nettation of time data for a single period);

2. Method and means for the mechanical ascertainment on the debit-and-credit principle, and the definite final indication, of the total time covered by a workman in a succession of periods, as for a week (thus securing the mechanical nettation of time data for a plurality of successive periods);

3. Method and means for the mechanical ascertainment on the debit-and-credit principle, and the definite final indication, of the total time covered by several workmen in a plurality of periods, wholly or partly intercurrent, for a half-day or for several days, upon the same simple registrations (thus securing the mechanical synthesization of a complex plurality of time data);

4. Method and means for translating time periods into money equivalents at a given rate, and for mechanically ascertaining and accounting wages by simple in and out registrations through the association in a definite and fixed relation of time and wage registers, a pair being assigned to each workman;

5. The method and means for automatically and mechanically translating time periods into money equivalents at a given rate, and mechanically ascertaining and accounting both time and wages by simple in and out registrations through the association in a definite and fixed relation of time and wage registers in pairs, there being one pair assigned to each workman;

6. The method and means for actuating each specific pair-member of registers by a clock, and for automatically combining the registrations of a plurality of such specific pairs with different ratios in one or more generic registers;

7. The automatic setting-up of the rate factor as a result of the manual setting-up of the workman's number; the automatic setting-up of the time factor, which is also the time element of the labor accounts; the automatic combination of these two factors to produce and set up the product, which is the wage element; the automatic entry of these time and wage elements in their respective specific registers assigned to the individual workmen; the automatic synthesization of such entries in specific registers, and in appropriate generic registers;

8. The optional volitional setting-up of the time factor in any case; the optional setting-up of the rate factor in any case other than where a workman is debited or credited; the necessary use of both factors in case of a workman's account; the necessary use of both factors in other cases, if either factor is used, as in a job-to-job entry; the optional use of these factorizing elements in cases not involving labor or job accounts;

9. The automatic extension and accounting of invoices (received and sent out);

10. The complex concurrent nettation, totalization and synthesization of multiplicands and associated products;

11. The method and means for producing an automatically harmonious journal record with mechanical indication of clearance, permitting, among other things, a systematic and complete audit of labor accounts, time, rate, total earnings, etc., from the consecutive journal entries;

12. The interlocking and interaction of the connecting and actuating means to secure these varied results;

13. The means requiring an alternation in the in and out registrations; and

14. The means for automatic setting after clearance.

It also discloses, as the complete and preferred embodiment, the mechanical counterbalancing of the wage or value entry in a workman's dual or duplex account with an equal but opposing value entry in some other account. Usually, this enforced counterbalance is between a workman's wage account and a job cost account, by means of which the exact cost value of the time which is credited to the workman as wages is charged against some particular job as labor cost, and preferably to some particular class of labor in such job. However, if no job is ready to receive such charge, the counterbalance may be made in a catch-all account, to be counterbalancingly distributed later. These counterbalancing entries may, but need not necessarily, include the time as well as the labor elements, though for simplicity of presentation only the latter are specified herein. Again, the enforced counterbalance may be between a wage account and the cash or pay-roll account, as hereinafter more particularly set forth. Thus the labor accounts are mechanically tied up and squared in with the cost accounts for the amount of wages earned on the one hand, and on the other with the financial accounts for the amount of wages paid.

The construction of the various mechanisms, their interconnection and coöperation are illustrated in the accompanying drawings, in which—

Figure $G^1$ is a diagrammatic representation of the various mechanisms employed in the system and shows in a general way their relations and coöperations. Fig. $K^1$ is a sectional view from front to back through the keyboard shown in Fig. $K^6$ of my co-pending application, Serial No. 333,658, filed September 7, 1906, showing the additional magnets by means of which the mechanical actuation of this board is brought about. Fig. $E^1$ is a sectional view of a multiplying device taken approximately along the plane 1—1, as designated in Fig. $E^2$. Fig. $E^2$ is a sectional view looking toward the left, taken along the plane 2—2, as designated in Fig. $E^1$. Fig. $E^3$ is a partial front view of the cams and associated mechanisms as mounted on the right end of the shaft which carries a number of axial cams. Fig. $E^4$ is a detail of a lock-out device. Fig. $N^1$ is a sectional view of a transposing connector taken along the plane 1—1, as designated in Fig. $N^2$. Fig. $N^2$ is a sectional view taken along the plane 2—2, as designated in Fig. $N^1$. Fig. MEN diagrammatically represents the mechanical interconnection of the master machine, the geared multiplier and the transposing connector. Fig. $L^1$ is a sectional view of a time connecting device taken approximately along the plane 1—1, as designated in Fig. $L^2$. Fig. $L^2$ is a sectional view taken along the plane 2—2, as designated in Fig. $L^1$. Fig. $L^3$ is a sectional view looking to the right, taken along the plane 3—3, as designated in Fig. $L^1$. Fig. $L^4$ is a sectional view taken along plane 4—4, as designated in Fig. $L^1$, showing the actuating electromagnet and its association with the time connecting parts. Fig. $R^1$ is a partial view of a register mechanism, showing especially its multiplying gears. Fig. $R^2$ is a sectional view looking toward the left from the plane 2—2, as designated in Fig. R¹, and shows especially the multiplying gears. Fig. R³ is a view of the connecting-in mechanism of an "alternating" register. Fig. R⁴ is a sectional view of the register connecting-in mechanism looking toward the left and taken along the plane 4—4, as designated in Fig. R³. Fig. R⁵ is a view of the connecting-in mechanism of an "alternating" register showing the parts in an actuated position. Fig. B¹ is a rear view of the register panel board so modified as to drive the panel counting shaft at various multiplied speeds. Fig. B² is a detail view of a mechanism associated with the counting shafts of the panel board and designed to bring them to rest in an exact angular position. Fig. B³ is a sectional view taken along the plane 3—3, as designated in Fig. B². Figs. C¹, C², C³, C⁴ and C⁵, when fitted together, show in skeleton the interconnection of the various mechanisms, their association, and their mode of operation. Fig. C¹ is a system circuit drawing relating especially to the journal mechanism. Fig. C² is a system circuit drawing relating especially to the debit and credit keyboards. Fig. C³ is a system circuit drawing relating particularly to the time and rate keyboards and the associated master machine, multiplier, transposer and time-connecting mechanism. Fig. C⁴ is a system circuit drawing relating especially to the wage keyboard. Fig. C⁵ is a system circuit drawing relating especially to the register connections and their associated controlling and connecting mechanisms. Fig. C⁶ is an enlarged and somewhat detailed drawing of the automatic switching mechanism for connecting in the registers, and especially discloses the action of the relays which recognize the characteristic of an entry and more or less automatically direct the keyboard actuation of the system. Fig. C⁷ is a detailed drawing of the connections from the time connecting device. Fig. C⁸ is a detailed drawing of the multiplying mechanism and its connection with the keyboard. Fig. L is a diagrammatic representation of several registers, so inter-related as to be especially applicable to time and cost accounting.

The empirical diagram of the system disclosed in Fig. G¹ is quite similar to that shown in the earlier application, Serial No. 413,875, filed February 1, 1908, but is modified to make it especially applicable to time and cost accounting. The registers R are placed in a panel board and are actuated by the master machine M$m$ directly or through the multiplying mechanism E associated therewith. N is a transposing connector, whose functions will subsequently be described. J is a journal mechanism upon which all entries are consecutively recorded. T is a typewriting machine associated with the journal mechanism, by means of which the various basic memoranda may be chronologically recorded. K$d$ is a debit keyboard, K$c$ is a credit keyboard, K$t$ a time keyboard, K$r$ a rate keyboard, K$w$ a wage keyboard, by means of which the system is controlled and actuated. These keyboards are connected with printing mechanism associated with the journal mechanism J, thus permitting a record of all keyboard actuations to be kept. S$d$ and S$c$ are automatic switching devices connected with and controlled by the debit and credit keyboards respectively. These automatic switching devices are provided with special additional connections for automatically controlling the rate keyboard in certain instances, as will be described later. C$c$ is a cross-connecting board interposed between the automatic connecting switches and the registers and also between the manual connecting board C$m$ and the registers. H$d$ and H$c$ are synchronous connectors associated with the debit and credit keyboards respectively. L is the time connector associated with the time keyboard K$t$. The subsequent description will disclose in detail the inter-relations and interaction of the various devices diagrammatically indicated in Fig. G¹.

The partial showing of the keyboard in section, Fig. K¹, discloses the addition of electromagnets K¹⁹⁸, to the keyboards K, described in my copending application, Serial No. 333,658, filed September 7, 1906, designed to automatically trip the individual keys when the electro-magnet windings become energized. This additional electro-magnetic mechanism is similar to that disclosed in my copending application, Serial No. 413,875, filed February 1, 1908, and in the system herein disclosed these automatic keyboard actuating or tripping magnets are applied not only to the keyboards controlling the connecting in of the registers but are also applied to the keyboards controlling the master machine or other register actuating mechanisms. Each electro-magnetic mechanism comprises an electro-magnet frame K¹⁹⁸ through which the armature stem K¹⁹⁹ passes, the said stem being interposed between the corresponding key stem K²⁵ and the corresponding key actuating member K²¹ of key head K⁵. Armature disk K²⁰⁰ secured to the stem section K¹⁹⁹ is attracted by the electro-magnet frame upon current passing through the corresponding winding. On energizing of any of the windings K²⁰¹ within the magnet frames, each key may be automatically depressed by its additional electro-magnetic mechanism in addition to its manual operation. In this system a geared multiplying mechanism is disclosed and it is generally designated by the reference character E.

This mechanism is contained in a casing $E^1$, $E^2$. Attached to the left side of the casing is the stub shaft $E^3$, upon which is mounted the driving gear $E^4$. This gear engages the pinion $E^5$ upon the shaft $E^6$ and is keyed thereto by means of the key $E^7$. The gear $E^4$ is designed to multiply the rotation of the pinion $E^5$ by ten. The shaft $E^6$ is mounted in bearings in each side of the casing and carries upon it several spur gears $E^8{}_1$, $E^8{}_2$, ... $E^8{}_9$, all keyed to the shaft by key $E^9$.

Paralleling the shaft $E^6$, and supported in bearings at each side of the casing is the shaft $E^{10}$. This shaft has mounted upon it several gears $E^{11}{}_1$, $E^{11}{}_2$, ... $E^{11}{}_9$, corresponding to the gears $E^8{}_1$, $E^8{}_2$, ... $E^8{}_9$. The gears $E^{11}{}_1$, $E^{11}{}_2$, ... $E^{11}{}_9$, are mounted and held upon the shaft $E^{10}$ by means of the key $E^{12}$ so that they must rotate with the shaft $E^{10}$ but may move laterally thereon. The gears on the shaft $E^{10}$ are paired with those on shaft $E^6$ and are adapted to be moved into and out of alinement therewith. One pair is always in engagement, thus never permitting the gearing connection between the shafts $E^6$ and $E^{10}$ to be broken.

Means are provided for selecting and for connecting in any pair of gears for service. Affixed to each of the gears $E^{11}{}_1$, $E^{11}{}_2$, ... $E^{11}{}_9$ is a collar containing a groove $E^{13}{}_1$, $E^{13}{}_2$, ... $E^{13}{}_9$. Each of these grooves is engaged by the fork upon the forward end of the levers $E^{14}{}_1$, $E^{14}{}_2$, ... $E^{14}{}_9$, there being a lever provided for each pair of gears. The rear end of these levers is fixed to rotate about the pins $E^{15}{}_1$, $E^{15}{}_2$, ... $E^{15}{}_9$, which are all fixed in the bar $E^{16}$, which is rigidly mounted in the casing. A pinion $E^{17}$ is mounted upon the right end of the shaft $E^{10}$ and keyed thereto by means of the key $E^{18}$. This pinion is in engagement with gear $E^{19}$, mounted upon the shaft $E^{20}$, and keyed thereto by means of the key $E^{21}$. Pinioned to the lower side and in about the center of each of the levers $E^{14}{}_1$, $E^{14}{}_2$, ... $E^{14}{}_9$, is a cam roller $E^{22}{}_1$, $E^{22}{}_2$, ... $E^{22}{}_9$, engaging in the cam slot $E^{23}{}_1$, $E^{23}{}_2$, ... $E^{23}{}_9$ of the cam sectors $E^{24}{}_1$, $E^{24}{}_2$, ... $E^{24}{}_9$. The cam sectors $E^{24}{}_2$, $E^{24}{}_3$, ... $E^{24}{}_9$ are rotatably mounted upon the shaft $E^{25}$, while cam sector $E^{24}{}_1$ is keyed to the shaft by key $E^{39}$, which shaft is parallel to the shafts $E^6$ and $E^{10}$, and is mounted in bearings in each side of the casing. Associated with each of the cam sectors $E^{24}{}_2$, $E^{24}{}_3$, ... $E^{24}{}_9$ is a catch sector $E^{26}{}_2$, $E^{26}{}_3$, ... $E^{26}{}_9$, keyed to the shaft $E^{25}$, no catch sector, however, being provided for cam sector $E^{24}{}_1$. In the lower periphery of each of the catch sectors is a latch slot $E^{27}{}_2$, $E^{27}{}_3$, ... $E^{27}{}_9$, the slot in each sector being adaptable for engagement with a catch projection $E^{28}{}_2$, $E^{28}{}_3$, ... $E^{28}{}_9$ on the upper edge of each of the levers $E^{29}{}_2$, $E^{29}{}_3$, ... $E^{29}{}_9$.

On the lower edge of each of these levers is a projection $E^{30}{}_2$, $E^{30}{}_3$, ... $E^{30}{}_9$, which projections rest against the front face of the bar $E^{31}$ when the levers are in their normal or inoperative position. The bar $E^{31}$ limits the lower position of the levers and also locks the inoperative levers during an actuation against being moved rearwardly. The rear end of each of these levers on its upper side is cut V shaped as shown at $E^{32}{}_2$, $E^{32}{}_3$, ... $E^{32}{}_9$, so as to readily pass through slots $E^{33}{}_2$, $E^{33}{}_3$, ... $E^{33}{}_9$ in the tube $E^{34}$ and between two of the balls or cylinders $E^{35}$ within the tube. The difference between the inside length of the tube and the total length of the balls or cylinders as arranged therein is equal to the thickness of the rear end of one of the levers $E^{29}{}_2$, $E^{29}{}_3$, ... $E^{29}{}_9$. It is thus obvious that if any one of the levers were pressed between any two of the balls or cylinders in the tube, all available space between the balls or cylinders would be taken up and a second lever would be prevented from being pushed between any two balls or cylinders. This locking arrangement is designed to allow not more than one of the levers $E^{29}{}_2$, $E^{29}{}_3$, ... $E^{29}{}_9$ to be in a raised position at one time.

The lower edge of each of the levers $E^{29}{}_2$, $E^{29}{}_3$, ... $E^{29}{}_9$ is adapted to be engaged by one of the rods $E^{36}{}_2$, $E^{36}{}_3$, ... $E^{36}{}_9$, each rod being an extension from the armature of one of the electro-magnets $E^{37}{}_2$, $E^{37}{}_3$, ... $E^{37}{}_9$. Energization of an electro-magnet causes its corresponding lever $E^{29}$ to be swung upwardly to carry its catch projection $E^{28}$ into the catch slot $E^{27}$ of the corresponding catch sector. Levers $E^{38}{}_2$, $E^{38}{}_3$, ... $E^{38}{}_9$ extend from cam sectors $E^{24}{}_2$, $E^{24}{}_3$, ... $E^{24}{}_9$ respectively and at the forward end of each of these levers is pinioned one of the levers $E^{29}{}_2$, $E^{29}{}_3$, ... $E^{29}{}_9$ by means of the pins $E^{40}{}_2$, $E^{40}{}_3$, ... $E^{40}{}_9$. In about the middle of each of the levers $E^{38}{}_2$, $E^{38}{}_3$, ... $E^{38}{}_9$ is an abutment pin $E^{41}{}_2$, $E^{41}{}_3$, ... $E^{41}{}_9$, which is engaged by one of the sector arms $E^{26}{}_2$, $E^{26}{}_3$, ... $E^{26}{}_9$. These abutment pins are provided so that all of the levers $E^{38}{}_2$, $E^{38}{}_3$, ... $E^{38}{}_9$ are always carried to normal position when the sector arms $E^{26}{}_2$, $E^{26}{}_3$, ... $E^{26}{}_9$ are rotated forwardly. A bar $E^{42}$ is fixed within the casing parallel to the shaft $E^{25}$ and in such a position that the front upper edge of all of the levers $E^{29}{}_2$, $E^{29}{}_3$, ... $E^{29}{}_9$ may be brought in contact with this rod upon upward rotation of the levers $E^{38}$, and thus caused to rotate about their pins $E^{40}{}_2$, $E^{40}{}_3$, ... $E^{40}{}_9$, and thus positively forcing the catches $E^{28}{}_2$, $E^{28}{}_3$, ... $E^{28}{}_9$ out of engagement with the catch slots $E^{27}{}_2$, $E^{27}{}_3$, ... $E^{27}{}_9$.

A lever $E^{43}$ carrying the cam roller $E^{44}$ is rigidly fixed to the left end of the shaft $E^{25}$, the cam roller $E^{44}$ engaging the cam $E^{45}$, this cam being mounted upon a stub shaft $E^{46}$ supported from the left side of the casing. Upon the hub of the cam $E^{45}$ is rigidly mounted the worm-gear $E^{47}$. A worm $E^{48}$ is rigidly mounted upon the shaft $E^{49}$ and engages the worm-gear $E^{47}$, the shaft being mounted in the bearings $E^{50}$ and $E^{51}$ which are attached to the casing.

Attached to the lower side of the lever $E^{43}$ is the arm $E^{52}$ and attached to the lower end of this arm and to the pin $E^{54}$ on the casing is a tension spring $E^{53}$, this tension spring tending to hold the cam roller $E^{44}$ tightly against the cam $E^{45}$ at all times. The rotation of the lever $E^{43}$ by means of the cam roller $E^{44}$ causes the lever $E^{52}$ and the shaft $E^{25}$ to rotate through a small angle, while the spring $E^{53}$ causes the reverse rotation of the levers and the shaft as the cam returns to its normal position.

A universal bar $E^{55}$ is placed in association with and above the levers $E^{14}_1$, $E^{14}_2$, ... $E^{14}_9$. A pin $E^{56}_1$ connects together the universal bar $E^{55}$ and the lever $E^{14}_1$, so that they must move together at all times. The pins $E^{56}_2$, $E^{56}_3$, ... $E^{56}_9$, extending upwardly from the levers $E^{14}_2$, $E^{14}_3$, ... $E^{14}_9$ engage in the slots $E^{57}_2$, $E^{57}_3$, ... $E^{57}_9$ in the universal bar. Normally these pins are in the left end of the slots. When one of the cam sectors $E^{24}_2$, $E^{24}_3$, ... $E^{24}_9$ is rotated, the engagement of its cam slot with its cam roller $E^{22}$ on the corresponding lever $E^{14}$ causes this lever to be moved to the left and the universal bar is pulled along with it by means of the pin $E^{56}$ of this lever engaging in the corresponding slot of the universal bar, which bar in turn moves the lever $E^{14}_1$ also to the left. The slots in the universal bar, however, permit all the other levers to remain in a normal position. This universal bar thus always causes motion to the left of lever $E^{14}_1$ whenever any one of the other levers is moved to the left, and in turn the lever $E^{14}_1$ when moved to the right will cause movement to the right of any of the other levers which may have been moved to the left from their normal position.

The cam slots $E^{23}_2$, $E^{23}_3$, ... $E^{23}_9$ each engages its associated cam roller upon both sides, thus being capable of moving the roller laterally in both a right and a left direction. The cam slot $E^{23}_1$, however, is designed to operatively engage its cam roller $E^{22}_1$ only upon the left side to enable it to drive its associated cam roller only to the right. The universal bar $E^{55}$ is the only means provided for moving the cam roller $E^{22}_1$ and its lever $E^{14}_1$ to the left. The slightly modified connection of the universal bar $E^{55}$ with the lever $E^{14}_1$ is made in order that the gears $E^8_1$ and $E^{11}_1$ may always be in alinement when none of the other pairs of gears are in alinement, and out of alinement when any one of the other pairs is in alinement. The desirability of this arrangement will be more fully disclosed in the description of the operation of this device. The cam sector $E^{24}_1$, containing the special cam slot $E^{23}_1$, is rigidly keyed to the shaft $E^{25}$ and rotates directly with it, upon every movement of the shaft, the other cam sectors, as before stated, being rotatably mounted on the shaft. Upon the lower edge of the lever $E^{14}_1$ is fixed the knife edged locking member $E^{58}$. The rear or knife edge of this locking member is designed to engage during operation of the mechanism either one or the other of the recesses $E^{59}$, $E^{60}$ in the front edge of the cam sector $E^{22}_1$. The functions of this will also appear more fully in the operation description which follows later.

The master machine which drives the multiplying mechanism is described in full detail in my first application, Serial No. 333,658, filed September 7, 1906. The counting shaft $M^{394}$ of the master machine is connected to the gear $E^4$ in the ratio of 1 to 1, while the shift shaft $M^{66}$ of the master machine is connected to worm shaft $E^{49}$ in the same ratio.

In the performance of a multiplication one of the factors which may contain several digits is set up upon the master machine and the other factor which in the mechanism as herein shown, may not be so large, is represented in the multiplying mechanism by the actuation of one of the magnets $E^{37}_2$, $E^{37}_3$, ... $3^{37}_9$. Upon operation of both the master machine and the multiplying mechanism the two factors are combined and their product is produced. The pairs of gears $E^8_1$—$E^{11}_1$, $E^8_2$—$E^{11}_2$, ... $E^8_9$—$E^{11}_9$, are the multiplying gears, and as shown in the drawing their actuating ratios are 1 to 1, 2 to 1, 9 to 1. Various ratios may be established by adjustment of the sizes of the pairs of gears. Any pair of these gears must be capable of being thrown into and out of alinement before and after any actuation of the mechanism. In other words, the teeth upon all pairs of multiplying gears must be in such a position at the end of any actuation that any other pair may be thrown into alinement. If the master machine counting shaft were directly connected to the shaft $E^6$, the number of teeth required upon all of the gears $E^8_1$, $E^8_2$, ... $E^8_9$ would be the least common multiple of all the ratios. To obviate the physical difficulties of such a combination the gears $E^4$ and $E^5$ intervene between the master machine counting shaft and the shaft $E^6$. The ratio of operation of these gears should be such that for the smallest operating increment received from the master machine the shaft $E^6$ will make one complete revolution, and for any larger increments of actuation the shaft $E^6$ will come to rest at the end of a number of completed revolutions. This condition is attained by the 1 to 10 ratio between gears $E^4$ and pinion $E^5$, the smallest increment of the master machine gear being 1/10th revolution. In the decimal system where fractions are not used it is obvious that the multiplying ratio between the gears $E^4$ and $E^5$ should be 1 to 10. With this arrangement, at all rest positions of the shaft $E^6$, the same diameter of all the gears $E^8{}_1$, $E^8{}_2$, ... $E^8{}_9$ will be always intersected by a plane passing through the axis of the shafts $E^6$ and $E^{10}$. This is also true of the same plane with reference to its intersection of a diameter upon each of the gears $E^{11}{}_1$, $E^{11}{}_2$, ... $E^{11}{}_9$, as these gears are always turned through a number of complete revolutions during any actuation. Consequently, the same meshing teeth upon each of the pairs of gears are always in the same angular position when the mechanism is at rest, and free to be thrown into mesh or out of mesh as the case may be. If it is desired to secure the multiplying produced only by the pairs of gears $E^8{}_1$—$E^{11}{}_1$, $E^8{}_2$—$E^{11}{}_2$, ... $E^8{}_9$—$E^{11}{}_9$, the dividing gears $E^{17}$ and $E^{19}$ are actuated in a ratio of 10 to 1, thus neutralizing the effect of the gears $E^4$ and $E^5$. The actuating ratio between the gears $E^{17}$ and $E^{19}$ in no way affects the operation of the multiplying mechanism. Employing the multiplying ratios as herein suggested for the pairs of gears $E^8{}_1$—$E^{11}{}_1$, $E^8{}_2$—$E^{11}{}_2$, ... $E^8{}_9$—$E^{11}{}_9$, a set of multiplication adaptable in time keeping may be secured by using a ratio of 1 to 2 between the gears $E^{17}$ and $E^{19}$. This would produce products coming from the shaft $E^{20}$, of 5, 10, 15, 20, 25, 30, 35, 40 and 45 times the set-up on the master machine.

To illustrate more fully the operation of the multiplying device, suppose that the multiplier is 5 and that the circuit for electro-magnet $E^{37}{}_5$ has been closed. This electro-magnet then raises its armature lever $E^{29}{}_5$, thereby carrying the latch $E^{28}{}_5$ of this lever into the locking slot $E^{27}{}_5$ in the catch sector $E^{26}{}_5$, which is keyed to shaft $E^{25}$. Normally the cam $E^{45}$ is in the position shown with the cam roller $E^{44}$ engaging in the recess of the cam, but not at the bottom thereof. When the master machine connected with the shaft $E^{49}$ finally becomes active, it first causes rotation of the cam in a clockwise direction while making an entry, and then in a counter-clockwise direction while returning to normal. During the first small arc of rotation of the cam, the cam roller is carried to the bottom of the recess in the cam by the force of the spring $E^{53}$ engaged with the arm $E^{52}$, which is secured to the shaft $E^{25}$. The slight rotation of the shaft $E^{25}$ thus caused is communicated first to the catch sectors $E^{26}$ and then through the pins $E^{41}$ to the levers $E^{38}$ connected with the cam sectors $E^{24}$. All the levers $E^{38}$ are then swung upwardly a distance sufficient to carry the front ends of the arms $E^{29}$ against the abutment rod $E^{42}$, and if any of the arms $E^{29}$ have become stuck or wrongfully held in their raised position, they will be thrown down to thus leave a clear field for the arm which has been selected for actuation. As the cam wheel rotates farther in the clockwise direction, the cam roller comes into engagement with the highest part of the cam and the shaft $E^{25}$ is rotated in the opposite direction to release the ends of the arms $E^{29}$ from the abutment rod $E^{42}$ and the selected electro-magnet $E^{37}{}_5$ is then free to carry the arm $E^{29}{}_5$ into firm locking engagement with the catch sector $E^{26}{}_5$. The rotation, therefore, of the shaft caused by the cam movements is transmitted through sector $E^{26}{}_5$, arm $E^{29}{}_5$, and lever $E^{38}{}_5$ to the cam sector $E^{24}{}_5$. The result is that lever $E^{14}{}_5$ is swung to the left and lever $E^{14}{}_1$ is also swung to the left by virtue of the universal bar $E^{55}$. Gears $E^8{}_1$ and $E^{11}{}_1$ are unmeshed and gear $E^8{}_5$ and gear $E^{11}{}_5$ are brought into mesh. The actuation thus far, all takes place during the first revolution of the screw shaft $M^{66}$ of the master machine connected with the worm shaft $E^{49}$. When arm $E^{29}{}_5$ was moved upwardly into locking engagement, its end $E^{32}{}_5$ came into engagement between a pair of balls or cylinders in the tube $E^{34}$, thus locking out against operation any of the other arms $E^{29}$. Also as the arm $E^{29}{}_5$ was carried bodily rearwardly upon rotation of shaft $E^{25}$, the locking projection $E^{30}{}_5$ moved into engagement with the top of the locking bar $E^{31}$ and the arm $E^{29}{}_5$ is thus held firmly in locking position independently of its electro-magnet. During operation of the master machine, each digit set-up thereon is multiplied by 5 in the multiplier. In other words, each revolution of gear $E^4$ is changed to five revolutions of gear $E^{19}$. When the master machine returns to its normal position, the cam $E^{45}$ is also returned and the cam roller $E^{44}$ just before again reaching its normal position rolls through the cam recess and the shaft $E^{25}$ is again given a slight reverse rotation so that the ends of arms $E^{29}$ are carried against the abutment rod $E^{42}$ so that all these arms are thrown out of locking engagement with the catch sectors and are restored to their normal positions. Before each actuation of the multiplying mechanism, therefore, the arms $E^{29}$ are all cleared from the cam sectors so that only the selected arm can be raised into locking position, and after each operation any raised arm is restored to its normal position to entirely clear the mechanism, and thereby prevent any false or improper operation.

As has already been described the cam sector $E^{24}{}_1$ is keyed to the shaft $E^{25}$ and therefore this cam sector always rotates upon rotation of the shaft. When cam sector $E^{24}_5$ is rotated, cam sector $E^{24}_1$ is also rotated and at the same time the arm $E^{14}_1$ is swung to the left by the universal bar. The pointed edge of locking member $E^{58}$ is, therefore, carried into alinement with the left slot $E^{60}$, thus assisting in locking the parts in position during actuation. It is unnecessary to associate an electro-magnet with the cam sector $E^{24}_1$, and therefore, when no special set-up is made in the multiplying mechanism, the 1 to 1 ratio remains. Shaft $E^{25}$ will, of course, be rotated, but as the cam slot $E^{23}_1$ is designed to operatively engage its cam roller $E^{22}_1$ only upon the left side, there is no movement of clutch arm $E^{14}_1$ or any other arm, and gears $E^8_1$ and $E^{11}_1$ therefore remain in mesh, while the cam sector $E^{24}_1$ is rotated with the shaft $E^{25}$, its locking slot $E^{59}$ is carried to receive the pointed edge of locking member $E^{58}$ carried on the under side of arm $E^{14}_1$, and then lock this arm against displacement, and thereby prevent disengagement of the 1 to 1 gears.

In the multiplying mechanism described only nine pairs of multiplying gears are used and the multiplying factors 1 to 9 are available. By using a plurality of multiplying mechanisms and a plurality of selecting electro-magnets, a greater number of multiplying factors can be provided for, this being diagrammatically illustrated in Fig. MEN. Thus to obtain the desired multiplier, two or more factors are selected by means of the electro-magnets which are automatically connected together to produce the desired multiplier, and instead of having an electro-magnet for each multiplier, a small number of electro-magnets will suffice for a greater number of multipliers whose factors can be selected. This multiplying mechanism may be placed between the master machine and the panel shafts of the register panel board, and mechanically connected therewith. The interrelation of the multiplying mechanism with the other parts of the system and circuits will be more clearly shown in the description of the circuits and general operation.

The mechanism provided for automatically actuating the time keyboard $Kt$ is generally designated by the reference character L. It consists of several commutators connected with actuating mechanism and about which are revolved brushes controlled by clock mechanism. The mechanism is contained in the casing $L^1$ and $L^2$. In the right side of the casing is secured the end bushing $L^3$ by means of a nut $L^4$. At the left of this bushing and telescoped with it is a bushing $L^{5a}$. Immediately at the left of this second bushing and telescoped with it is a bushing $L^{5b}$, and at the left and succeeding this third bushing and telescoped with it is a bushing $L^{5cd}$. This fourth bushing is telescoped with the left end bushing $L^6$, which is locked to the left side of the casing by means of a nut $L^7$. A units order wheel $L^{8a}$ is mounted upon the right end of the bushing $L^{5a}$. A tens order wheel $L^{8b}$ is mounted upon the right of the bushing $L^{5b}$, and a hundreds and thousands order wheel $L^{8cd}$ is mounted upon the right end of the bushing $L^{5cd}$. The bearings $L^9$ and $L^{10}$ in the right and left sides of the casing respectively, support the shaft $L^{11}$. Directly mounted upon the shaft $L^{11}$ is a driving spur gear $L^{12}$ in mesh with the units order wheel $L^{8a}$. The carrying wheels $L^{13a}$ and $L^{13b}$ are rigidly attached to the left sides of the units and tens order wheels $L^{8a}$ and $L^{8b}$ respectively. These carrying wheels are in alinement with the intermittent gears $L^{14a}$ and $L^{14b}$, and are actuated by the carrying teeth $L^{15a}$ and $L^{15b}$ respectively. Upon the hubs of the intermittent gears $L^{14a}$ and $L^{14b}$ are mounted the spur gears $L^{16b}$ and $L^{16cd}$ respectively. The intermittent gear $L^{14a}$ and the spur gear $L^{16b}$ constitute the carry-over member from the units numeral wheel to the tens numeral wheel. The intermittent gear $L^{14b}$ and the spur gear $L^{16cd}$ constitute the carry-over member from the tens numeral to the hundreds and thousands numeral wheel. The carry-over members are free to rotate upon the shaft $L^{11}$ and are held in their proper places upon this shaft by means of the bushing $L^{17}$. Brush holders $L^{18a}$, $L^{18b}$, and $L^{18cd}$ containing brushes $L^{19a}$, $L^{19b}$, and $L^{19cd}$ are mounted upon the carrying wheels $L^{13a}$, $L^{13b}$, and $L^{13cd}$ respectively. Immediately at the left of the units numeral wheel is a commutator composed of twenty segments $L^{20a}$, and supported in the insulation $L^{21a}$, mounted on bushing $L^{5a}$. Immediately at the left of the tens order numeral wheel is a commutator composed of twenty segments $L^{20b}$ supported in the insulation $L^{21b}$, mounted on bushing $L^{5b}$, and immediately at the left of the hundreds and thousands order numeral wheel is a commutator composed of twenty-four segments $L^{20cd}$ and supported in the insulation $L^{21cd}$, mounted on bushing $L^{5cd}$. The commutators are held in place by means of the washers $L^{22a}$, $L^{22b}$, and $L^{22cd}$. Through each of the tubular bushings upon which the commutators are mounted are sets of openings $L^{23a}$, $L^{23b}$, and $L^{23cd}$, through which the wires connecting with each segment of the commutators pass. Upon the right side of each of the numeral wheels is fixed a rim $L^{24a}$, $L^{24b}$, and $L^{24cd}$, upon which are mounted figures indicating the position of the commutator brushes corresponding to the time of day. The figures carried by each numeral wheel may be seen through the openings $L^{25}$ in the casing. This mechanism, so far described, is constructed similarly to the ordinary counting mechanism, with the addition of commutator and brush mechanism associated with each numeral wheel. The units order numeral wheel is rotated by means of the spur gear $L^{12}$ and upon the right end of the hub of this gear is mounted a ratchet wheel, $L^{26}$. Mechanism is provided in association with this ratchet wheel, whereby the electromagnet, $L^{27}$, may produce rotation. The armature of the magnet connects with the rod, $L^{28}$, to which is fixed a stop collar, $L^{29}$. This collar, upon coming into contact with the front end of the magnet, limits the rearward movement of the armature rod. The front end of the armature rod $L^{28}$ is connected by means of the link $L^{30}$, with the lower end of the lever $L^{31}$, which is free to rotate forward and back upon the shaft $L^{11}$. A ratchet pawl $L^{32}$ is pinioned to the top end of the lever $L^{31}$ and designed to engage the ratchet wheel $L^{26}$. This ratchet pawl carries the weighted extension $L^{33}$ which tends to hold the pawl in engagement with its ratchet wheel. A spring $L^{34}$ attached to the casing also tends to force the pawl into contact with the ratchet wheel, as shown in Fig. $L^{4}$. A tension spring $L^{35}$ connects between the lower end of the lever $L^{31}$ and the hook $L^{36}$ in the bushing $L^{3}$, and moves the armature of the magnet $L^{27}$ and the lower end of the lever $L^{31}$ into their forward position when the electro-magnet is not energized. Upon the magnet being energized, it overcomes the force of the spring and draws its armature and connected mechanism rearwardly, thereby rotating the ratchet wheel $L^{26}$ sufficiently to move the brush $L^{26a}$ from one commutator segment to the next, by means of the connected gearing. This time connecting mechanism just described may be controlled by any ordinary clock having contact mechanism which makes and breaks contact every 1/100th of an hour so that the electro-magnet $L^{27}$ included in circuit with the contact mechanism is actuated every 1/100th of an hour or 100 times each hour. In the particular construction of time connecting mechanism shown, the ratchet wheel $L^{26}$ has five teeth and is moved 1/5th of a revolution for every actuation of the electromagnet $L^{27}$ or, in other words, this ratchet makes 1/5th revolution every 1/100th hour. The drive pinion $L^{12}$ has fifteen teeth and being secured to ratchet wheel $L^{26}$, it will also make 1/5th revolution every 1/100th hour, or one revolution every 1/20th hour. The units order wheel $L^{8a}$ has sixty teeth, and being engaged to pinion $L^{12}$ will make 1/20th revolution every 1/100th hour or one revolution every 1/5th hour. The units carrying wheel $L^{13a}$ has two teeth and being secured to the units wheel will make 1/2 revolution every 1/10th hour. The carry-over wheel $L^{14a}$ has five notches and will be rotated 1/5th revolution for every 1/2 revolution of the units carrying wheel, or, in other words, it will make 1/5th revolution every 1/10th hour, or one revolution every 1/2 hour. The carry-over gear $L^{16b}$ has fifteen teeth and being secured to rotate with the carry-over wheel $L^{14a}$, it also will make 1/5th revolution every 1/10th hour. The tens order wheel has sixty teeth and being engaged by the carry-over gear, it will make 1/4th revolution every 1/2 hour or 1/2 revolution each hour, which is equivalent to 1/20th revolution each 1/10th hour. The tens carrying wheel has two teeth and being secured to the tens order wheel will also rotate 1/20th revolution each 1/10th hour. The carry-over wheel $L^{14b}$ has five notches and will, therefore, rotate 1/5th revolution each hour. The carry-over gear $L^{16cd}$ has fifteen teeth and being secured to the carry-over wheel $L^{14b}$, will also rotate 1/5th revolution each hour, or one revolution every five hours. The hundredths and thousandths wheel has seventy-two teeth, and being geared with gear $L^{16cd}$, which rotates 15/72nds revolutions every five hours, it will rotate 1/24th revolution each hour, or, in other words, this hundredths and thousandths wheel makes one revolution every twenty-four hours.

The commutators associated with the units and tens order numeral wheels are each divided into twenty segments, while the commutator associated with the hundreds and thousands order numeral wheel is divided into twenty-four segments. Each of the carrying gears $L^{13a}$ and $L^{13b}$ have two carrying teeth $L^{15a}$ and $L^{15b}$ placed diametrically opposite each other on their carrying wheel, thus carrying from the units order to the tens order and from the tens order to the hundreds and thousands order occurs twice during each revolution of the units and tens order numeral wheels. In the units and tens order commutators the segments diametrically opposite each other in the same commutator are electrically connected together, as will be shown later. This arrangement is the equivalent of having only ten segments in the units and tens order commutators. The hundreds and thousands orders are combined in one numeral wheel and one commutator, as the highest number required for hours is twenty-four. The hundreds and thousands order numeral wheel makes one complete revolution in twenty-four hours, if the cycle of operations of the time connecting mechanism is repeated over and over each day. For some purposes it may be desirable to have the time indicator mechanism run continuously for very long periods without repeating. This may be accomplished by modifying the connector so that its operation is identical with an ordinary counter and by supplying a larger number of order numeral wheels and commutators. The principal essential of the connector is that at any instant it makes connections representative of the present time, and whether the range of its mechanism is twenty-four hours, a year, or much longer, in most cases may be immaterial; however, for ordinary factory time keeping a twenty-four hour range may be quite suitable. The association and connection of the time indicator mechanism with the other mechanism will be more fully disclosed in a subsequent description.

In the time keeping system herein disclosed five keyboards are employed, and it is desirable to provide for the mechanical actuation of as many of the keyboards as possible. The wage keyboards $Kw$ is a product board and should have set up upon it the product of the time keyboard $Kt$ and the rate keyboard $Kr$. This product is produced mechanically by means of the master machine and multiplying mechanism, and in order to automatically transfer the products to the wage keyboard $Kw$, a transposing connector, generally designated by reference character $N$, is provided. The transposing mechanism is contained in a casing $N^1$ and $N^2$. A threaded shift shaft $N^3$ is mounted in the bearings $N^4$ and $N^5$ on each side of the casing and connected to the threaded shift shaft $M^{66}$ of the master machine so as to operate in a ratio of 1 to 1. A forked framing $N^6$ is mounted upon and in threaded engagement with the shaft $N^3$, and in the fork of this framing is a driving spur gear $N^7$, which gear may move longitudinally along shaft $N^8$, but which is caused to rotate with the shaft by means of the key $N^9$. The driving gear $N^7$ is moved in step with the master machine and consecutively into engagement with the numeral wheels $N^{10a}$, $N^{10b}$, ... $N^{10h}$, which are mounted on shaft $N^{11}$, which is parallel to shaft $N^8$. Rigidly secured to these numeral wheels are the ten tooth slotted intermittent gears $N^{12b}$, $N^{12c}$, ... $N^{12h}$, the wheels on shaft $N^{11}$ being all held in their proper place between the bearings $N^{13}$ and $N^{14}$ by the collars $N^{15}$ and $N^{16}$.

In engagement with the numeral wheels $N^{10a}$, $N^{10b}$, ... $N^{10h}$, are the gears $N^{17a}$, $N^{17b}$, ... $N^{17h}$ respectively, all mounted on the shaft $N^{18}$ and held in their proper position by means of the collars $N^{19}$ and $N^{20}$. Fixed to these gears are the one tooth carrying gears $N^{21a}$, $N^{21b}$, ... $N^{21g}$. Upon revolving the spur gear $N^{10a}$ one complete revolution, it revolves the spur gear $N^{17a}$ one revolution, and the attached one tooth carrying gear $N^{21a}$ engages the ten tooth intermittent gear $N^{12b}$ and revolves it 1/10th of a revolution, thereby carrying one unit into the tens order. Each order carries into the immediately succeeding higher order in a similar manner. All wheels of the mechanism are held in their proper location when not actuated and are prevented from overthrowing by means of detent wheels $N^{22a}$, $N^{22b}$, ... $N^{22h}$, being engaged by detent rollers $N^{23a}$, $N^{23b}$, ... $N^{23h}$ respectively. These detent rollers are mounted upon the arms $N^{24a}$, $N^{24b}$, ... $N^{24h}$, pivoted upon the rod $N^{25}$, and are held in tension against the detent wheels by means of the tension springs $N^{26a}$, $N^{26b}$, ... $N^{26h}$ respectively, the detent wheels $N^{22a}$, $N^{22b}$, ... $N^{22h}$, being secured to the gears $N^{17a}$, $N^{17b}$, ... $N^{17h}$, respectively. In engagement with each of the numeral wheels $N^{10a}$, $N^{10b}$, ... $N^{10h}$, are the gears $N^{27a}$, $N^{27b}$, ... $N^{27h}$, carrying brushes $N^{28a}$, $N^{28b}$, ... $N^{28h}$ respectively. These brushes which are carried in brush holders $N^{29a}$, $N^{29b}$, ... $N^{29h}$, mounted upon the gears by means of the bolts $N^{30a}$, $N^{30b}$, ... $N^{30h}$, are held against their respective commutators $N^{31a}$, $N^{31b}$, ... $N^{31h}$ by means of the tension springs $N^{32a}$, $N^{32b}$, ... $N^{32h}$. The commutators and various gears associated with them are mounted upon telescopic bushings $N^{33}$ provided with openings for the wires connecting with the commutator segments as shown in the time connecting mechanism, or in any other suitable manner. In each of the order numeral wheel members is placed a ratchet pawl $N^{34a}$, $N^{34b}$, ... $N^{34h}$, pinioned by means of the pins $N^{35a}$, $N^{35b}$, ... $N^{35h}$ respectively. These ratchet pawls are held against the shaft $N^{11}$ by means of their respective springs $N^{36a}$, $N^{36b}$, ... $N^{36h}$, and may engage the slot $N^{37}$ in the shaft $N^{10}$. This shaft $N^{11}$ and its slot, and the ratchet pawls are provided to erase the setting of the numeral wheels when the shaft $N^{11}$ is revolved one complete revolution in the direction shown by the arrow. One revolution of this shaft will cause the slot $N^{37}$ to engage the ratchet pawl of each numeral order number and thus carry all numeral order members into their normal or zero position. Erasure at the end of each actuation of the transposing connector may be secured by connecting the shaft $N^{11}$ in a ratio of 1 to 1 with the shaft $M^{122}$ of the master machine. In the actuation of this device, the screw shaft $N^3$ is revolved one revolution, thus moving the gear $N^7$ into alinement with gear $N^{10a}$. The shaft $N^8$ carrying the gear $N^7$ is then rotated to drive the numeral gear $N^{10a}$ through any whole number of tenths of a revolution, and if the gear $N^{10a}$ is revolved more than 9/10ths of a revolution, it carries into the higher order numeral gear $N^{10b}$. Upon completion of the actuation of the units order wheel, the shift shaft $N^3$ may make another complete revolution and carry the driving gear $N^7$ into alinement with the tens order numeral wheel $N^{10b}$, when upon actuation of the count shaft $N^8$ the entry is made in the tens order numeral wheel. This actuation may be carried on consecutively for all order numeral wheels, and upon completion of the actuation for any given entry, the count shaft $N^8$ is no longer revolved and the threaded shift shaft $N^3$ is reversed in direction of rotation and carries the driving gear $N^7$ to the left, into its normal rest position as shown in the drawing. To erase at the end of an entry, the shaft $N^{11}$ is revolved one revolution, thereby restoring to normal and clearing the transposing connector mechanism before a second entry is made.

When the transposing connector is used in association with the multiplying mechanism disclosed in this application, the count shaft $N^8$ is geared to the shaft $E^{20}$ of the multiplying mechanism in a ratio of 1 to 2; this ratio of 1 to 2 being required as the driving gear $N^7$ is one-half the diameter of the order numeral wheels $N^{10a}$, $N^{10b}$, ... $N^{10h}$. This transposing connector separates the entry into its order digits and so analyzes it that the digits representative of the value of any entry are represented by the position of the brushes upon the commutator segments. Inter-relation and inter-connection of this mechanism with the other mechanisms of the system will be more completely disclosed in a subsequent description.

In the employment of this system for keeping workmen's time, it is desirable to have the mechanism as far as possible proof against both erroneous and false entries. In recording time the entry receiving device under normal actuation must receive an "in entry" followed by an "out entry" and vice versa. The connecting in mechanism of the registers employed for the keeping of workmen's time in this system is modified from that shown in the earlier applications referred to, as disclosed in the drawings herein, Figs. $R^3$, $R^4$ and $R^5$.

The required alternation between debit and credit entries or the equivalent is secured by applying to each register an alternating connecting mechanism. The modified and additional mechanism producing what may be termed an "alternating" register is attached to, and interposed between the connecting in electro-magnet $R^{59}$ and the rod $R^{60}$ of the register mechanism shown in the earlier applications. The magnet $R^{59}$ is polarized and so designed that upon being connected debitingly its armature rod $R^{260}$ is attracted forwardly, and upon being creditingly connected, its armature is attracted rearwardly. A link $R^{261}$ connects the armature rod with the rear arm of the bell crank $R^{262}$. This bell crank is mounted to rotate about the pin $R^{263}$ which is rigidly fastened in the framing plate $R^{122}$. A pin $R^{264}$ extends downwardly from the front arm of the bell crank $R^{262}$ and engages in a slot $R^{265}$ in the cam sector $R^{266}$. This cam sector rotates about the pin $R^{263}$ and contains the cam slot $R^{267}$. This cam slot is in the form of a double curve and contains at its center the smaller radius curve $R^{268}$. A pin $R^{269}$ attached to the rear end of the rod $R^{60}$, extends upwardly into the cam slot $R^{267}$. The right and left halves of the cam slot are symmetrical and the curves of the slot are so designed that when the cam sector $R^{266}$ is in either its extreme right or extreme left position, the rod $R^{60}$ is in its rearward position, and when the cam sector is in a central position, this rod is moved into its forward position. The front and rear edges $R^{270}$ of the rear arm of the bell crank $R^{262}$ form cam surfaces. A link $R^{271}$, connected with the arm $R^{70}$ by means of the pin $R^{133}$, connects with a lever $R^{272}$, which is fixed at its forward end to rotate about the pin $R^{273}$ fixed in the framing plate $R^{122}$. Upon the rear end of this arm $R^{70}$ is fixed the cam roller $R^{274}$, which, upon actuation of the register, is moved to the right into engagement with either the front or the rear cam surface $R^{270}$ of the bell crank $R^{262}$, depending upon the debit or credit nature of the entry being made in the register.

Fig. $R^5$ shows the position of the various lever mechanisms while an entry is being made, the mechanism as shown in Fig. $R^3$ being in position for receiving an entry, which requires a forward movement of magnet $R^{59}$. Upon energizing the magnet $R^{59}$, its armature moves forward and turns the bell crank $R^{262}$ in a counter clockwise direction, and the pin $R^{264}$, coming into engagement with the right end of the slot $R^{265}$, carries with it and rotates the cam sector $R^{266}$ in the same direction until the cam curve $R^{268}$ comes into engagement with the pin $R^{269}$. During this initial rotation of the cam sector $R^{266}$, the rod $R^{60}$ has been moved forward sufficiently to move the clutch member $R^{53}$ into engagement with the register screw shaft $R^7$. The magnet can rotate the bell crank and cam sector no farther until the screw shaft has nearly completed its first revolution which occurs when the register begins to be operated by means of the master machine. The rear arm of the bell crank $R^{262}$ is already moved sufficiently forward to permit the cam roller $R^{274}$ to engage its rear cam surface $R^{270}$ when the roller is moved to the right upon rotation of lever $R^{70}$. During the first revolution of the screw shaft $R^7$, the block $R^{64}$, interposed between the front end of the rod $R^{60}$ and the rear of the clutch member $R^{53}$, is moved to the left away from the rod $R^{60}$, thus permitting this rod to be moved further forward. This normally would be accomplished by the magnet $R^{59}$, for while energized, it would continue to move its arm forward and consequently rotate both the bell crank and the cam sector to the extreme right position to restore the rod $R^{60}$ to normal position. In order to insure movement of the cam to its extreme position, whether the magnet $R^{59}$ remains energized or not, the cam roller $R^{274}$, toward the end of the first revolution of the screw shaft $R^7$, is moved into engagement with the rear cam surface $R^{270}$, and, both the bell crank $R^{262}$ and the cam sector $R^{266}$ are moved mechanically the maximum amount. The position of the various levers after such an actuation is shown in Fig. $R^5$. Upon the entry in the register being completed, the levers $R^{70}$ and $R^{272}$ are moved to the left and come to rest in the position indicated in Fig. $R^3$, but the alternating link mechanism remains thrown in its extreme counter-clockwise direction as shown in Fig. $R^5$. The next succeeding entry in the register must be made in an opposite direction and the magnet $R^{59}$ must be so energized as to attract its armature rearwardly. The bell crank $R^{262}$ is rotated clockwisely, first bringing the pin $R^{264}$ into contact with the left end of the slot $R^{265}$, and then carrying with it the cam sector $R^{266}$ until the cam curve $R^{268}$ engages the pin $R^{269}$. During this movement the rod $R^{260}$ has been moved forwardly and carried with it the members $R^{64}$ and $R^{53}$, causing engagement of $R^{53}$ with the screw shaft $R^7$. No further movement of the cam sector $R^{266}$ is possible until rotation of the screw shaft has begun and the block $R^{64}$ has been moved from between the front end of the rod $R^{60}$ and the rear of the clutch member $R^{53}$. Upon this taking place, and the cam roller moving to the right, it engages the front cam surface $R^{270}$ of the bell crank $R^{262}$, and mechanically insures a maximum clockwise rotation of the bell crank $R^{262}$ and the cam sector $R^{266}$, thus causing the bell crank and the cam sector and members directly connected therewith to take up the position indicated in Fig. $R^3$. As the cam sector $R^{266}$, when in its extreme right or left position, does not cause engagement between the clutch member $R^{53}$ and the screw shaft $R^7$, it is obvious that an attempted entry in the direction of the last entry will be unavailing and that only an entry of an opposite nature can cause connection in and actuation of the register. The uses of this arrangement are more fully taken up in other parts of this specification.

In the description of the multiplying mechanism herein disclosed, and generally designated by the reference character E, attention is called to the fact that the range of multiplication could be extended by increasing the number of pairs of gears $E^8_1$—$E^{11}_1$, $E^8_2$—$E^{11}_2$, ... $E^8_9$—$E^{11}_9$, or by varying the operating ratio between the gears $E^{17}$ and $E^{19}$ or by using several pairs of such gears of varying ratios. It is not essential for all purposes that the various ratios securable by various pairs of gears $E^{17}$ and $E^{19}$ be located in immediate association with the multiplying mechanism. They may be placed in direct association with the various registers or with the various panel shafts, and even for some purposes gears directly in association with the panel shafts or registers or a combination thereof may serve in place of the multiplying mechanism, and for certain purposes a combination of all arrangements may be most advantageous. Figs. $R^1$ and $R^2$ show a modified form of register mechanism having multiplying gears attached thereto. A spur gear $R^{275}$ is attached directly to the gear $R^{15}$, being rotated thereby and in engagement with the spur gear $R^{276}$. The gear $R^{276}$ is supported upon the pin $R^{277}$ and has attached to it and mounted upon its hub a spur gear $R^{278}$, which is in engagement with the spur gear $R^{279}$. The gear $R^{279}$ is rigidly fixed to the tubular shaft $R^{14}$, while the gear $R^{15}$ rotates freely around this shaft. It is obvious that this train of gears may be so designed as to either multiply or divide the revolutions of the gear $R^{15}$ by those of the shaft $R^{14}$.

Fig. $B^1$ shows a modification in the ratio of the gearings $B^{13}$, $B^{14}$ and $B^{15}$, connecting the vertical counting shaft $B^9$ with the various horizontal counting shafts $B^{16}$, and the further variation in the ratio of the gearings $B^{10}$ and $B^{11}$ connecting the vertical counting shaft $B^9$ with the main driving counting shaft $B^{12}$. Various ratios between these pairs of gears may be adopted to cause the desired register actuation.

Figs. $B^2$ and $B^3$ show in detail an angular alining mechanism designed to take up the lost motion of the mechanism actuating the counting shaft $B^{12}$. Mounted upon one of the shift shafts $B^{24}$ is an eccentric $B^{38}$, carrying an eccentric strap and rod $B^{39}$ and $B^{40}$, which is attached by means of the pin $B^{41}$ to the sliding rod $B^{42}$. This sliding rod $B^{42}$ is held in guides $B^{43}$ and $B^{44}$ and its lower end is pointed and so designed that upon being moved downwardly it will fit into one of the slots $B^{45}$ in the star wheel $B^{46}$. This star wheel is adjusted to and rigidly attached to the shaft $B^{12}$ by means of the set screws $B^{47}$ or an equivalent. When the sliding rod $B^{42}$ is moved to its lowest position its lower end snugly fits into one of the slots of the star wheel and causes it to come into an exact angular position. The shift shaft $B^{24}$ makes one complete revolution after each actuation of the counting shafts $B^{12}$ and $B^{16}$, and thus tends to cause angular alinement of the counting shafts. This angular alining mechanism or an equivalent can be used directly upon each register or other parts of the mechanism if desired.

The general circuit arrangement in this system is similar to that shown in the earlier applications referred to, there being various modifications and additions to adapt the system to include the additional mechanisms already described. A skeleton of the complete circuit connections for the system is spread over Sheets $C^1$ to $C^5$. There are five keyboards, $Kd$, $Kc$, $Kt$, $Kr$ and $Kw$, arranged and operable in the order named. First will be shown the keeping of time and the determination and accounting of wages, which becomes a very simple matter by means of this system. If a workman is put to work, the operator needs only to set up a number on either the debit or credit board, which number is representative of the workman, and the connecting mechanism actuated by this member controls means for automatically setting up on the rate keyboard the particular rate at which the workman is paid. The operator also sets up on the other register connecting keyboard a number representative of the register employed for recording the time put upon the particular job to which the workman is assigned. When the workman's number and the job number have been set up on the debit and credit keyboards, the time connector, which has already been described, becomes effective to automatically set up on the time keyboard the time when the man makes a registration. The result of an "in" and an "out" registration is that the total time the man has spent between the beginning and leaving registrations is multiplied by his rate and of course, equals his wages for that length of time. In general the arrangement is such that the time keyboard, acting through the master machine, sets up the time factor in the master machine $Mm$ which has already been described in my earlier applications, and the rate keyboard connected with the multiplier sets up the rate factor in the multiplier E, which has already been described in this application, while the two mechanisms coöperate to unite these factors to produce the wage element. This wage element upon being produced is carried into the transposer N, which also has been described, and which automatically controls the actuation of the wage keyboard to set up thereon the wage element, and this wage keyboard in turn controls mechanism for indicating and printing on the journal the wage element. Thus in simple time keeping, at each entry it is necessary only for the operator or the workman himself to set up, either on the debit or credit board, at the time he begins and at the time he leaves work, the number of the register unit assigned to recording his time in hours and wages and the time and wages for his working period will be recorded in the register unit, while the time and wage data representative of the beginning and the ending of the period will be visually indicated before the operator and printed in the journal. If the workman's time is to be charged to the particular job to which he is assigned, it is further necessary for equivalent entries to be made in the register assigned to recording the work put on the particular job.

In "routine time accounting" the operator upon making the usual preliminary notations and identification references in the journal or basic record sheet, actuates the electro-magnet relay $C^{23}$ and closes the following circuit: from battery wire $C^7$, conductor $C^{26}$, contacts $C^{18}$—$C^{17}$, conductor $C^{27}$, upper coil $K^{33d}$ of board $Kd$, through contacts $K^{71d}$—$K^{69d}$—$K^{70d}$ and conductors $C^{29d}$ and $C^{30d}$ to battery wire $C^6$. This circuit causes unlocking of the debit keyboard, as explained in the prior applications referred to, and the operator may then set up on this board the number representative of a workman. This set-up results in closure of circuits through the electro-magnetic switch sections which select from the register mechanisms R the one corresponding to the number set up on the keyboard. The register selected should be of the group connected to automatically actuate the rate keyboard, that is, the set-ups representative of a workman's individual time register should control the circuits through the electro-magnetic selecting parts which control the electro-magnets $K^{198r}$ associated with the rate keyboard. The operator must then select a register for receiving and keeping the time of the particular job upon which the workman is engaged. The number of the desired register is set up on the credit keyboard and the register selected must be one of the group of registers set aside for receiving entries of this kind. The drawings, Fig. $C^6$ especially, show selective circuits and relays which are so associated with the several classes of registers that they recognize the characteristic of any entry and automatically direct the keyboard actuation.

As shown diagrammatically on Sheet $C^5$, zero contacts of the debit and credit keyboards are normally closed and the following circuit is closed: From battery wire $C^6$, conductor $C^{111}$, zero contacts of the units order of the credit keyboard, conductor $C^{112}$, zero rank coil of the units-tens primary section $Sc^1$, the common conductor $C^{113}$, the zero file coil of the same section, conductor $C^{114}$, zero contacts of the tens order, thence through conductor $C^{115}$, through the zero contacts of the hundreds order, conductor $C^{116}$, the zero rank coil of the hundredths-thousandths primary section $Sc^2$, the common conductor $C^{117}$, the zero file coil of the same section, conductor $C^{118}$, to the zero contacts of the thousandths order, and then through corresponding conductors and rank and file coils of the units-tens and hundredths-thousandths primary sections $Sd^1$ and $Sd^2$ respectively, associated with debit keyboard, and through conductor $C^{127}$ to battery wire $C^7$. The unit switches $S^7_0$ at the intersection of these normally energized rank and file coils of the primary sections have their contacts closed and the following circuit is established: from battery wire $C^6$, through conductors $C^{111}$, $C^{128}$, and $C^{129}$, through the unit switch $S^7_0$ of the units-tens primary credit board section, through conductor $C^{130}$, through the zero rank coil of the secondary section $Sc$, through winding $C^{131}$ of relay $C^{25}$, through conductor $C^{132}$, through winding $C^{308}$, of relay $C^{309}$, through conductor $C^{132j}$, through the zero file coil of the credit secondary section, through winding $C^{133}$ of relay $C^{25}$, through unit switch $S^7_0$ of the hundredths-thousandths primary section, through conductor $C^{134}$, through winding $C^{135}$ of relay $C^{25}$, conductor $C^{136}$, winding $C^{137}$ of relay $C^{110}$, through windings $C^{138}$ and $C^{139}$ of relay $C^{140}$, through conductor $C^{141}$, through units switch $S^7_0$ of the units-tens primary section of the debit board, conductor $C^{143}$, zero rank coil of the secondary debit section $Sd$, through winding $C^{144}$ of relay $C^{24}$, conductor $C^{145}$, winding $C^{304}$ of relay $C^{305}$, winding $C^{306}$ of relay $C^{307}$, conductor $C^{145j}$, zero file coil of section $Sd$, winding $C^{146}$ of relay $C^{24}$, units switch $S^7_0$ of primary section $Sd^2$, conductor $C^{147}$, winding $C^{148}$ of relay $C^{24}$, and through conductor $C^{127}$ to battery wire $C^7$.

In the relay $C^{24}$, the windings $C^{144}$ and $C^{146}$ act together and tend to hold the armature in its upper position, as shown. Winding $C^{148}$ tends to draw the armature downwardly but when both the other windings are energized, it is overcome and the armature remains up as shown. The same is true of the windings of relay $C^{25}$. When the workman's number is set up on the debit keyboard, the arrangement in the primary and secondary switch sections will be changed and circuit will be closed which is the same as the circuit just traced above up to conductor $C^{141}$, the circuit then being through common conductor $C^{142}$, through one of conductors $C^{143}$, through the corresponding rank coil of section $Sd$, to common conductor $C^{145}$, through windings $C^{304}$ and $C^{306}$, through winding $C^{310}$ of relay $C^{309}$, winding $C^{311}$ of relay $C^{305}$, through one of the electro-magnets $K^{198r}$ controlling the set-up on the rate keyboard, through the corresponding file coil, through the closed unit switch to common conductor $C^{147}$, then through winding $C^{148}$ of relay $C^{24}$ and through conductor $C^{127}$ to battery wire $C^7$. In this circuit one or both of the windings $C^{144}$ and $C^{146}$ of relay $C^{24}$ are excluded, depending upon the number set up. At any rate, the omission of only one of these windings will be sufficient to allow the winding $C^{148}$ to predominate, the result being that the relay is actuated to close contact $C^{19}$—$C^{20}$, and these contacts control the unlocking circuit for the credit keyboard, the unlocking circuit being then closed as follows: from battery wire $C^7$, through conductor $C^{31}$, contact $C^{19}$—$C^{20}$, conductor $C^{27c}$, upper coil $K^{33c}$ of the credit keyboard, through contact $K^{71c}$—$K^{69c}$—$K^{70c}$, and through conductors $C^{29c}$ and $C^{30c}$ to the battery wire $C^6$. Thus the credit keyboard is not energized or unlocked for actuation until a significant number is set up on the debit board. The operator then sets up on the credit board the number of the register assigned to the job account. Upon the setting up of this significant number coils other than the zero rank and file coils $Sc$ will be included in circuit, and, therefore, either one or both of windings $C^{131}$ and $C^{133}$ will be omitted to allow winding $C^{135}$ to predominate to close contacts $C^{21}$—$C^{22}$ to close the following energizing or unlocking circuit for the time keyboard: from battery wire $C^7$, through conductor $C^{31}$, contact $C^{21}$—$C^{22}$, conductor $C^{27'}$, winding $C^{318}$ of relay $C^{319}$, through the upper contacts $K^{208t}$—$K^{207t}$—$K^{209t}$ of pass key $Kot$, through upper coil $K^{33t}$ of the time board, through the upper contacts $K^{71t}$—$K^{69t}$—$K^{70t}$ of key $K^{53t}$, and through conductor $C^{30t}$ to battery wire $C^6$.

As will be explained more fully later, energization at this time of winding $C^{318}$ will cause the armature $C^{319}$ to be moved to the right to close contact $C^{346}$—$C^{347}$, which controls the connection of the time connector L with the time keyboard. The circuit closed is the following: from battery wire $C^7$, conductors $C^{45}$, $C^{44}$ and $C^{341}$ to common conductor $C^{342}$ which leads to the brushes of the commutators of the time connector, thence from the engaged commutator segments through the connected wires in cable $C^{344t}$ to the electro-magnets $K^{198t}$ corresponding to the time connector set-up, thence back through the cable by conductor $C^{345}$, through contacts $C^{346}$—$C^{347}$, contacts $C^{349}$—$C^{350}$ closed at this time by armature $C^{307}$, thence through conductor $C^{37}$ to battery wire $C^6$. When the time keyboard has its keys thus automatically depressed, the following circuit will be closed: from battery wire $C^7$, through conductor $C^{40t}$, through relay $C^{39t}$, through conductor $C^{38t}$, contacts $C^{322}$—$C^{321}$ which at this time are closed by relay $C^{305}$, through conductor $C^{38t}$, through winding $C^{320}$ surrounding the armature $C^{319}$, thence to the common conductor $K^{26t}$, through the depressed key to the engaged contacts $K^{155t}$—$K^{156t}$, thence through the conductors in cables $C^{33t}$, and $C^{32}$, through the master machine $Mm$, through common conductor $C^{35}$, through contact $M^{436}$, commutator $M^{483}$, conductor $C^{36}$, commutator M$^{431}$ and contact M$^{432}$, and through conductor C$^{37}$ to battery wire C$^6$. The set-up on keyboard K$^t$ is therefore transferred to the master machine ready to be carried to the registers by or through a multiplier, as will be described later. Relay C$^{39t}$ in this circuit, upon becoming energized, closes the contacts C$^{47t}$—C$^{46t}$—C$^{48t}$, and therefore completes the following energizing or unlocking circuit for the rate keyboard; from battery wire C$^7$, through conductor C$^{40t}$, through contacts C$^{48t}$—C$^{46t}$—C$^{47t}$, conductor C$^{27t}$, through pass key coil K$^{212t}$, through upper contacts K$^{208r}$—K$^{207r}$—K$^{209r}$ of pass key K$or$, through upper coil K$^{33r}$ of the rate keyboard, through upper contacts K$^{71r}$—K$^{69r}$—K$^{70r}$ of key K$^{53r}$, and through conductor C$^{30r}$ to battery wire C$^6$. The rate keyboard is now operative to automatically receive the set-up by the electro-magnet K$^{198r}$, which was selected when the workman's number was set up on the debit keyboard. These magnets K$^{198r}$ are shown diagrammatically in drawing C$^5$ as associated directly with the secondary switch sections, but these magnets are in fact placed about the keys in the keyboard and are connected through cables C$^{132}$, C$^{145}$ with the switch section circuits. Upon depression of a key in the rate keyboard, a circuit or circuits are closed which include an electro-magnet E$^{37}$ of the multiplier, thereby setting up the rate factor in the multiplier. The time factor in the master machine and the rate factor in the multiplier when multiplied together produce the wage element. The circuit through the multiplier, controlled by the rate keyboard is traced as follows, particular reference being had to Fig. C$^3$ which shows the circuits and operative parts more in detail: from battery wire C$^7$, through conductor C$^{40t}$, through relay C$^{39r}$, through contacts C$^{325}$—C$^{324}$—C$^{323}$, which are closed by armature C$^{305}$ at this time, through conductor C$^{382}$, through one rate factor magnet E$^{37}$, through a conductor leading through cable C$^{33r}$, through the closed contacts K$^{156r}$—K$^{155r}$ of the depressed rate key, back through another conductor in the cable C$^{33r}$ and through another rate factor magnet E$^{37}$, through conductor C$^{353}$, through winding C$^{354}$ of relay C$^{355}$ and through conductor C$^{356}$ to battery wire C$^6$.

As has been shown in the description with reference to Fig. C$^8$ and in the description of the multiplier there should be an electro-magnet E$^{37}$ for each rate, or there could be two or more electro-magnets which when combined would produce the rate. For example, suppose that the workman who was entered on the system was rated at nineteen cents an hour. Referring particularly to Fig. C$^8$, the depression of the nineteen key will close the following circuit: from battery wire C$^7$, conductor C$^{382}$, the 4—3/4 factor magnet, through the conductor leading to the closed contact of the 19 key, thence through the conductors leading from said contacts, through the 4 factor magnet, then through conductor C$^{353}$ and winding C$^{354}$ to battery wire C$^6$. These factors 4—3/4 and 4 when multiplied together in the multipliers produce the rate factor 19. The product of the time and rate factors produced by the multiplier is to be set up on the wage keyboard. This wage keyboard is energized or unlocked for operation when the relay C$^{39r}$ is energized, this unlocking circuit being as follows: from battery wire C$^7$, conductor C$^{40t}$ and C$^{40r}$, through contacts C$^{48r}$—C$^{46r}$—C$^{47r}$, through conductor C$^{27r}$, through pass key winding K$^{212r}$, through the upper contacts K$^{208w}$—K$^{207w}$—K$^{209w}$ of pass key K$ow$, through upper coils K$^{33w}$ of the wage keyboard, through the upper contacts K$^{71w}$—K$^{69w}$—K$^{70w}$ of key K$^{53w}$, and through conductor C$^{30w}$ to battery wire C$^6$.

As already described the transposer is connected with the multiplier and with the master machine and serves to receive the wage element from the multiplier and to transpose or to transform it into dissimiliar orders so that the number representing the wage element can be set up on the key orders of the wage keyboard. The setting-up-circuit for the wage keyboard is as follows: from battery wire C$^6$, through conductor C$^{37}$, contacts M$^{416}$—M$^{417}$—M$^{415}$ which are closed when the master machine completes its operation of counting, then through conductors C$^{63}$—C$^{360}$ and C$^{359}$ to the brushes of the transposer, through the commutator segments, through the various wires in cables C$^{361}$ and C$^{344w}$ to the electro-magnets K$^{198w}$, back through common conductor C$^{362}$ in the cable, through conductors C$^{44}$ and C$^{45}$ to the battery wire C$^7$. Suppose this is a case where the workman begins work at eight o'clock in the morning. When his number is set up on the debit board, his rate, say 19 cents, is automatically set up on the rate board and transferred to the multiplier. On the time board the number 8.00 is automatically set up as representative of his starting time and is transferred to the master machine to be combined as a factor in the multiplier with the rate. The product or wage element would be the product of the time and rate or 1.52, and this number 1.52 will be produced and sent into the register assigned to the workman. If the workman leaves at 12 o'clock (noon) his number is again set up, but on the credit board, either by himself or by an operator, and the time element in this case will be 12.00. If a job is to be charged with the time it is counter-balanced with the "in" and the "out" entries just mentioned. As shown in the description of the register mechanism provided for this system, each register mechanism is designed to operate in the opposite direction for alternate set-ups. Therefore, at 8 o'clock when the workman's register was first actuated, it was connected in to operate in one direction, and at 12 o'clock, when his number was again set up, it was connected to operate in the opposite direction. The result of the second operation will be that the wage factor in the multiplier is the same or 19, but the time factor will be changed to 12.00 and therefore the wage element will be 2.28. Now as the register received from the master machine the 1.52 entry in one direction and in the opposite direction the 2.28 entry, its final indication will be the algebraic sum of the two entries or .76 which indicates the wage for the workman from eight to twelve a. m. at 19 cents per hour, or four hours at 19 cents per hour.

The master machine is connected in for operation by the electro-magnet $M^{141}$, but circuit through this electro-magnet is controlled by the general operating key $K^{115}$ which is locked electro-magnetically until all keyboard set-up steps have been accomplished. After the time and rate keyboards have been automatically set up, the operator depresses the pass key $K_{ow}$ to close the following circuit: from battery wire $C^7$, conductor $C^{40w}$, relay $C^{39w}$, conductor $C^{301}$, lower contacts $K^{211w}$—$K^{207w}$—$K^{210w}$ of the pass key $K_{ow}$, through conductor $C^{30w}$ to battery wire $C^6$. Energization of relay $C^{39w}$ causes actuation thereof to connect the contacts $C^{47'w}$—$C^{46'w}$—$C^{48'w}$ and the contacts $C^{47w}$—$C^{46w}$—$C^{48w}$. Contacts $C^{47'w}$—$C^{46'w}$—$C^{48'w}$ close the circuit from battery wire $C^6$, through conductors $C^{49}$ and $C^{27w}$, through the locking coil $K^{212w}$ of the pass key $K_{ow}$ and to battery wire $C^7$. Contacts $C^{47w}$—$C^{46w}$—$C^{48w}$ close the following circuit: from battery wire $C^6$, through conductor $C^{49}$, through the contacts $C^{47w}$—$C^{46w}$—$C^{48w}$, through locking electro-magnet $K^{125}$, through the check circuit of either the time or the wage keyboard, through conductor $C^{51}$, through conductor $C^{291}$ and $C^{292}$ of synchronous connector check circuit through contacts $C^{47t}$—$C^{46t}$—$C^{48t}$, through conductor $C^{40t}$ to battery wire $C^7$. The armature of electro-magnet $K^{125}$ is therefore withdrawn from locking engagement with the general operating key. If all the set-up have been properly made, the locking electro-magnet $K^{124}$ will also become energized to release the general operating key through the following circuit: from the battery wire $C^7$, through conductor $C^{40w}$, through electro-magnet $K^{124}$, through conductor $C^{56}$, through contacts $C^{53}$—$C^{52}$ of relay $C^{110}$, through conductor $C^{55}$, through contacts $C^{255}$—$C^{254}$, and through conductor $C^{54}$ to battery wire $C^6$. The operator can now depress the general operating key and the circuit for the master machine controlling electro-magnet $M^{141}$ will be closed, as follows: from battery wire $C^7$, conductor $C^{40w}$, through electro-magnet $K^{126}$, through contacts $K^{119}$—$K^{118}$—$K^{120}$ which become connected upon depression of the key $K^{115}$, through conductor $C^{57}$, through contact $M^{386}$ to contact member $M^{382}$, through electro-magnet $M^{141}$, through conductor $C^{37}$ to battery wire $C^6$. The master machine is clutched in for operation by the magnet $M^{141}$ and proceeds to carry its set-up into the multipliers and control the operation of the transposer. Just as the master machine completes its operation it momentarily closes contacts $M^{413}$—$M^{410}$—$M^{413}$ to close the following circuit to the register printing mechanisms: from battery wire $C^7$, through conductor $C^{45}$ to the various register printing mechanisms back to conductor $C^{260}$, through contacts $M^{413}$—$M^{410}$—$M^{413}$ and through conductor $C^{37}$ to battery wire $C^6$.

If it is desired to have the general operating key actuated automatically after the various set-ups have been made, switches $C^{59}$ and $C^{59'}$ are closed and the following circuit will be closed through actuating electro-magnet $K^{126}$: from battery wire $C^7$, through conductor $C^{40w}$, through electro-magnet $K^{126}$, switches $C^{59}$ and $C^{59'}$, through conductor $C^{62}$, through conductor $C^{61}{}_o$, to contact $M^{393}{}_o$ and brush $M^{391}$ of the master machine through conductors $C^{60}$ and $C^{37}$ to battery wire $C^6$. When both electro-magnets $K^{124}$ and $K^{125}$ are energized to release the general operating key $K^{115}$, this key will be drawn down by electro-magnet $K^{126}$ to close contacts $K^{119}$—$K^{118}$—$K^{120}$ which control the circuit of the master machine clutch magnet $K^{141}$.

In making a "routine pay-roll" entry at the end of a pay period when the pay-roll is made up the operator need concern himself with the manual actuation of only one keyboard after having made the initial set-ups on the debit and credit boards. The synchronous connector $H_d$ of the debit board is connected in for operation by closure of switch $C^{278d}$. The lowest number of the series of registers assigned to the individual workmen is set-up on the debit board and during operation of the system the synchronous connector will automatically connect in the successive numbers, the operation of the synchronous connector being described in full detail in my co-pending application, Serial No. 413,875, filed February 1st, 1908. On the credit keyboard is set up the register assigned to cash and the repeat key is depressed. After these two initial set-ups the debit and credit keyboards will be automatically actuated, the synchronous connector taking care of the debit board and the repeat key retaining the cash set-up on the credit board. The operator as described before unlocks the debit keyboard by actuation of electro-magnetic key $C^{23}$. The set-up on the debit keyboard connects in a register for receiving the workmen's time and results in the closure of a circuit through the switch section $Sd$ including a rate set-up electro-magnet $K^{198r}$, which sets up the rate keyboard automatically. The setting up of this workmen's number on the debit up of the unlocking keyboard causes closure of the credit keyboard, whereupon a number is set up on the credit keyboard indicative of the register assigned to the cash account. This cash account is a commercial one and therefore the set-up circuit will include coils in the switch section $Sc$ set aside for operating in commercial accounts. The set-ups on the debit and credit boards involve the following circuit: battery wire $C^6$, conductor $C^{111}$, conductor $C^{128}$, common conductor $C^{129}$, through one of the unit switches $S^7$ of $Sc^1$, through one of the conductors $C^{130}$, through the corresponding rank coil of secondary section $Sc$ to the common conductor $C^{132}$, through winding $C^{308}$, through windings $C^{316}$ and $C^{317}$, through conductor $C^{132w}$, through the corresponding file coil, through its individual conductor $C^{134}$, through one of the unit switches $S^7$ of $Sc^2$ through common conductor $C^{134}$, through winding $C^{135}$ of relay $C^{25}$ through conductor $C^{136}$, through windings $C^{137}$, $C^{138}$ and $C^{139}$ through conductor $C^{141}$, through common conductor $C^{142}$, through one of the unit switches $S^7$ of $Sd^1$, through one of the conductors $C^{143}$, through the corresponding rank coil of secondary section $Sd$, through common conductor $C^{145}$, through windings $C^{304}$, $C^{306}$, $C^{310}$ and $C^{311}$, through electro-magnet $K^{198r}$ and the corresponding file coil, through its individual conductor $C^{146}$, through one of the unit switches $S^7$ of $Sd^2$, through common conductor $C^{147}$, through winding $C^{148}$ of relay $C^{24}$ and through conductor $C^{127}$ to battery wire $C^7$. Arrows adjacent the various windings on armatures $C^{307}$, $C^{309}$ and $C^{305}$ indicate the direction in which each winding tends to attract its armature upon current flow therethrough. On armature $C^{307}$ windings $C^{306}$ and $C^{316}$ are energized, but winding $C^{316}$ having more turns predominates and the armature $C^{307}$ is carried to the right to open contacts $C^{350}$—$C^{349}$ which control the connection of the time connector with the time keyboard. This time connector circuit being opened, the time keyboard will not be automatically actuated. On armature $C^{309}$ windings $C^{310}$ and $C^{308}$ are energized, but winding $C^{308}$ predominates, and the armature remains in its position to the right. On armature $C^{305}$, windings $C^{304}$, $C^{311}$ and $C^{317}$ are energized, but windings $C^{304}$ and $C^{311}$ predominate and the armature remains in its position to the left. After set-up on the credit board the unlocking circuit for the time keyboard is closed, and its circuit includes the winding $C^{318}$ on armature $C^{319}$ to cause movement of the armature to engage contacts $C^{346}$—$C^{347}$, but contacts $C^{350}$—$C^{349}$, having been opened by armature $C^{307}$, the time connector circuit will remain disconnected and the time keyboard must be manually actuated. The time set-up is carried into the master machine and from there passes through the multiplier as before described. The rate set-up is carried to the multiplier as before described. Set-up on the time keyboard of course unlocks the rate keyboard, as already described and set-up on the rate keyboard unlocks the wage keyboard. The operator then actuates the general operating key $K^{115}$, or this is accomplished automatically as before described, whereupon the master machine is set in operation to drive the multiplier and the transposer so that the wage element is transferred to and set up on the wage keyboard. The various set-ups on the keyboards and registers are recorded by suitable circuits and mechanisms in the journal records. After this entry the synchronous connector automatically sets up on the debit board the next register of the workmen's time series, the set-up on the credit board remaining on account of the repeat key control. The operator need only set up on the time keyboard the time over which the pay period extends and actuate the general operating key, all other keyboards being automatically actuated as before. In this way the entire payroll may be very rapidly made.

If a "reverse pay-roll" entry is to be made, the number of the register representative of the pay-roll cash is set up on the debit keyboard while the number representative of the workmen's registers is set up upon the credit keyboard. The operation of all mechanism will be the same, the principal difference being that the relay windings $C^{314}$, $C^{315}$, $C^{312}$ and $C^{313}$ will be energized in place of the windings $C^{316}$, $C^{317}$, $C^{310}$, and $C^{311}$.

When a "finished job transfer" entry is to be made the typewriting mechaism T is first actuated, and then a number representative of a commercial account is set up on the debit keyboard and a number representative of the job is set up on the credit keyboard, or vice versa. If the commercial account number is set up on the debit board and the job number on the credit keyboard, the circuit through the switch sections and controlling relays will be as follows: from battery wire $C^6$, through conductors $C^{111}$, $C^{128}$ to common conductors $C^{129}$, through one of the unit switches $S^7$ of $Sc^1$, through one of the conductors $C^{130}$, through the corresponding rank coil of secondary section $Sc$ through common conductor $C^{132}$, through winding $C^{308}$, through conductor $C^{132j}$ through the corresponding file coil through one of the conductors $C^{133}$, through one of the unit switches $S^7$ of $Sc^2$, through common conductor $C^{134}$, through winding $C^{135}$ of relay $C^{25}$, through conductor $C^{136}$, through winding $C^{137}$, $C^{138}$, and $C^{139}$, through conductor $C^{141}$, through common conductor $C^{142}$, through one of the unit switches $S^7$ of $Sd^1$, through one of the conductors $C^{143}$, through a rank coil of the secondary section $Sd$, through common conductor $C^{145}$, through windings $C^{304}$, $C^{306}$, $C^{314}$, and $C^{315}$, through one of the file coils, through one of the corresponding conductors $C^{146}$ through one of the unit switches $S^7$ of $Sd^2$, to common conductor $C^{147}$, through winding $C^{148}$ of relay $C^{24}$, and through conductor $C^{127}$ to battery wire $C^7$. On armature $C^{307}$, windings $C^{306}$ and $C^{314}$ are energized, but winding $C^{314}$ predominates and armature $C^{307}$ is moved to the right to open contacts $C^{350}$—$C^{349}$, which control the time connector circuit and the time keyboard will not, therefore, be automatically set up. On armature $C^{309}$ the winding $C^{308}$ is energized and the armature remains to the right. On aramture $C^{305}$, windings $C^{304}$ and $C^{315}$ only are energized, and winding $C^{315}$ predominates and moves the armature to the right. This movement of armature $C^{305}$ disconnects contacts $C^{321}$—$C^{322}$ and contacts $C^{324}$—$C^{325}$ to open respectively the circuit controlled by the time keyboard for setting up time in the master machine and the circuit controlled by the rate keyboard for setting up the rate in the multiplier. Neither the time nor the rate element therefor can be automatically entered and consequently the wage keyboard will not be automatically actuated, but the time and rate keyboards may be set up manually to control printing mechanism which actuate the journal printing mechanisms. When armature $C^{305}$ is moved to the right to open the various contacts already referred to it will close other contacts. Contacts $C^{273}$—$C^{274}$—$C^{275}$ will be closed to connect a circuit from battery wire $C^6$, conductor $C^{37}$, through the contacts and through the coil $K^{212w}$ to battery wire $C^7$, energization of coil $K^{212w}$ locking the pass-key $Kow$ against depression. Manual actuation of the time and rate keyboards will then unlock the wage keyboard, which upon manual actuation will carry its set-up to the master machine through the following circuit: Battery wire $C^7$, conductor $C^{40w}$, relay $C^{39w}$, conductor $C^{38w}$, through contacts $C^{327}$—$C^{326}$, which are closed when armature $C^{305}$ moves to the right, thence through conductor $C^{38w}$ to key contact $K^{26w}$, through the set-up contacts $K^{156w}$, through cables $C^{33w}$ and $C^{33t}$ and the smaller cables $C^{32}$ to the master machine set-up pin magnets to conductor $C^{35}$, through contact $M^{436}$, through contact member $M^{433}$, through conductor $C^{36}$, through contact member $M^{430}$, through contact $M^{432}$ and through conductor $C^{37}$ to battery wire $C^6$, the wage keyboard set-up being thus directly carried into the master machine and from the master machine into the register mechanism.

In making a "change of job" entry, the workman is assigned from one job to another and consequently it is necessary for the operator to manually counter-balance the two jobs upon the debit and credit keyboards. Upon such set-up, the circuit established will include only the relay windings $C^{304}$, $C^{306}$ and $C^{308}$ and armatures $C^{305}$, $C^{307}$ will be in their left position and armature $C^{309}$ will be in its right position. Contacts $C^{349}$ and $C^{350}$ will, therefore remain closed by armature $C^{307}$ and the time connector circuit maintained and ready for actuation when the set-up is made on the credit board thus unlocking the time keyboard to allow it to be automatically set-up as before described, whereupon the time set-up will be transferred to the master machine. As the circuits controlled by the set-up on the debit and credit boards do not include rate set-up magnets $K^{198r}$, the rate keyboard will not be automatically affected, but the set-up thereon must be manually made, which set-up will be transferred to the multiplier through circuits already traced. The master machine then drives the multiplied and transposer and the wage element is automatically carried into the connected registers and set up on the wage keyboard.

In making "purely commercial" entries, the debit and credit keyboards are given set-ups representative of commercial accounts and the resulting circuit will include windings $C^{304}$, $C^{306}$, $C^{314}$, $C^{315}$, $C^{308}$, $C^{316}$, and $C^{317}$. Armature $C^{307}$ will be moved to the right to disconnect the time connector thereby preventing automatic actuation of the time keyboard. Armature $C^{309}$ remains in its right position and armature $C^{305}$ is moved to the right, causing opening of the multiplier circuit controlled by the rate keyboard, and opening of the master machine circuit controlled by the time keyboard. The movement of the same armature $C^{305}$ to the right then closes the circuit of the master machine controlled by the wage keyboard and also closes a circuit locking the pass-key of this keyboard against actuation as before described thus requiring a manual set-up on the wage keyboard which will be transferred to the master machine and thereby carried into the registers.

Provision is also made to prevent "false" entries of various kinds. For example, supposing two accounts assigned to the keeping of workmen's time are set up simultaneously on the debit and credit keyboards, the circuit then established would include relay windings $C^{304}$, $C^{306}$, $C^{310}$, $C^{311}$, $C^{308}$, $C^{312}$ and $C^{313}$. Armatures $C^{307}$ and $C^{305}$ would be in the left position and armature $C^{309}$ would also be moved to the left to close contacts $C^{366}$—$C^{367}$ to close the following circuit: from battery wire $C^7$, through conductor $C^{363}$, through coil $C^{364}$ of the rate keyboard which actuates the erasing key $K^{76r}$, through conductor $C^{365}$, through contacts $C^{366}$—$C^{367}$, through conductor $C^{368}$, through winding $C^{369}$ of relay $C^{242}$, to battery wire $C^6$. The erasing key of the rate keyboard is actuated thereby clearing this keyboard of any set-up. Armature $C^{242}$ is actuated, opening a normally closed circuit through the credit keyboard thereby also clearing this keyboard of any set-up. This circuit is normally closed as follows: from battery wire $C^7$, through conductor $C^{241}$, through armature $C^{242}$, through contact $C^{245}$, through conductor $C^{246c}$, through coil $K^{67c}$, through contacts $K^{84c}$—$K^{85c}$ of the erasing key $K^{76c}$, through conductor $C^{103c}$, through resistance $C^{102c}$, through rheostat $K^{129c}$, through conductor $C^{94c}$, through conductor $C^{29c}$, through conductor $C^{30c}$ to battery wire $C^6$. Opening of the circuit traced will deënergize the winding $K^{67c}$ and all the keys will be released, the effect being the same as though the general erasing key $K^{76c}$ were depressed to open the circuit upon disengagement of contacts $K^{84c}$—$K^{85c}$. Thus a false set-up on the credit keyboard will automatically cause erasure of this keyboard and erasure of the rate keyboard. If, for any reason, the actuation of the rate keyboard $Kr$ is such as to cause the simultaneous set-up of more than one factor, there will be excessive current flow through the multiplier circuit and through winding $C^{354}$ of relay $C^{355}$. The second winding $C^{357}$ on this relay is always connected in circuit, which may be traced from battery wire $C^7$ through conductor $C^{45}$, through conductor $C^{44}$, through conductor $C^{358}$, through winding $C^{357}$, through conductor $C^{356}$ to battery wire $C^6$. This winding is sufficient to hold the armature $C^{355}$ in its raised position against current flow through the winding $C^{354}$ under ordinary conditions of correct entry and operation. If simultaneous set-ups are placed on the rate board the excessive current flow which results and passes through the winding $C^{354}$ would be sufficient to cause this winding to overcome the winding $C^{357}$ and armature $C^{355}$ would be carried to close contacts $C^{370}$—$C^{371}$, and the rate keyboard would be erased through the following circuit: from battery wire $C^6$, through conductor $C^{356}$, through $C^{370}$—$C^{371}$, through conductor $C^{372}$, through conductor $C^{365}$, through winding $C^{364r}$ of the erasing key $K^{76r}$, through conductor $C^{363}$ to battery wire $C^7$. Thus any attempt to simultaneously set up more than one rate factor on the rate board will result in erasure of this board and this continues until a set-up is properly made.

I have already referred to two windings on the armature $C^{319}$, winding $C^{318}$ being included in the energizing or unlocking circuit for the time keyboard and the winding $C^{320}$ being included in the circuit which conveys the time keyboard set-up to the master machine. There is a third winding, $C^{340}$, on the armature, which is always connected in circuit, which may be traced from battery wire $C^6$, through conductor $C^{37}$, through conductor $C^{339}$, through said winding, through conductor $C^{341}$, through conductor $C^{44}$, through conductor $C^{45}$ to battery wire $C^7$. Also associated with the armature $C^{319}$ is a stationary core $C^{338}$ surrounded by winding $C^{337}$, the right end of the core being in contact with the left end of the armature when this armature is in its normal left position. The direction of attraction of these coils is indicated by arrows, the coil $C^{337}$ when energized tending to cause attraction of the armature to the core $C^{338}$. This core is magnetized a short time in advance of a change of connections in the time connector L, and remains magnetized until the change of connections therein is completed. One terminal of this winding connects with battery wire $C^6$ through conductor $C^{37}$, and the other terminal terminates in a contact brush $C^{335}$ which engages a commutator segment $C^{333}$ which connects with battery wire $C^7$. Another commutator $C^{331}$ has a smaller contact segment for engagement with a brush 330. The commutators are connected through a shaft to rotate together and segment $C^{331}$ also connects with conductor $C^{44}$. The brush $C^{330}$ connects with one terminal of the time connector driving magnet $L^{27}$, and the other terminal connects with conductor $C^{37}$ and with battery wire $C^6$. The commutators $C^{331}$ and $C^{333}$ are driven to make one revolution every hundredth part of an hour. Segment $C^{333}$ is longer than segment $C^{331}$ and in such position with reference thereto that the brush $C^{335}$ will engage the segment $C^{333}$ in advance of the engagement of brush $C^{330}$ with segment $C^{331}$, and so that brush $C^{335}$ will remain in engagement with segment $C^{333}$ a short time after brush $C^{330}$ leaves segment $C^{331}$. Winding $C^{337}$ magnetizes core $C^{338}$ and this core acting on the armature $C^{319}$, in addition to the effect produced on said armature by winding $C^{340}$ will prevent movement to the right of the armature by winding $C^{318}$ until the change of connections in the time connector has been completed. Therefore although winding $C^{318}$ becomes energized after actuation of the credit keyboard the armature $C^{319}$ will not move to the right and there can be no set-up on the time keyboard during a change of connections in the time connector L. Of course as soon as the time connector has changed its connections and the circuit through winding $C^{337}$ is opened, winding $C^{318}$ will predominate over winding $C^{340}$ and armature $C^{319}$ will move to the right to close the time connector circuit at contacts $C^{346}$—$C^{347}$. Then when the time keyboard is set up and circuit closed through the winding $C^{320}$, the effect of winding $C^{318}$ will be neutralized and winding $C^{340}$ will become effective to restore armature $C^{319}$ to its normal position to re-open the time connector circuit. The connection between armature $C^{319}$ and contacts $C^{346}$—$C^{347}$, is designed to be slow in breaking in order that the required number of keys upon the keyboard K$t$ may be actuated for any set-up before the connection between contacts $C^{346}$—$C^{347}$ is broken.

Fig. L shows diagrammatically a general scheme of registers or accounts in which A represents assets, consisting of C cash and AR accounts receivable; L represents liabilities, consisting of PR pay roll and AP accounts payable, with NG net gain the difference between the assets and liabilities,—the seven circles at the top and their connecting lines representing a skeleton balance sheet, consisting of the seven specified financial accounts. The diamonds and circles arranged in pairs represent labor accounts, the specific pairs $e^1$, $e^2$, $e^3$ and $e^4$ being assigned to individual workmen, to each man a pair, the diamond representing his time account and the circle his wage account. $D^1$ and $D^2$ represent generic pairs for departmental summation, and L$a$ represents a grand total generic pair. The balances in these labor accounts are normally credits, though each register may initially show a debit. 93—1, 93—2, 94—1 and 94—2 represent the specific cost-accounts of classified labor operations on jobs #93 and #94, and JP the generic grand total labor-cost account of all jobs to date. If a specific register, as 93—2, were assigned to material costs for each job the generic accounts, as #93 and JP, would then also include the material element. The balances in all these cost accounts are normally (eventually) debits, as are also those in UT undistributed time, which represents a pair of registers to receive the counterbalancing cost entries when no job is ready for a workman. This undistributed time may be apportioned to specific jobs later.

If workman No. 1, earning 20 cents an hour, begins work at 8 o'clock, at operation No. 1 on job No. 93, his individual number (1) may be set up on the debit board and the combination job and operation number (93—1) may be set upon the credit board, thereby connecting for operation registers $e^1$ debitingly and 93—1 creditingly, with the generic registers $D^1$, L$a$, JP and #93 connected duplicatingly. The setting-up of 1 on the debit board automatically sets up No. 1's rate (20 cents) on the rate board, the latter set-up in turn automatically sets up 8 (hours) on the time board; and, upon the depression of the operating key, these two set-ups automatically produce the value set-up $1.60 on the amount board, and as a further result, the following registrations: 8 hours in the time member and $1.60 in the wage member of each of the pairs $e^1$, $D^1$ and L$a$, all positively, and $1.60 negatively in JP, #93 and 93—1. There being no previous entry in these registers, each one will register the amount of its first actuation.

If workman No. 2, earning 30 cents an hour, begins work at 9 o'clock, at the same operation and on the same job, the process may be repeated with these variations: His number (2) is set up on the debit board instead of 1, thereby connecting registers $e^2$ instead of $e^1$ and setting up 30 instead of 20 on the rate board, while the clock sets up 9 (hours) instead of 8 on the time board, and the entry therefore consists of 9 hours and $2.70 instead of 8 hours and $1.60. This being the first registration in registers $e^2$ they will show debits of 9 hours and $2.70 respectively, while each of the other connected registers automatically combines the amount of the second entry with the amount already registered, each of the time members of the pairs $D^1$ and L$a$ showing a debit of 17 hours, each of the wage members of such pairs showing a debit of $4.30, and JP, #93 and 93—1 each showing a credit of $4.30.

If at 10 o'clock No. 2 changes from job #93 to job #94, 93—1 may be set up on the debit board and 94—1 (say) on the credit board, thereby connecting for operation registers 93—1 and 93 debitingly and 94—1 and 94 creditingly, but no others. Since the number of the workman has not been entered on the debit-credit boards, the proper rate factor has not been entered automatically, and 30 must therefore be set up manually on the rate board; which being done, the time factor 10 (hours) is automatically set up, and upon the depression of the operating key registers 93—1 and 93 each receive a positive actuation of $3.00 and registers 94—1 and 94 each receive a negative actuation of the same amount. This actuation of each of the latter registers results in a negative or credit showing of $3.00; but the positive actuation of 93—1 and 93 being opposed to the previous negative actuations which aggregated $4.30, and being automatically combined therewith, the resulting net actuation and registration is shown in each of these registers as a credit of $1.30.

If No. 2 stops work at 11 o'clock, his job number (94—1) may be set up on the debit board and his individual number (2) on the credit board, the rate and time factors (30, 11) being automatically set up on their respective boards, and the resulting value ($3.30) being automatically set up on the amount board upon depression of the operating key, resulting in the entry of 11 hours creditingly in the time members of $e^2$, $D^1$ and $La$, $3.30 creditingly in the wage members of the same pairs, and the same amount debitingly in #94—1, #94 and JP.

If No. 1 stops work at twelve o'clock, his job number (93—1) may be set up on the debit board and his individual number (1) on the credit board, the time and rate factors 12, 20) being automatically set up on their respective boards, and upon the depression of the operating key the resulting value ($2.40) is automatically set up on the amount board, resulting in the following entries: 12 hours creditingly in the time members of $e^1$, $D^1$ and $La$, $2.40 creditingly in the wage members of the same pairs, and the same amount debitingly in #93—1, #93 and JP.

These entries have required merely the setting-up of eleven numbers on the keyboards and the depression of the operating key five times. The journal record thus obtained is as follows (omitting any typewritten explanation at the left):

| D. | C. | Time. | Rate. | Wages. |
|---|---|---|---|---|
| 1 | 93—1 | (8:00) | (20) | (1.60) |
| 2 | 93—1 | (9:00) | (30) | (2.70) |
| 93—1 | 94—1 | (10:00) | 30 | (3.00) |
| 94—1 | 2 | (11:00) | (30) | (3.30) |
| 93—1 | 1 | (12:00) | (20) | (2.40) |

In this connection may be given the record for the paying-off entries, as explained later:

| | | | | | |
|---|---|---|---|---|---|
| d | 1 | 103 | 48:00 | (20) | (9.60) |
| d | 2 | 103 | 45:00 | (30) | (13.50) |
| | * | * | * | * | * |
| (A/c No. 1) | | 103 | 10 | — | — | 9.60 |
| (A/c No. 2) | d | 103 | 10 | — | — | 13.50 |

In these records, as given here, parentheses are used to indicate that the inclosed entry is secured automatically.

The final accounting results of the five simple volitional entry-operations corresponding to the in and out registrations and the change of workman #2 from one job to another are as follows:

1 and 2—No. 1's registers $e^1$ show net credits of 4 hours and 80 cents;

3 and 4—No. 2's registers $e^2$ show net credits of 2 hours and 60 cents;

5 and 6—The department registers $D^1$ show total credits of 6 hours worked and $1.40 earned by all workmen of that department;

7 and 8—The grand total labor registers $La$ show total credits of 6 hours worked and $1.40 earned by the workmen of all departments;

9—Register #93—1 shows the total cost of the one labor operation assumed, performed by all men on job 93, $1.10;

10—Register #93 shows the total labor cost of job 93, $1.10;

11—Register #94—1 shows the total labor cost of the one labor operation performed by all men on job 94, 30 cents;

12—Register #94 shows the total labor cost of job 94, 30 cents, and

13—Register JP shows the grand total cost of all operations on all jobs by all men to date, $1.40.

More extended illustration might assume a greater number of men, employed in a plurality of departments at a variety of operations, etc., and might also assume a charge to each job for material, which in the case of job #93 might be entered in register #92—2, being counterbalanced by a credit to cash or material account. In such latter case, #93 would automatically show the total cost for labor and material of its job and with a similar registration in job #94, the register JP would show the total cost of all jobs, including material.

Although normally the clock is potentially connected with the time keyboard, ready for actual connection therewith and operation thereon as soon as the credit set-up has been made, it may be entirely disconnected to permit the time factor to be set up manually, as in paying off a workman, after say a week's labor, which may be handled in the following manner: The workman's registers $e^1$, time and wage, are connected debitingly by setting up 1 on the debit board, and the pay-roll register PR (103) is connected creditingly by the entry on the credit board of 103; the number of hours shown in the time register, say 48, is manually set up on the time keyboard and thereupon the rate (20 cents) which was potentially set up on the rate keyboard by the workman's set-up (1) becomes actual, and the depression of the operating key causes the product of 48 by .20 (9.60) to be set up on the amount or wages board, and to be entered debitingly in No. 1's wage register, where it cancels the credit of an equal amount already there, reducing the register to zero. At the same time 48 has been entered debitingly in the time register, canceling an equal credit therein and reducing that register to zero. No provision is here made for the entry of that time portion of the pay entry in the payroll account, but the wage portion is entered creditingly therein for the same amount that is debited to workman No. 1, namely $9.60.

The several set-ups for the making of this transfer entry may print upon a suitable form placed in the memorandum-maker a check payable to workmen No. 1, for 48 hours, at 20 cents, amounting to $9.60, for the period indicated by the date of the entry which is also automatically recorded. The distinctive portions of the entry made on the blank check are duplicated on the pay envelop and in the journal, and in each place, if the total time has been correctly entered, a suitable record, as $d$, is mechanically printed, indicating that the account debited by the entry, that is, $e^1$, has been reduced to zero, both as to time and wages.

The envelop is turned over to the cashier for putting up the money, and when No. 1 presents his check containing a duplicate of the envelop entry he finds his money waiting for him. Upon making the payment, the cashier debits pay-roll (103) and credits cash, (10), preferably making this pay entry by means of the memorandum-maker, upon the face of the check, where it is in ideal position for checking as to accuracy, and also duplicating the same in the journal. When the last check of a week's issue has been paid, if the entries have been properly made, the last operation, crediting cash (10) for the amount of some workman's check, (say No. 2's) and debiting pay-roll (103) for the balance remaining in the latter account, will automatically reflect back from the pay-roll register the balanced condition, and will again record as a portion of the entry the clearance signal $d$, indicating this time that the pay-roll register has been cleared and returned to zero. These transfer and pay entries on the journal, which are mere by-products of the check-making and check-paying entries, yield a full record of the pay-roll, from which the auditor or manager may see how many hours each man has worked, his rate of pay and how much he has earned; and from which he may further know that each man has been paid the exact amount which his register accumulated for him day by day during the preceding week, and that the labor accounts, which were time-governed and machine-extended, have been physically balanced by the entries noted before him.

The workman's pair of registers, having been returned to zero by the entry transferring his wages to the pay-roll account, will normally next receive a debit entry when he begins work of the following Monday morning, and, as previously explained, the necessary alternation of debit and credit entries is suspended in the case of these registers by the coming of the register to rest at zero.

Since in this application the rate set-up for a workman is electrically governed by his individual employee number set-up, the electrical connection is changed when the rate of pay changes.

Having thus described my invention in construction and operation, I desire to secure the following claims by Letters Patent:

1. In a device of the class described, the combination of a plurality of registers, a master machine for involving any connected register with an entry, means for controlling the operative connection of any selected register with the master machine, a time factor controller, a rate factor controller, and automatic means governed by the time and rate factor controllers to control the operation of the master machine in accordance with the product of time and rate.

2. In a device of the class described, the combination of a plurality of registers, a master machine for involving any connected register with the entry, a keyboard for controlling the operative connection of any selected register with the master machine, a rate factor controller, means whereby the rate factor controller is governed by the register selecting keyboard, a time factor controller (a clock for governing operation of the time factor controller) and automatic means governed by the time and rate factor controllers to control the operation of the master machine in accordance with the product of the time and rate.

3. In a device of the class described, the combination of a plurality of registers, a master machine for involving any connected register with the entry, a keyboard for controlling the operative connection of any selected register with the master machine, a rate factor controller, means whereby the rate factor controller is governed by the register selecting keyboard, a time factor controller, and automatic means governed by the time and rate factor controllers to control the operation of the master machine in accordance with the product of the time and rate.

4. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller) a rate factor controller (means for governing the rate factor controller by one of the selecting keyboards), and automatic means governed by the time and rate factor controllers to control the operation of the master machine in accordance with the product of time and rate.

5. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller), a rate factor controller, and automatic means governed by the time and rate factor controllers to control the operation of the master machine in accordance with the product of time and rate.

6. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller, a rate factor controller, and automatic means governed by the time and rate factor controllers to control the operation of the master machine in accordance with the product of time and rate.

7. In a device of the class described, the combination of a plurality of registers, a master machine for involving any connected register with an entry, means for controlling the operative connection of any selected register with the master machine, a time factor controller, a rate factor controller, automatic means governed by the time and rate factor controllers to control the operation of the master machine in accordance with the product of time and rate, and a printing attachment associated with each register for printing a record of the actuations of such register.

8. In a device of the class described, the combination of a plurality of registers, a master machine for involving any connected register with the entry, a keyboard for controlling the operative connection of any selected register with the master machine, a rate factor controller, means whereby the rate factor controller is governed by the register selecting keyboard, a time factor controller (a clock for governing operation of the time factor controller) automatic means governed by the time and rate factor controllers to control the operation of the master machine in accordance with the product of the time and rate, and a printing attachment associated with each register for printing a record of the actuations of such register.

9. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller) a rate factor controller, (means for governing the rate factor controller by one of the selecting keyboards), automatic means governed by the time and rate factor controllers to control the operation of the master machine in accordance with the product of time and rate, and a printing attachment associated with each register for printing a record of the actuations of such register.

10. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller, a rate factor controller, automatic means governed by the time and rate factor controllers to control the operation of the master machine in accordance with the product of time and rate, and a printing attachment associated with each register for printing a record of the actuations of such register.

11. In a device of the class described, the combination of a plurality of registers, a master machine for involving any connected register with the entry, a keyboard for controlling the operative connection of any selected register with the master machine, a rate factor controller, means whereby the rate factor controller is governed by the register selecting keyboard, a time factor controller, automatic means governed by the time and rate factor controllers to control the operation of the master machine in accordance with the product of the time and rate, and automatic journalizing mechanism for printing a record of the operation of said mechanism.

12. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller) a rate factor controller (means for governing the rate factor controller by one of the selecting keyboards), automatic means governed by the time and rate factor controllers to control the operation of the master machine in accordance with the product of time and rate, and automatic journalizing mechanism for printing a record of the operation of said mechanism.

13. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller, a rate factor controller, automatic means governed by the time and rate factor controllers to control the operation of the master machine in accordance with the product of time and rate, and automatic journalizing mechanism for printing a record of the operation of said mechanism.

14. In a device of the class described, the combination of a plurality of registers, a master machine for involving any connected register with an entry, means for controlling the operative connection of any selected register with the master machine, a time factor controller, a rate factor controller, automatic means governed by the time and rate factor controllers to control the operation of the master machine in accordance with the product of time and rate, a printing attachment associated with each register for printing a record of the actuations of such register, and a journalizing mechanism for printing a record of the operation of such mechanism.

15. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller) a rate factor controller, (means for governing the rate factor controller by one of the selecting keyboards), automatic means governed by the time and rate factor controllers to control the operation of the master machine in accordance with the product of time and rate, a printing attachment associated with each register for printing a record of the actuations of such register, and automatic journalizing mechanism for printing a record of the operation of said mechanism.

16. In a device of the class described, the combination of a plurality of registers, a master machine for involving any connected register with an entry, debit and credit keyboards, one adapted operatively to connect in one direction, and the other operatively to connect in the reverse direction any other selected register with the master machine, a time factor controller, a rate factor controller, automatic means governed by the time and rate factor controllers to control the operation of the master machine in accordance with the product of time and rate, a printing attachment associated with each register for printing a record of the actuations of such register, and automatic journalizing mechanism for printing a record of the operation of said mechanism.

17. In a device of the class described, the combination of a master machine, a time factor controller (a clock for governing the time factor controller) a rate factor controller, and automatic mechanism for governing the operation of the master machine in accordance with the product of time and rate.

18. In a device of the class described, the combination of a master machine, a time factor controller, a rate factor controller, and automatic mechanism for governing the operation of the master machine in accordance with the product of time and rate.

19. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller (a clock for governing the time factor controller) a rate factor controller (mechanism controlled by the register selecting means for automatically governing the rate factor controller) and automatic means governed by the time and rate factor controllers to control the operation of the master machine in accordance with the product of time and rate.

20. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller (a clock for governing the time factor controller) a rate factor controller, and automatic means governed by the time and rate factor controllers to control the operation of the master machine in accordance with the product of time and rate.

21. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller, a rate factor controller, and automatic means governed by the time and rate factor controllers to control the operation of the master machine in accordance with the product of the time and rate.

22. In a device of the class described, the combination with a plurality of registers, a master machine, means for operatively connecting any register in a forward direction or in a backward direction with the master machine, and means for automatically limiting the direction in which any register may be connected with the master machine to an alternating connection, first forward and then backward.

23. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller (a clock for governing the time factor controller), a rate factor controller (mechanism controlled by the register selecting means for automatically governing the rate factor controller), automatic means governed by the time and rate factor controllers to control the operation of the master machine in accordance with the product of time and rate, and mechanism for automatically limiting the direction of the operative connection between the specific registers and the master machine to an alternately reversed connection.

24. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller (a clock for governing the time factor controller), a rate factor controller, automatic means governed by the time and rate factor controllers to control the operation of the master machine in accordance with the product of time and rate, and mechanism for automatically limiting the direction of the operative connection between the specific registers and the master machine to an alternately reversed connection.

25. In combination, a plurality of specific registers, a plurality of generic registers, a master machine for driving any register operatively connected therewith, means for connecting any selected specific register with the master machine, and means for automatically connecting a predetermined generic register with the master machine upon the selection and connection of any of a certain group of specific registers with the master machine, a time factor controller, a rate factor controller, automatic means governed by the time and rate factor controllers to control the operation of the master machine in accordance with the product of time and rate, and mechanism for automatically limiting the direction of the operative connection between the specific registers and the master machine to an alternately reversed connection.

26. In a device of the class described, the combination of a plurality of registers, a master machine for involving any connected register with an entry, means for controlling the operative connection of any selected register with the master machine, a time factor controller, a rate factor controller, automatic means governed by the time and rate factor controllers to control the operation of the master machine in accordance with the product of time and rate, and counters associated with said registers and each adapted automatically to indicate the number of actuations of the associated register.

27. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller (a clock for governing the time factor controller) a rate factor controller (means for governing the rate factor controller of one of the selecting keyboards), automatic means governed by the time and rate factor controllers to control the operation of the master machine in accordance with the product of time and rate, and counters associated with said registers and each adapted automatically to indicate the number of actuations of the associated register.

28. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller, a rate factor controller, automatic means governed by the time and rate factor controllers to control the operation of the master machine in accordance with the product of time and rate, and counters associated with said registers and each adapted automatically to indicate the number of actuations of the associated register.

29. In a device of the class described, the combination of a plurality of registers, a master machine for involving any connected register with an entry, means for controlling the operative connection of any selected register with the master machine, a time factor controller, a rate factor controller, automatic means governed by the time and rate factor controllers to control the operation of the master machine in accordance with the product of time and rate, a printing attachment associated with each register for printing a record of the actuations of such register, and counters associated with said registers and each adapted automatically to indicate the number of actuations of the associated register.

30. In a device of the class described, the combination of a plurality of registers, a master machine for involving any connected register with an entry, debit and credit keyboards, one adapted operatively to connect in one direction any selected register with the master machine, and the other operatively to connect in the reverse direction any other selected register with the master machine, a time factor controller, a rate factor controller, automatic means governed by the time and rate factor controllers to control the operation of the master machine in accordance with the product of time and rate, a printing attachment associated with each register for printing a record of the actuations of such register, and counters associated with said registers and each adapted automatically to indicate the number of actuations of the associated register.

31. In a device of the class described, the combination of a plurality of registers, a master machine for involving any connected register with the entry, a keyboard for controlling the operative connection of any selected register with the master machine, a rate factor controller, means whereby the rate factor controller is governed by the register selecting keyboard, a time factor controller, automatic means governed by the time and rate factor controllers to control the operation of the master machine in accordance with the product of the time and rate, automatic journalizing mechanism for printing a record of the operation of said mechanism, and counters associated with said registers and each adapted automatically to indicate the number of actuations of the associated register.

32. In combination, a plurality of specific registers, a plurality of generic registers, a master machine for driving any register operatively connected therewith, means for connecting any selected specific register with the master machine, means for automatically connecting a predetermined generic register with the master machine upon the selection and connection of any of a certain group of specific registers with the master machine, a time factor controller, a rate factor controller, automatic means governed by the time and rate factor controllers to control the operation of the master machine in accordance with the product of time and rate, and counters associated with said registers and each adapted automatically to indicate the number of actuations of the associated register.

33. In combination, a plurality of workmen's time registers, a master machine for actuating any operatively connected time register, means for connecting any selected time register with the master machine to be driven forwardly or backwardly, and a clock for controlling the degree of actuation of the master machine.

34. In a wage accounting system, the combination of a plurality of indicating mechanisms, means for selecting one of said mechanisms to receive the workman's wage account, means for automatically recording the time element of the wage account, means for automatically recording the rate element of the wage account, means for automatically combining said elements into the wage entry, and means for causing an indication of said wage entry on the selected indicating mechanism.

35. In a wage accounting system, the combination of means for setting up a time element, means for setting up a rate element, means for combining the time and rate elements to control the wage entry, and means for indicating said entry.

36. In a time accounting system, the combination of a plurality of registers, means for setting up a rate element on one register, means for setting up a time element on a second register, means for combining the rate and time elements to produce the wage element, and means for setting up the wage element on a third register.

37. In an accounting system, the combination of a plurality of registers adapted to receive debit and credit entries, means for preparing a register to receive a debit entry, means for preparing a register to receive a credit entry, and means for preventing a register from consecutively receiving two entries of the same nature.

38. In a time accounting system, the combination of a plurality of registers, each adapted to receive in and out entries, and means for preventing the registers from consecutively receiving two in or two out entries.

39. In a time accounting system, the combination of a plurality of registers each adapted to operate in a positive or in a negative direction, and means rendered effective after the operation of a register in one direction to prevent the next succeeding operation of the register in the same direction.

40. In a time accounting system, the combination of a plurality of registers each adapted to operate in a positive or in a negative direction, locking means for each register, operation of a register in one direction causing the locking means to become effective to lock the register against repeated operation in said direction, operation of the register in the opposite direction causing the locking mechanism to be actuated to allow operation of the register in the first direction.

41. In a wage accounting system, the combination of a plurality of registers each adapted to operate in a positive or in a negative direction, and means for each register for preventing repetition of operation in one direction unless the register has first been operated in the opposite direction.

42. In an accounting system, the combination of a register adapted to operate in a positive or in a negative direction, and means for limiting the register to alternate positive and negative operation.

43. In a time accounting system, the combination of a plurality of registers, selecting means for selecting one of said registers to receive a wage entry, means automatically controlled by the operation of the selecting means for setting up the rate and time elements of the wage entry, means automatically controlled to combine the rate and time elements to produce the wage element, and means automatically controlled to involve the selected register with the wage entry.

44. In an accounting system, the combination of a plurality of time-registers, a master machine for involving any connected register with an entry, a keyboard for selecting any register for actuation by said master machine when the workman registers "in," a second keyboard for connecting said register with the master machine for actuation in the reverse direction when the workman registers "out," and clock-governed mechanism for automatically controlling the operation of the selected register so that the resultant actuation thereof is proportional to the time elapsed between the "in" and "out" registrations.

45. In an accounting system, the combination of a plurality of time-registers, a master machine for involving any connected register with an entry, a keyboard for selecting any register for actuation by said master machine when the workman registers "in," a second keyboard for connecting said register with the master machine for actuation in the reverse direction when the workman registers "out," clock-governed mechanism for automatically controlling the operation of the selected register so that the resultant actuation thereof is proportional to the time elapsed between the "in" and "out" registrations, and a printing mechanism associated with each register for automatically printing the time of the "in" and "out" registrations.

46. In an accounting system, the combination of a plurality of time-registers, a corresponding plurality of wage-registers, there being a wage-register for each time-register, a plurality of job-registers, a master machine for involving any connected register with an entry, a keyboard for selecting any pair of time and wage-registers for actuation by said master machine when the workman registers "in" and for selecting the desired job-register when the workman registers "out," a second keyboard for selecting any job-register for actuation by said master machine when the workman registers "in" and for selecting the desired pair of time and wage-registers when the workman registers "out," said keyboards causing actuation of the connected registers in reverse directions, a rate-controlling mechanism for automatically selecting the workman's rate of wages upon selection of his pair of registers, said rate-controlling mechanism including a rate keyboard, clock-governed mechanism for automatically controlling the operation of the connected time-register so that the resultant actuation thereof is proportional to the time elapsed between the "in" and "out" registrations, said clock-governed mechanism including a time keyboard, means whereby said time keyboard is automatically actuated upon selection of the desired job-register to set up the time of the "in" and "out" registrations, connections between said rate keyboard and said time keyboard whereby the set-up on the time keyboard causes a set-up on the rate keyboard of the workman's rate of wages, and automatic mechanism connected with said keyboards and said master machine for controlling the operation of the master machine to actuate the connected wage-register and job-register proportionately to the product of time and rate.

47. In an accounting system, the combination of a plurality of time-registers, means for actuating the same, means for selecting any register for actuation when the workman registers "in," means for connecting said register for actuation in the reverse direction when the workman registers "out," and clock-governed mechanism for automatically controlling the operation of the selected register so that a resultant actuation thereof is proportional to the time elapsed between the "in" and "out" registrations.

48. In an accounting system, the combination of a plurality of time-registers, means for actuating the same, means for selecting any register for actuation when the workman register "in," means for connecting said register for actuation in the reverse direction when the workman registers "out," clock-governed mechanism for automatically controlling the operation of the selected register so that a resultant actuation thereof is proportional to the time elapsed between the "in" and "out" registrations, means for successively clearing said registers, and means for indicating the total of the entries as the registers are cleared.

49. In an accounting system, the combination of a plurality of time-registers, a master machine for involving any connected register with an entry, a keyboard for selecting any register for actuation by said master machine when the workman registers "in," a second keyboard for connecting said register with the master machine for actuation in the reverse direction when the workman registers "out," clock-governed mechanism for automatically controlling the operation of the selected register so that the resultant actuation thereof is proportional to the time elapsed between the "in" and "out" registrations, said clock-governed mechanism including a keyboard adapted to be manually actuated for successively clearing the registers, and means for indicating the total of the entries as the registers are cleared.

50. In an accounting system, the combination of a plurality of time-registers, a master machine for involving any connected register with an entry, a keyboard for selecting any register for actuation by said master machine when the workman registers "in," a second keyboard for connecting said register with the master machine for actuation in the reverse direction when the workman registers "out," clock-governed mechanism for automatically controlling the operation of the selected register so that the resultant actuation thereof is proportional to the time elapsed between the "in" and "out" registrations, said clock-governed mechanism including a keyboard adapted to be manually actuated for successively clearing the registers, and printing mechanism operated by said keyboard for making a record of the entries cleared.

51. In an accounting system, the combination of a plurality of time-registers, means for actuating any desired register in reverse directions when the workman registers "in" and "out," and clock-governed mechanism for causing the resultant actuation of any register to be proportional to the time elapsed between the "in" and "out" registrations.

52. In an accounting system, the combination of a plurality of wage-registers, means for actuating any desired wage-register in reverse directions when the workman registers "in" and "out," and mechanism for controlling the resultant actuation of any register in accordance with the product of a predetermined rate of wages and the time elapsed between the "in" and "out" registrations.

53. In an accounting system, the combination of a plurality of wage-registers, means for actuating any desired wage-register in reverse directions when the workman registers "in" and "out," mechanism for controlling the resultant actuation of any register in accordance with the product of a predetermined rate of wages and the time elapsed between the "in" and "out" registrations, means for successively clearing said registers, and means for indicating the total of the entries as the registers are cleared.

54. In an accounting system, the combination with a plurality of registers, of means for actuating said registers in reverse directions at the beginning and end of predetermined intervals, the resultant actuation being proportional to the time contained in such periods.

55. In an accounting system, the combination with a plurality of wage-registers, of means for actuating said wage-registers in reverse directions at the beginning and end of predetermined periods, the resultant actuation being proportional to the product of the time contained in such periods and a predetermined rate of wages.

56. In an accounting system, the combination of a plurality of wage-registers, means for actuating any desired wage-register in reverse directions when the workman registers "in" and "out," mechanism for controlling the resultant actuation of any register in accordance with the product of a predetermined rate of wages and the time elapsed between the "in" and "out" registrations, means for successively clearing said registers, and a pay-roll mechanism actuated during the clearing operation.

57. In an accounting system, the combination of a plurality of wage-registers, mechanism for actuating any desired register in reverse directions when the workman registers "in" and "out," a time-controlled member, means for multiplying the movement of said member in accordance with any desired rate of wages, and connections for transmitting said multiplied movement to the connected register through said actuating mechanism.

58. In an accounting system, the combination of a plurality of pairs of individual registers, each pair consisting of a time-register and a wage-register assigned to each workman, clock mechanism for simultaneously actuating any desired pair of registers in reverse directions at the beginning and end of predetermined intervals, the registers being actuated one pair at a time, and generic registers for automatically totalizing the entries of said individual registers.

59. The combination of a continuously rotatable clock-driven member, mechanism for converting said continuous movement into a periodic movement which is proportional to the amount of rotation of said clock-driven member, a time-register, and means for transmitting the periodic movement of said mechanism to said time-register alternately in reverse directions.

60. The combination of a continuously rotatable clock-driven member, mechanism for converting said continuous movement into a periodic movement which is proportional to the product of a predetermined factor and the amount of rotation of said clock-driven member, a wage-register, and means for transmitting the periodic movement of said mechanism to said wage-register alternately in reverse directions.

61. In combination, a clock, a keyboard, and connections between the two for causing the time indicated by the clock to be automatically set up on the keyboard at desired intervals.

62. In an accounting system, the combination of a clock, a keyboard, connections between the two for causing the time indicated by the clock to be automatically set up on the keyboard at desired intervals, a time-register, and mechanism interposed between said keyboard and said time-register for automatically transferring the set-ups on said keyboard into said time-register.

63. In an accounting system, the combination of a clock, a keyboard, connections between the two for causing the time indicated by the clock to be automatically set up on the keyboard at desired intervals, a rate-controlling mechanism, means interposed between said keyboard and said mechanism for multiplying the time set up on said keyboard by a predetermined rate factor automatically selected by said mechanism, a wage-register, and means for actuating said wage-register proportionately the product of time and rate.

64. In an accounting system, the combination of a keyboard for selecting a workman's wage-register for actuation, a rate keyboard for selecting the workman's rate of wages, and connections between said keyboards whereby the selection of a workman's register automatically selects his rate on the rate keyboard.

65. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, and connections between said time keyboard and said rate keyboard whereby the set-up on the time keyboard automatically sets up the previously selected rate on the rate keyboard.

66. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, a multiplying mechanism, means for transferring the time factor and the rate factor into said mechanism to be multiplied therein, and connections between said mechanism and said registers for transferring the product of time and rate into said registers.

67. In an accounting system, the combination of a keyboard for selecting a wage-register for actuation, a second keyboard for selecting a job-register for counter-balancing actuation, and means for preventing actuation of either the wage-register or the job-register unless both have been selected by set-ups on said keyboards.

68. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, and means for automatically entering the product of the set-ups on the time and rate keyboards into the selected registers.

69. In an accounting system, the combination of a clock, a keyboard, connections between the two for causing the time indicated by the clock to be automatically set up on the keyboard at desired intervals, a time-register, and means for automatically entering the set-ups on said keyboard into said time-register.

70. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, and connections between the master machine and the time and rate keyboards for automatically entering the set-ups on the time keyboard into the connected time-register and entering the product of the set-ups on the time and rate keyboards into the connected wage and job-registers.

71. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, connections between the master machine and the time and rate keyboards for automatically entering the set-ups on the time keyboard into the connected time-register and entering the product of the set-ups on the time and rate keyboards into the connected wage and job-registers, and means for preventing actuation of either a wage-register or a job-register unless both have been selected by set-ups on the two first-mentioned keyboards.

72. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, connections between the master machine and the time and rate keyboards for automatically entering the set-ups on the time keyboard into the connected time-register and entering the product of the set-ups on the time and rate keyboards into the connected wage and job-registers, means for clearing said registers, and a pay-roll mechanism actuated during such clearing operation.

73. In an accounting system, the combination of a plurality of time-registers, mechanism for actuating any desired register, a keyboard, a clock, connections between said clock and keyboard for causing the time indicated by the clock to be automatically set up on the keyboard at desired intervals, connections between said keyboard and said mechanism for entering the set-up on the keyboard into the connected register, and means for permitting manual operation of the keyboard independently of the clock.

74. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, and means for permitting manual operation of the time keyboard and rate keyboard.

75. In an accounting system, the combination of a plurality of time-registers, a corresponding plurality of wage-registers, there being a wage-register for each time-register, a plurality of job-registers, a master machine for involving any connected register with an entry, a keyboard for selecting any pair of time and wage-registers for actuation by said master machine when the workman registers "in" and for selecting the desired job-register when the workman registers "out," a second keyboard for selecting any job-register for actuation by said master machine when the workman registers "in" and for selecting the desired pair of time and wage-registers when the workman registers "out," said keyboards causing actuation of the connected registers in reverse directions, a rate-controlling mechanism for automatically selecting the workman's rate of wages upon selection of his pair of registers, said rate-controlling mechanism including a rate keyboard, clock-governed mechanism for automatically controlling the operation of the connected time-register so that the resultant actuation thereof is proportional to the time elapsed between the "in" and "out" registrations, said clock-governed mechanism including a time keyboard, means whereby said time keyboard is automatically actuated upon selection of the desired job-register to set up the time of the "in" and "out" registrations, connections between said rate keyboard and said time keyboard whereby the set-up on the time keyboard causes a set-up on the rate keyboard of the workman's rate of wages, a multiplying mechanism adapted to receive the time factor from the time keyboard and the rate factor from the rate keyboard and to multiply said factors to produce the wage element, a wage keyboard, connections between said multiplying mechanism and said wage keyboard for automatically setting up the wage element on the wage keyboard, and connections between said wage keyboard and said master machine whereby the set-up on the wage keyboard controls the actuation of the wage and job-registers by the master machine.

76. In an accounting system, the combination of a plurality of wage-registers, a plurality of job-registers, a master machine for involving any connected register with an entry, a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, a multiplying mechanism adapted to receive the time factor from the time keyboard and the rate factor from the rate keyboard and to multiply said factors to produce the wage element, a wage keyboard, connections between said multiplying mechanism and said wage keyboard for automatically setting up the wage element on the wage keyboard, and connections between said wage keyboard and said master machine whereby the set-up on the wage keyboard controls the actuation of the wage and job-registers by the master machine.

77. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, and means for preventing simultaneous set-ups on any one of said keyboards.

78. In an accounting system, the combination of a keyboard for selecting a workman's wage-register for actuation, a rate keyboard for selecting the workman's rate of wages, connections between said keyboards whereby the selection of a workman's register automatically selects his rate on the rate keyboard, and means for preventing simultaneous set-ups on any one of said keyboards.

79. In an accounting system, the combination of a plurality of wage-registers, a plurality of job-registers, a master machine for involving any connected register with an entry, a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, a multiplying mechanism adapted to receive the time factor from the time keyboard and the rate factor from the rate keyboard and to multiply said factors to produce the wage element, a wage keyboard, connections between said multiplying mechanism and said wage keyboard for automatically setting up the wage element on the wage keyboard, connections between said wage keyboard and said master machine whereby the set-up on the wage keyboard controls the actuation of the wage and job-registers by the master machine, and means for preventing simultaneous set-ups on any one of said keyboards.

80. In an accounting system, the combination of a plurality of wage-registers, mechanism for actuating any desired register in reverse directions when the workman registers "in" and "out", a keyboard for selecting any register for actuation, a time keyboard adapted to automatically set up the time of the "in" and "out" registrations, a rate keyboard for automatically selecting the workman's rate of wages when the wage-register is selected, connections between said time keyboard and said rate keyboard whereby the set-up on the time keyboard automatically sets up the previously selected rate on the rate keyboard, a wage-keyboard, means for automatically setting up the product of time and rate on said wage keyboard, and connections between said wage keyboard and said master machine whereby the set-up on the wage keyboard controls the actuation of the selected wage-register by the master machine.

81. In an accounting system, the combination of a register, means for actuating the same, clock-governed mechanism for controlling the actuation of said register, said mechanism including an electromagnetically actuated keyboard, means for permitting said keyboard to be manually operated independently of its clock control, and means for transferring the set-up on said keyboard (whether clock-controlled or manual) into said register.

82. The combination of a register, a clock controlled mechanism for actuating said register, means for changing the rate of actuation of said register as desired, a manual controlled mechanism for involving said register with any desired entry.

83. The combination of a register, means for actuating the same, an automatically operated clock-controlled keyboard for controlling the actuation of the register, said keyboard being adapted to be manually operated independently of its clock control, and means for transferring the set-up on said keyboard (whether automatic or manual) into said register.

84. In an accounting system, the combination of a plurality of wage-registers, a plurality of job-registers, a master machine for involving any connected register with an entry, a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, a wage keyboard, means for automatically setting up the product of time and rate on said wage keyboard, connections between said wage keyboard and said master machine whereby the set-up on the wage keyboard controls the actuation of the selected wage-register by the master machine, means for preventing effective actuation of the time keyboard and the rate keyboard when certain set-ups are made on the two first-mentioned keyboards, and means for permitting only manual actuation of the wage keyboard when the time and rate keyboards are thus rendered ineffective, said manual set-up on the wage keyboard being transferred into the connected register.

85. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counterbalancing operation, a time keyboard for automatically setting up the time factor, a rate keyboard for automatically setting up the rate factor, means for transferring the product of said factors into the connected registers through the master machine, and means to prevent automatic actuation of the rate keyboard unless the workman's number has been set up either on the debit or credit keyboard.

86. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counterbalancing operation, a time keyboard for automatically setting up the time factor, a rate key board for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, and means for preventing automatic actuation of the time, rate and wage keyboards when certain set-ups are made on the debit and credit keyboards, but permitting manual actuation of said three keyboards.

87. In an accounting system, the combination of a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage register is selected, connections between said time keyboard and said rate keyboard whereby the set-up on the time keyboard automatically sets up the previously selected rate on the rate keyboard, and means for causing automatic erasure of any keyboard when simultaneous set-ups are attempted thereon.

88. In an accounting system, the combination of a keyboard for selecting a workman's wage-register for actuation, a rate keyboard for selecting the workman's rate of wages, connections between said keyboards whereby the selection of a workman's register automatically selects his rate on the rate keyboard, and means for causing automatic erasure of any keyboard when simultaneous set-ups are attempted thereon.

89. In an accounting system, the combination of a plurality of wage-registers, a plurality of job-registers, a master machine for involving any connected register with an entry, a keyboard for selecting a workman's wage-register for actuation, a second keyboard for selecting a job-register for actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, a multiplying mechanism adapted to receive the time factor from the time keyboard and the rate factor from the rate keyboard and to multiply said factors to produce the wage element, a wage keyboard, connections between said multiplying mechanism and said wage keyboard for automatically setting up the wage element on the wage keyboard, connections between said wage keyboard and said master machine whereby the set-up on the wage keyboard controls the actuation of the wage and job-registers by the master machine, and means for causing automatic erasure of any keyboard when simultaneous set-ups are attempted thereon.

90. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, and a totalizing-register for receiving the entries as they are cleared.

91. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, a totalizing-register for receiving the entries as they are cleared, and a pay-roll mechanism actuated during such clearing operation.

92. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, a totalizing-register for receiving the entries as they are cleared, a memorandum maker associated with each wage-register to record the actuations thereof, and a journalizing mechanism for automatically duplicating the records of said memorandum makers.

93. In an accounting system, the combination of a plurality of wage-registers, means for actuating said wage-registers in reverse directions at the beginning and end of predetermined periods, the resultant actuation being proportional to the product of the time contained in such periods and a predetermined rate of wages, means for clearing said registers, a totalizing-register for receiving the entries as they are cleared, and a pay-roll mechanism actuated during such clearing operation.

94. In an accounting system, the combination of a plurality of pairs of individual registers, each pair consisting of a time-register and a wage-register assigned to each workman, clock mechanism for simultaneously actuating any desired pair of registers in reverse directions at the beginning and end of predetermined intervals, the registers being actuated one pair at a time, a memorandum maker associated with each pair of registers to record the actuations thereof, a totalizing-register for receiving the entries as they are cleared, and journalizing mechanism for automatically duplicating the records of said memorandum makers.

95. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, connections between the master machine and the time and rate keyboards for automatically entering the set-ups on the time keyboard into the connected time-register and entering the product of the set-ups on the time and rate keyboards into the connected wage and job-registers, a memorandum maker associated with each pair of registers to record the actuations thereof, a totalizing register for receiving the entries as they are cleared, and a journalizing mechanism for automatically duplicating the records of said memorandum makers.

96. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, connections between the master machine and the time and rate keyboards for automatically entering the set-ups on the time keyboard into the connected time-register and entering the product of the set-ups on the time and rate keyboards into the connected wage and job-registers, means for clearing the workman's registers, mechanism for automatically selecting the pairs of registers in succession for clearing, and a totalizing-register for receiving the entries as they are cleared.

97. In an accounting system, the combination of a plurality of pairs of individual registers, each pair consisting of a time-register and a wage-register, a plurality of job-registers, a master machine for involving any connected register with an entry, a keyboard for selecting a workman's pair of registers for actuation by said master machine, a second keyboard for selecting a job-register for counter-balancing actuation, a time keyboard for automatically setting up the time factor when the job-register is selected, a rate keyboard for automatically selecting the workman's rate of wages when the wage-register is selected, connections between said time keyboard and said rate keyboard whereby the set-up on the time keyboard automatically sets up the previously selected rate on the rate keyboard, connections between the master machine and the time and rate keyboards for automatically entering the set-ups on the time keyboard into the connected time-register and entering the product of the set-ups on the time and rate keyboards into the connected wage and job-registers, means for clearing the workman's registers, mechanism for automatically selecting the pairs of registers in succession for clearing, a memorandum maker associated with each pair of registers to record the actuations thereof, and a journalizing mechanism for automatically duplicating the records of said memorandum makers.

98. In an accounting system, the combination of a plurality of registers, mechanism for actuating any desired register in a positive or in a negative direction, means associated with each register for preventing repetition of operation in one direction unless the register has first been operated in the reverse direction, and means for rendering said preventing means ineffective when the register comes to rest at zero.

99. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, and mechanism for automatically selecting the wage-registers in succession for clearing.

100. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, mechanism for automatically selecting the wage-registers in succession for clearing, and a totalizing-register for receiving the entries as they are cleared.

101. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, mechanism for automatically selecting the wage-registers in succession for clearing, a totalizing-register for receiving the entries as they are cleared, and a pay-roll mechanism actuated during such clearing operation.

102. In an accounting system, the combination of a plurality of workman's wage-registers, a plurality of job-registers, a master machine for involving any connected register with an entry, a debit (or credit) keyboard for setting up the workman's number to select the desired register for actuation, a credit (or debit) keyboard for selecting the desired job-register for counter-balancing operation, a time keyboard for automatically setting up the time factor, a rate keyboard for automatically setting up the rate factor, a wage keyboard, means for automatically setting up the product of time and rate on said wage keyboard, connections between said wage keyboard and said master machine whereby the set-up on the wage keyboard controls the actuation of the selected registers by the master machine, means for clearing said wage-registers, mechanism for automatically selecting the wage-registers in succession for clearing, a memorandum maker associated with each register to record the actuations thereof, and a journalizing mechanism for automatically duplicating the records of said memorandum makers.

103. In an accounting system, a time-indicating mechanism comprising, in combination, a series of rotatable members, clock-controlled means for actuating said members, an electromagnetically operated keyboard, circuit connections for said keyboard, and means whereby said members control said circuit connections to set up on the keyboard the time indicated by the clock.

104. In an accounting system, a time-indicating mechanism comprising, in combination, a series of rotatable members, clock-controlled means for actuating said members, an electromagnetically operated keyboard, circuit connections for said keyboard, means whereby said members control said circuit connections to set up on the keyboard the time indicated by the clock, a plurality of registers, a master machine for actuating any connected register, and connections between said keyboard and said master machine whereby the set-up on the keyboard controls the operation of the master machine.

105. In an accounting system, the combination of a register, a clock-controlled keyboard, and means for automatically controlling the actuation of said register in accordance with the set-up on said keyboard.

106. The combination of a pair of keyboards adapted to receive set-ups, a third keyboard, and means for causing the product of the set-ups on said pair of keyboards to be automatically set up on said third keyboard.

107. The combination of a pair of keyboards adapted to receive set-ups, a third keyboard, means for causing the product of the set-ups on said pair of keyboards to be automatically set up on said third keyboard, a plurality of registers, means for actuating the same, and means whereby the set-up on said third keyboard controls the operation of said actuating means.

108. The combination of a pair of keyboards adapted to receive set-ups, a third keyboard, means for causing the product of the set-ups on said pair of keyboards to be automatically set up on said third keyboard, a register, and means for transferring the set-up on said third keyboard into said register.

109. In a device of the class described, the combination of a series of suitably ordered numeral-wheels, carry-over mechanism associated therewith, a driving-gear, a shaft on which said driving gear is slidably mounted to be brought into and out of engagement with said numeral-wheels, said gear being rotatable with said shaft, means for controlling the longitudinal position of said gear on said shaft, and means for controlling the extent of actuation of said shaft.

110 In a device of the class described, the combination of a series of suitably ordered numeral-wheels, carry-over mechanism associated therewith, a driving gear, a shaft on which said driving gear is slidably mounted to be brought into and out of engagement with said numeral-wheels, said gear being rotatable with said shaft, a keyboard, a master machine, means for transferring the set-up on said keyboard into said master machine, a connection between said master machine and said gear whereby the master machine controls the longitudinal position of said gear on said shaft, a second keyboard, and mechanism interposed between said shaft and said second keyboard for causing said shaft to actuate said numeral-wheels in accordance with the product of the set-ups on said keyboards.

111. In an accounting system, the combination of a series of suitably ordered numeral-wheels, carry-over mechanism associated therewith, a driving gear, a shaft on which said driving gear is slidably mounted to be brought into and out of engagement with said numeral-wheels, said gear being rotatable with said shaft, a pair of keyboards, a rotatable member, connections between said keyboards and said member for causing actuation of the latter proportionately to the product of the factors set up on said keyboards, and connections between said shaft and said rotatable member whereby said numeral-wheels are actuated by said gear to set up a number equal to the product of said factors.

112. In an accounting system, the combination of a series of suitably ordered numeral-wheels, carry-over mechanism associated therewith, a driving gear, a shaft on which said driving gear is slidably mounted to be brought into and out of engagement with said numeral-wheels, said gear being rotatable with said shaft, a pair of keyboards, a rotatable member, connections between said keyboards and said member for causing actuation of the latter proportionately to the product of the factors set up on said keyboards, connections between said shaft and said rotatable member whereby said numeral-wheels are actuated by said gear to set up a number equal to the product of said factors, a third keyboard adapted to be electromagnetically actuated, circuit connections therefor, and means whereby said numeral-wheels control said circuit connections to set up on said third keyboard the number indicated by said numeral-wheels.

113. In an accounting system, the combination of a series of suitably ordered numeral-wheels, carry-over mechanism associated therewith, a driving gear, a shaft on which said gear is slidably mounted to be brought into and out of engagement with said numeral-wheels, said gear being rotatable with said shaft, a time-controlled keyboard, a master machine, means for transferring the set-up on said keyboard into said master machine, a connection between said master machine and said gear whereby the master machine controls the longitudinal position of said gear on said shaft, a plurality of registers, means for selecting any connected register for actuation by the master machine, a second keyboard, a rotatable member, connections between said keyboards and said rotatable member for causing actuation of the latter proportionately to the product of the factors set up on said keyboards, connections between said shaft and said rotatable member whereby said numeral-wheels are actuated by said gear to set up a number equal to the product of said factors, a third keyboard adapted to be electromagnetically actuated, circuit connections therefor, means whereby said numeral-wheels control said circuit connections to set up on said third keyboard the number indicated by said numeral-wheels, and means for automatically transferring the set-up on said third keyboard into the connected register through the master machine.

114. The combination of a register, a mechanism having numeral wheels, means for actuating said numeral wheels to set up any desired amount, continuously operating devices, and connections between said devices and said register for automatically transferring said amount into the register by the operation of said devices.

115. The combination of a register, a mechanism having numeral wheels, a keyboard for actuating said numeral wheels to indicate any desired amount, continuously operating devices, and means for automatically transferring said amount into the register by the operation of said devices.

116. In combination, wokman's registering mechanism, mechanism for debiting on said registering mechanism a desired amount at the beginning of a working period, and devices for crediting on said registering mechanism an amount proportional to the work performed during said period.

117. In combination, a plurality of workmen's time registers, mechanism for debiting upon one of said registers a desired amount of time for a corresponding workman at the beginning of a working period, and devices for crediting on said time registers an amount of time determined by the time worked by said workman during said period.

118. In combination, a plurality of workmen's time registers, mechanism for debiting upon one of said registers a desired amount of time for a corresponding workman at the beginning of a working period, devices for crediting on said time registers an amount of time determined by the time worked by said workman during said period, and means for crediting different amounts of time on different ones of said registers determined by the different working time of corresponding workmen.

119. In combination, a plurality of workmen's wage registers, mechanism for debiting on one of said registers a desired amount at the beginning of a working period; said amount corresponding to the wages of a corresponding workman, and devices for crediting on said wage register an amount determined by the wages earned by said workman during said period.

120. In combination, a plurality of workman's wage registers, mechanism for debiting on one of said registers a desired amount at the beginning of a working period; said amount corresponding to the wages of a corresponding workman, devices for crediting on said wage register an amount determined by the wages earned by said workman during said period, and means for debiting and crediting different amounts on said wage registers according to the rates of wages of the different workmen.

121. In combination, a register, means for actuating the same in either direction, means for automatically recording the registration of said registers during accumulation, and means for automatically recording the registration of said register during decumulation.

122. In combination, a plurality of registers, means for selectively actuating any register in either direction, means for automatically recording the registration of the involved register during accumulation, and means for automatically recording the registration of said register during decumulation.

123. In an accounting system, the combination of a register for indicating the working time of a workman, time-controlled mechanism for actuating the register, and devices for debiting from the indication of the register at the beginning of an accounting period an amount determined by the value of the beginning time of said period.

124. In an accounting system, the combination of a plurality of registers, mechanism for actuating said registers proportionally to time, devices for debiting from the indications of said registers at the beginning of an accounting period amounts corresponding to the accounting value of the beginning time of said period, and mechanism for crediting upon each register an amount corresponding to the working time of a workman whose time is being accounted by the corresponding register.

125. In an accounting system, the combination of a plurality of registers for indicating the wages earned by corresponding workmen, devices for debiting on said registers at the beginning of an accounting period amounts corresponding to the beginning time of said period, a plurality of job cost registers, and mechanism for actuating said wage registers and job cost registers to indicate the wages earned by the corresponding workmen and the accrual of job costs resulting from the wages earned according to the particular jobs worked upon by the workmen in earning said wages.

126. In an accounting system, the combination of a plurality of registers to which working or potential values are assigned, corresponding to the hours of the day, devices for debiting from the register values at the start of a working period corresponding with said working or potential values, and mechanism for crediting on the registers the value of the time of termination of the working period at the end of said period.

In witness whereof, I hereunto subscribe my name, this 1st day of August, 1908.

WILLIAM J. CRUMPTON.

Witnesses:
 FRED O. HEULER,
 CHARLES H. TALLMADGE.